US012414591B2

(12) United States Patent
Hines et al.

(10) Patent No.: US 12,414,591 B2
(45) Date of Patent: Sep. 16, 2025

(54) SURGICAL HELMET ASSEMBLY WITH A RECONFIGURABLE CHIN BAR

(71) Applicant: Stryker Corporation, Kalamazoo, MI (US)

(72) Inventors: Douglas Paul Hines, Kalamazoo, MI (US); Sergey Belikov, Kalamazoo, MI (US); Ryan Jefferis, Seattle, WA (US)

(73) Assignee: Stryker Corporation, Portage, MI (US)

(*) Notice: Subject to any disclaimer, the term of this patent is extended or adjusted under 35 U.S.C. 154(b) by 871 days.

(21) Appl. No.: 17/607,121

(22) PCT Filed: Apr. 30, 2020

(86) PCT No.: PCT/US2020/030745
§ 371 (c)(1),
(2) Date: Oct. 28, 2021

(87) PCT Pub. No.: WO2020/223497
PCT Pub. Date: Nov. 5, 2020

(65) Prior Publication Data

US 2022/0151321 A1 May 19, 2022

Related U.S. Application Data

(60) Provisional application No. 62/952,808, filed on Dec. 23, 2019, provisional application No. 62/842,106, filed on May 2, 2019.

(51) Int. Cl.
*A41D 13/12* (2006.01)
*A41D 13/11* (2006.01)
(Continued)

(52) U.S. Cl.
CPC ...... *A41D 13/1218* (2013.01); *A41D 13/1153* (2013.01); *A42B 3/28* (2013.01); *A62B 18/04* (2013.01)

(58) Field of Classification Search
CPC ............ A41D 13/1218; A41D 13/1153; A62B 3/225; A62B 3/205; A62B 3/22;
(Continued)

(56) References Cited

U.S. PATENT DOCUMENTS 1,481,019 A 1/1924 Luebbert
1,622,311 A 3/1927 Fischer
(Continued)

FOREIGN PATENT DOCUMENTS

CN 203152623 U 8/2013
CN 106579629 A 4/2017
(Continued)

OTHER PUBLICATIONS

English language abstract and machine-assisted English translation for CN 106579629 A extracted from espacenet.com database on Dec. 16, 2021, 7 pages.
(Continued)

*Primary Examiner* — Victoria Murphy
*Assistant Examiner* — Sara K Toich
(74) *Attorney, Agent, or Firm* — Howard & Howard Attorneys PLLC

(57) ABSTRACT

A face frame including features for coupling the surgical garment to a surgical helmet. The face frame (524) comprises a lower beam (528) connected by a pair of posts (526, 527). The posts of the face frame comprise a face frame coupler (552, 554) configured to removably couple the face frame to a surgical helmet.

9 Claims, 26 Drawing Sheets

(51) Int. Cl.
*A42B 3/28* (2006.01)
*A62B 18/04* (2006.01)

(58) Field of Classification Search
CPC . A62B 3/32–328; A62B 18/04; A62B 18/045; A62B 17/04
See application file for complete search history.

(56) References Cited

U.S. PATENT DOCUMENTS

| | | | |
|---|---|---|---|
| 1,973,677 | A | 9/1934 | Woodford |
| 4,028,739 | A | 6/1977 | Bell et al. |
| 6,892,400 | B1 | 5/2005 | Choi et al. |
| 7,159,249 | B2 | 1/2007 | Dennis et al. |
| 7,207,072 | B2 | 4/2007 | Halsnes et al. |
| 7,735,156 | B2 | 6/2010 | VanDerWoude et al. |
| 7,752,682 | B2 | 7/2010 | VanDerWoude et al. |
| 8,020,220 | B2 | 9/2011 | McElroy et al. |
| 8,056,152 | B2 | 11/2011 | Brace |
| 8,234,722 | B2 | 8/2012 | VanDerWoude et al. |
| 8,282,235 | B2 | 10/2012 | Gilligan |
| 8,291,513 | B2 | 10/2012 | Prinkey |
| 8,407,818 | B2 | 4/2013 | VanDerWoude et al. |
| 8,453,262 | B2 | 6/2013 | Green |
| 8,458,821 | B2 | 6/2013 | Rivas, III et al. |
| 8,819,869 | B2 | 9/2014 | VanDerWoude et al. |
| 8,899,774 | B2 | 12/2014 | Strong et al. |
| 9,173,437 | B2 | 11/2015 | VanDerWoude et al. |
| 9,400,101 | B2 | 7/2016 | Strong et al. |
| 10,253,964 | B2 | 4/2019 | Strong et al. |
| 10,420,386 | B1 | 9/2019 | Jefferis et al. |
| 10,441,019 | B2 | 10/2019 | Huh |
| 10,667,568 | B2 | 6/2020 | Rosati et al. |
| 10,750,800 | B2 | 8/2020 | Jefferis et al. |
| 10,830,428 | B2 | 11/2020 | Africa et al. |
| 10,959,473 | B2 | 3/2021 | Chen |
| 2005/0235402 | A1 | 10/2005 | Foote et al. |
| 2007/0028372 | A1* | 2/2007 | VanDerWoude ......... A42B 3/30 2/457 |
| 2009/0151054 | A1* | 6/2009 | VanDerWoude ....... A42B 3/286 2/410 |
| 2011/0185465 | A1* | 8/2011 | Prinkey .................... A42B 3/22 2/15 |
| 2014/0033406 | A1* | 2/2014 | Lebel ..................... A42B 3/326 2/422 |
| 2014/0075654 | A1* | 3/2014 | McGinn ................. A42B 3/326 2/422 |
| 2014/0352037 | A1 | 12/2014 | VanDerWoude et al. |
| 2015/0082522 | A1 | 3/2015 | Rosati et al. |
| 2018/0084848 | A1 | 3/2018 | Pavalarajan et al. |

FOREIGN PATENT DOCUMENTS

| | | | |
|---|---|---|---|
| CN | 210521651 | U | 5/2020 |
| CN | 211532900 | U | 9/2020 |
| WO | 2019155269 | A1 | 8/2019 |

OTHER PUBLICATIONS

English language abstract and machine-assisted English translation for CN 203152623 U extracted from espacenet.com database on Dec. 16, 2021, 5 pages.
English language abstract and machine-assisted English translation for CN 210521651 U extracted from espacenet.com database on Dec. 16, 2021, 6 pages.
English language abstract and machine-assisted English translation for CN 211532900 A extracted from espacenet.com database on Dec. 16, 2021, 8 pages.
International Search Report for Application No. PCT/US2020/030745 dated Sep. 18, 2020, 2 pages.
Partial International Search Report for Application No. PCT/US2020/030745 dated Jul. 24, 2020, 2 pages.

* cited by examiner

SURGICAL HELMET ASSEMBLY WITH A RECONFIGURABLE CHIN BAR

CROSS-REFERENCE TO RELATED APPLICATIONS

The present application is a National Stage of International Patent Application No. PCT/US2020/030745, filed on Apr. 30, 2020, which claims priority to and all the benefits of U.S. Provisional Patent Application No. 62/842,106, filed on May 2, 2019, and U.S. Provisional Patent Application No. 62/952,808, filed on Dec. 23, 2019, all of which are hereby expressly incorporated herein by reference in their entirety.

SUMMARY

The present disclosure relates generally to a surgical helmet assembly for use with a surgical garment assembly that may be configured for attachment to the surgical helmet assembly, wherein the surgical garment assembly can be employed to provide a barrier between an individual wearing the system and the surrounding environment.

An exemplary configuration provides a surgical helmet assembly comprising a surgical garment configured for attachment to the surgical helmet. The surgical helmet may comprise a face frame including a sliding mechanism and/or a pivot to allow for reconfiguration and/or adjustment of the face frame. The face frame may also comprise a coupling feature and/or coupling member. The surgical garment includes an opening and/or an attachment member configured to removably couple the surgical garment to the surgical helmet.

In another exemplary configuration, a surgical helmet assembly for use with a surgical garment including a coupling element, the surgical helmet assembly may comprise a surgical helmet. The surgical helmet may comprise a headband for securing the surgical helmet to a wearer and a ventilation unit supported by the headband. The surgical helmet assembly may further comprise a face frame that may be removably coupled to the surgical helmet. The face frame may comprise an upper beam comprising opposing regions, a first post and a second post, and a lower beam. Each of the first and second posts may comprise a first end and a second end, wherein the first end of each of the first and the second posts may be coupled to the opposing regions of the upper beam. The lower beam may extend between and connect the second ends of the first and the second posts. Each of the first post and the second post may further comprise a top member and a bottom member. The bottom member of each of the first post and the second posts may be movably coupled to the top member to provide a variable length of each of the first post and the second post to vary the distance between the upper beam and the lower beam.

In yet another exemplary configuration, a surgical helmet assembly for use with a surgical garment including a coupling element, the surgical helmet assembly may comprise a surgical helmet comprising a headband for securing the surgical helmet to a wearer and a ventilation unit supported by the headband. The surgical helmet assembly may further comprise a face frame that is slidably coupled to the surgical helmet. The face frame may comprise an upper beam comprising opposing regions, a first post and a second post, and a lower beam. Each of the first post and the second post may comprise a first end and a second end, wherein the first end of each of the first and the second posts may be coupled to the opposing regions of said upper beam. The lower beam may extend between and connect the second ends of the first and the second posts. Each of the first post and the second post may further comprise a top member and a bottom member, wherein the bottom member may be movably coupled to said top member. Each of the first post and the second post may be movable between a first position defining a first configuration of the face frame and a second position defining a second configuration of the face frame such that each of the configurations of the face frame may define a different distance between the upper beam and the lower beam.

In yet another exemplary configuration, a surgical helmet assembly for use with a surgical garment including a transparent shield, the surgical helmet assembly may comprise a surgical helmet comprising a coupling feature disposed on a distal portion of the surgical helmet. The coupling feature may comprise a plurality of retention features spaced about a distal surface of the coupling feature. The surgical helmet assembly may further comprise a face frame that is removably coupled to the surgical helmet. The face frame may comprise a coupling mechanism configured to operatively engage the coupling feature of said surgical helmet. The coupling mechanism and the coupling feature may further comprise complementary features to allow adjustment of the position of the face frame relative to the surgical helmet to position the transparent shield of the surgical garment at a preferred position in front of the wearer's face when disposed over the surgical helmet.

In yet another exemplary configuration, a surgical helmet for use with a surgical garment including a coupling element, the surgical helmet may comprise a headband, a ventilation unit supported by the headband, and a face frame. The face frame may comprise an upper beam comprising a first region and an opposing second region, a first post and a second post, and a lower beam. Each of the first post and the second post may comprise a first end and an opposing second end, wherein the first end of each of the first and the second posts may be coupled to the upper beam. The lower beam may extend between and connect the second ends of the first and the second posts. The opposing ends of the lower beam may be connected to the second ends of the first and the second posts by a first joint configured to allow the lower beam to rotate relative to the first and the second posts.

In yet another exemplary configuration, a surgical helmet system for use with a surgical garment including a coupling element, the surgical helmet system may comprise a surgical helmet comprising a headband for securing said helmet to a wearer and a ventilation unit supported by the headband. The surgical helmet system may also comprise a first face frame configured to be removably coupled to the surgical helmet. The first face frame may comprise a first dimension, wherein the first dimension may comprise one of a first height defined by the distance between an upper beam and a lower beam, and a first width defined by the distance between a pair of posts that extend between said upper beam and said lower beam. The surgical helmet system may also comprise a second face frame configured to be removably coupled to the surgical helmet. The second face frame may comprise a second dimension, wherein the second dimension may comprise one of a second height defined by the distance between an upper beam and a lower beam, and a second width defined by the distance between a pair of posts that extend between said upper beam and said lower beam. The first dimension of the first face frame may be larger than the second dimension of the second face frame such that the first face frame is configured to fit a wearer with a larger head and the second face frame is configured to fit a wearer with a smaller head.

In yet another exemplary configuration, a surgical helmet assembly may comprise a surgical helmet. The surgical helmet may comprise a headband and a ventilation unit supported by the headband. The surgical helmet assembly may further comprise a first face frame configured to be removably coupled to the surgical helmet. The first face frame may comprise a first upper beam comprising opposing regions and a first coupling feature disposed between the opposing regions. The first face frame may also comprise a first pair of posts that each comprise a first end and a second end. The first end of each of the first pair of posts may be coupled to the opposing ends of the first upper beam. The first face frame may also comprise a first lower beam extending between and connecting the second ends of the first pair of posts. The first face frame may further comprise a first attachment element at least partially disposed within the first face frame, wherein the first coupling feature and the first attachment element may define a first coupling height.

The surgical helmet assembly may further comprise a second face frame configured to be removably coupled to the surgical helmet. The second face frame may comprise a second upper beam comprising opposing regions and a second coupling feature disposed between the opposing regions. The second face frame may also comprise a second pair of posts that each comprise a first end and a second end. The first end of each of the second pair of posts may be coupled to the opposing ends of the second upper beam. The second face frame may also comprise a second lower beam extending between and connecting the second ends of the second pair of posts. The second face frame may further comprise a second attachment element at least partially disposed within the second face frame, wherein the second coupling feature and the second attachment element defining a second coupling height.

The surgical helmet assembly may further comprise a surgical garment. The surgical garment may comprise a shield having an upper portion and an opposing lower portion, an aperture in the upper portion of the shield, a first coupling element disposed on the lower portion of the shield, and a second coupling element disposed on the lower portion of the shield. The distance between the aperture and the first coupling element may define a third coupling height, and the distance between the aperture and the second coupling element may define a fourth coupling height. The first coupling height of the first face frame may be configured to correspond to the third coupling height of the surgical garment to allow the surgical garment to be removably coupled to the first face frame. The second coupling height of the second face frame may be configured to correspond to the fourth coupling height of the surgical garment to allow the surgical garment to be removably coupled to the second face frame.

In yet another exemplary configuration, a surgical helmet assembly comprises a surgical helmet comprising a headband for securing the helmet to a wearer and a ventilation unit supported by the headband. The surgical helmet assembly may further comprise a first face frame configured to be removably coupled to the surgical helmet. The first face frame may comprise a first upper beam comprising opposing regions and a first coupling feature disposed between the opposing regions. The first face frame may also comprise a first pair of posts that each comprise a first end and a second end. The first end of each of the first pair of posts may be coupled to the opposing ends of the first upper beam. The first face frame may also comprise a first lower beam extending between and connecting the second ends of the first pair of posts. The first face frame may further comprise a first attachment element at least partially disposed within the first face frame, wherein the first coupling feature and the first attachment element may define a first coupling height. The surgical helmet assembly may further comprise a second face frame configured to be removably coupled to the surgical helmet. The second face frame may comprise a second upper beam comprising opposing regions and a second coupling feature disposed between the opposing regions. The second face frame may also comprise a second pair of posts that each comprise a first end and a second end. The first end of each of the second pair of posts may be coupled to the opposing ends of the second upper beam. The second face frame may also comprise a second lower beam extending between and connecting the second ends of the second pair of posts. The second face frame may further comprise a second attachment element at least partially disposed within the second face frame, wherein the second coupling feature and the second attachment element defining a second coupling height;

The surgical helmet assembly may further comprise a first surgical garment. The first surgical garment may comprise a first shield having an upper portion and an opposing lower portion, a first aperture in the upper portion of the first shield, and a first coupling element disposed on the lower portion of the first shield. The first aperture and the first coupling element may define a third coupling height. The surgical helmet assembly may further comprise a second surgical garment. The second surgical garment may comprise a second shield having an upper portion and an opposing lower portion, a second aperture in the upper portion of the second shield, and a second coupling element disposed on the lower portion of the second shield. The second aperture and the second coupling element may define a fourth coupling height. The first coupling height of the first face frame may be configured to correspond to the third coupling height of the first surgical garment to allow the first surgical garment to removably couple to the first face frame. The second coupling height of the second face frame may be configured to correspond to the fourth coupling height of the second surgical garment to allow the second surgical garment to removably couple to the second face frame.

In yet another exemplary configuration, a surgical helmet assembly for use with a surgical garment including a transparent shield may comprise a surgical helmet. The surgical helmet may comprise a mounting feature disposed on a distal portion of the surgical helmet. The assembly may further comprise a face frame removably coupled to the surgical helmet. The face frame may comprise a first post and a second post laterally spaced from one another. Each of the first and second posts may comprise a first end and a second end. The face frame may further comprise a lower beam, a first upper bracket, and a second upper bracket. The lower beam may extend between the second end of each of the first and second posts. The first upper bracket may be coupled to and extend proximally from the first end of the first post. The second upper bracket may be coupled to and extend proximally from the first end of the second post. The face frame may further comprise a face frame coupler configured to operatively engage the mounting feature of the surgical helmet.

In yet another exemplary configuration, a face frame for use with a surgical helmet including a mounting feature may comprise a first post and a second post laterally spaced from one another. Each of the first and the second posts may comprise a first end and a second end. The face frame may further comprise a lower beam and a face frame coupler. The lower beam may extend between the second end of each of the first and the second posts. The face frame coupler may be positioned proximate to the first end of each of the first and the second posts such that the face frame coupler may be configured to removably engage the mounting feature of the surgical helmet to allow for removal of the face frame from the surgical helmet to reduce the weight of the surgical helmet when the face frame is not needed.

In yet another exemplary configuration, a face frame for use with a surgical helmet including a mounting feature may comprise a first post and a second post laterally spaced from one another. Each of the first and the second posts may comprise a first end and a second end. The face frame may further comprise a lower beam, a first upper bracket, and a second upper bracket. The lower beam may extend between the second end of each of the first and the second posts. The first upper bracket may be coupled to and extend proximally from the first end of the first post. The second upper bracket may be coupled to and extend proximally from the first end of the second post. The face frame may further comprise a plurality of counterweights disposed on each of the first and the second upper brackets that may be positioned proximal to the first and second posts. The plurality of counterweights may be positioned on each of the first and second upper brackets at a distance from the first and second posts sufficient to maintain sagittal position of the center of gravity of the surgical helmet when the face frame is coupled to the surgical helmet.

In yet another exemplary configuration, a surgical garment for use with a surgical helmet including a coupling member may comprise a fabric defining an opening. The surgical garment may further comprise a transparent shield disposed within the opening. The transparent shield may comprise an upper portion, a lower portion, and an attachment element. The attachment element may be coupled to the upper portion of the transparent shield and configured to removably couple with the coupling member of the surgical helmet. The surgical garment may further comprise an adjustment device coupled to the lower portion of the transparent shield, the adjustment device being positionable to vary the curvature of the lower portion of the transparent shield.

These and other configurations, features, and advantages of the present disclosure will be apparent to those skilled in the art. The present disclosure is not intended to be limited to or by these configurations, embodiments, features, and/or advantages.

BRIEF DESCRIPTION OF THE DRAWINGS

Referring now to the drawings, exemplary illustrations are shown in detail. Although the drawings represent schematic embodiments and/or exemplary configurations, the drawings are not necessarily to scale, and certain features may be exaggerated to better illustrate and explain an innovative aspect of an exemplary configuration. Furthermore, the exemplary illustrations described herein are not intended to be exhaustive or otherwise limiting or restricting to the precise form and configuration shown in the drawings and disclosed in the following detailed description.

Advantages of the present disclosure will be readily appreciated as the same becomes better understood by reference to the following detailed description when considered in connection with the accompanying drawings.

DETAILED DESCRIPTION

Maintaining a reliable barrier between a healthcare provider and a patient to prevent the exchange and/or transfer of particles or foreign material during a medical procedure or examination is of the utmost importance. During medical and surgical procedures, a healthcare provider may wear an assembly known as a surgical apparel system, such as the surgical apparel system 10 illustrated in FIG. 1A. An exemplary configuration of a surgical apparel system is disclosed in U.S. application Ser. No. 16/223,523, filed on Dec. 18, 2018, the contents of which are herein incorporated in their entirety.

Accordingly, the surgical apparel system 10 may comprise a surgical garment assembly comprising a surgical garment 12 configured for attachment to a surgical helmet 20. The surgical garment 12 is configured to provide a barrier, such as a microbial barrier, between the wearer and the surrounding environment. The barrier created by the surgical garment 12 may benefit both the wearer and the patient. The barrier provided by the surgical garment 12 may substantially eliminate the likelihood that the wearer may come into contact with fluid or solid particles of matter from the patient that may be generated during the course of a surgical procedure. The barrier may substantially prevent the transfer of any foreign particles emitted by the wearer from being transferred to the patient during the surgical procedure.

Figure 1A:
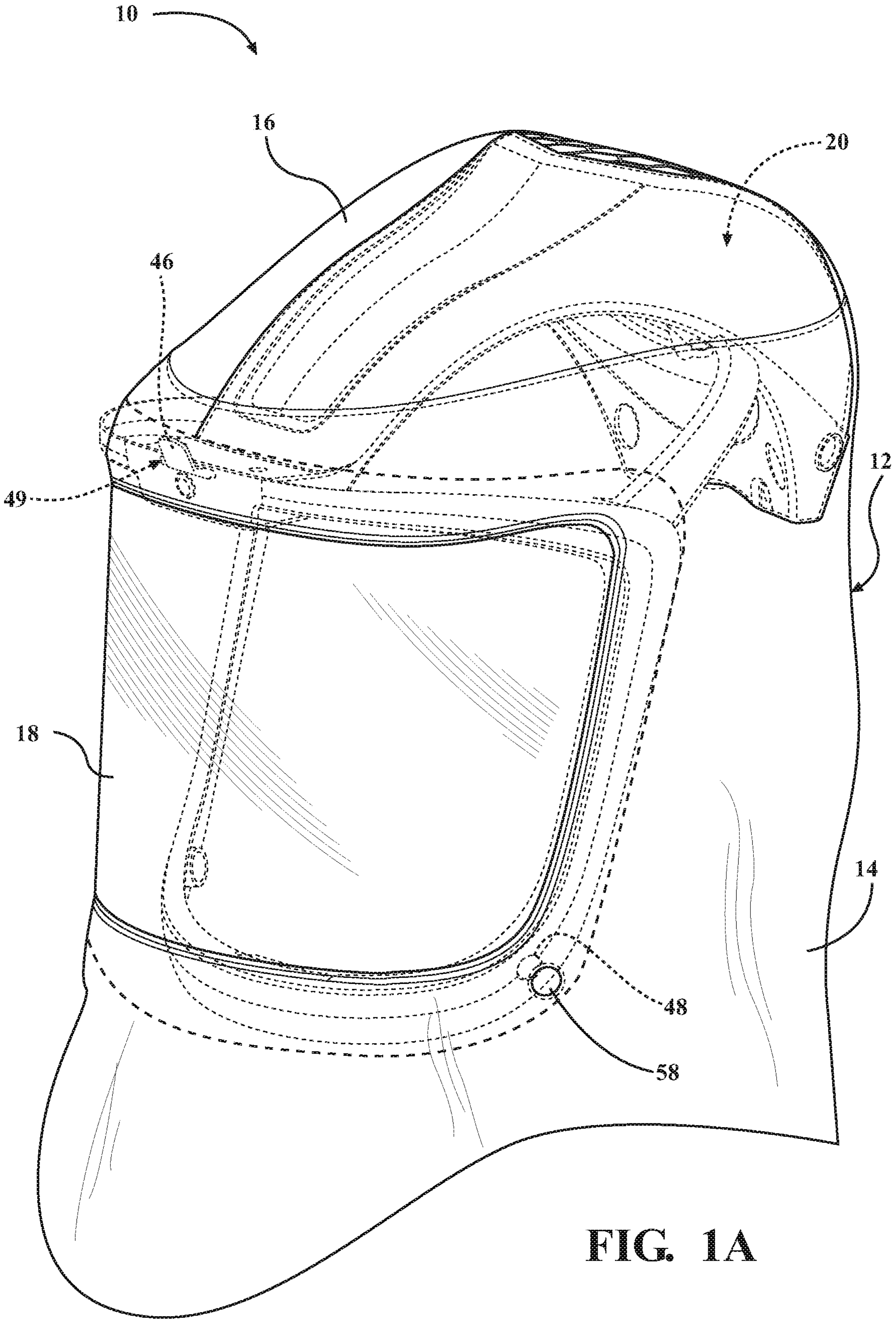
FIG. 1A is a perspective view of a surgical apparel system including a first configuration of a surgical helmet assembly and a surgical garment including a transparent shield disposed over the surgical helmet assembly, with the surgical helmet assembly shown in phantom.

Referring to FIG. 1A, the surgical garment 12 may include a surgical fabric 14 configured to cover the surgical helmet 20 and at least a portion of the head of the wearer. The surgical garment 12 may be configured as a hood, as illustrated in FIG. 1A. It will be understood that a hood 12 refers to a surgical garment 12 that covers the head and likely only extends a short distance below the neck when worn by the wearer. However, while not illustrated in the figures, it is further contemplated that the surgical garment 12 may be configured as a toga, a shirt, or a jacket. It will be understood that a toga 12 refers to a surgical garment 12 that covers the head in the same manner as a hood and extends to at least the waist when worn by the wearer.

The surgical garment 12 may be manufactured from any suitable surgical fabric 14 or combinations of fabrics to help repel and/or absorb water, debris and other contaminants. The surgical fabric 14 may include multiple layers. One such layer may be a microporous film that allows gas to pass through the fabric while still maintaining the microbial barrier. In certain configurations, the surgical fabric 14 is one that satisfies the ASTM F1670-98 standard for blood penetration resistance and/or the ASTM F1671-97B standard for viral penetration resistance. In one non-limiting example of the surgical fabric 14, the surgical fabric 14 of the surgical garment 12 has a pore size in the approximate range of 0.05 to 0.20 microns. However, other pore sizes for the surgical fabric 14 are also contemplated.

It is further contemplated that the surgical garment 12 may be constructed of multiple different fabrics coupled to one another to define the barrier. For example, the surgical garment 12 may be primarily constructed from a barrier surgical fabric 14 and a filter fabric 16. The filter fabric 16 may be more permeable, and hence more breathable, than the barrier surgical fabric 14 described above. The filter fabric 16 may be located in an area with a reduced risk of having a microbial particle cross the barrier, such as above the wearer's head or proximate to the crown of the wearer's head, and configured to aid in the circulation of air through the barrier. The barrier surgical fabric 14 may be attached to the filter fabric 16 using any suitable means, such as adhesive, sewing, welding, or a combination thereof.

As illustrated in FIG. 1A, the surgical garment 12 may further comprise a face shield 18. The face shield 18 portion of the surgical garment 12 allows the wearer to see through the barrier provided by the surgical garment 12. The face shield 18 is generally a sheet-like structure and may have a thickness of approximately 1 mm or less. The face shield 18 may be mounted and/or attached to an opening or cut-out formed in the surgical fabric 14 of the surgical garment 12. The surgical fabric 14 may be attached around the periphery or edge of the face shield 18 by sewing, snaps, hook and loop, adhesive, welding, or combinations thereof. The face shield 18 may be constructed from a transparent material, such as a polycarbonate. One such polycarbonate is sold under the trademark LEXAN™ by Sabic. The face shield 18 of the surgical garment 12 may also be tinted to protect the wearer's eyes from heightened exposure to bright lights. Furthermore, the face shield 18 may be flexible such that the face shield 18 may be curved to accommodate different head sizes, as will be described below.

The face shield 18 may further comprise an opening 49 proximate to the top portion of the face shield 18. The opening 49 may be generally rectangular-shaped. While not illustrated in the figures, it is further contemplated that the opening 49 may be configured in the shape of a circle, an oval, a square, or any similar polygonal shape. The opening 49 may also be generally centered between the opposing ends of the face shield 18, and serve as an alignment element and/or centering feature. Furthermore, the opening 49 may be positioned on the face shield 18 above the point of attachment for the surgical fabric 14 to the face shield 18, so as to ensure the surgical fabric 14 covers the opening 49 to maintain the barrier provided by the surgical garment 12 between the wearer and the environment. For example, as illustrated in FIGS. 1A and 1B, the surgical fabric 14 of the surgical garment 12 is attached to the top of the face shield 18 at a location below the opening 49 of the face shield 18.

The surgical garment 12 may also include one or more attachment elements 58 positioned about the surgical garment 12. The attachment elements 58 may also be referred to as a garment fastener or a second member. The attachment elements 58 are configured to releasably secure the surgical garment 12 to the surgical helmet 20. The attachment elements 58 may take any suitable form, and may comprise metal tacks, rivets, buttons, magnets, hook and loop, snaps, or similar types of fasteners, alone or in combination. As illustrated in FIGS. 1A and 1B, the attachment elements 58 may be mounted to the face shield 18 of the surgical garment 12 so as to extend inwardly from the wearer side of the face shield 18. While not illustrated in the figures, it is also contemplated that the attachment elements 58 may be positioned at any other position or location about the surgical garment 12, including being mounted to the barrier surgical fabric 14 and/or the filtration fabric 16. The attachment elements 58 may be mounted to the face shield 18 and/or fabric(s) 14/16 via an adhesive, rivet, snap, similar mounting device, or combination thereof.

Referring again to FIG. 1A, an example configuration of the surgical apparel system 10 is described in detail. The system 10 may include a surgical garment 12 and a surgical helmet 20. The surgical garment 12 may be configured as a hood or a toga to be placed over the surgical helmet 20. In the hood configuration illustrated in FIGS. 1A and 1B, the surgical garment 12 may be positioned over the surgical helmet 20 and configured to encompass the surgical helmet 20 and, correspondingly, the head of the person wearing the surgical apparel system 10, thereby covering the wearer's face and back of the head. Alternatively, if the surgical garment 12 were configured as a toga, the toga may be positioned over the surgical helmet 20 and configured to encompass the surgical helmet 20 and, correspondingly, the head, arms, shoulders, and torso of the person wearing the surgical apparel system 10. To place the surgical garment 12 over the surgical helmet 20, the surgical garment 12 will typically be turned inside out as the face shield 18 is aligned and affixed to the surgical helmet 20 in the manner described below. Once the face shield 18 is positioned relative to the surgical helmet 20, the remainder of the surgical fabric 14 will typically be pulled over the wearer's head to cover the exposed components of the surgical helmet 20 and the wearer's head.

Figure 1B:
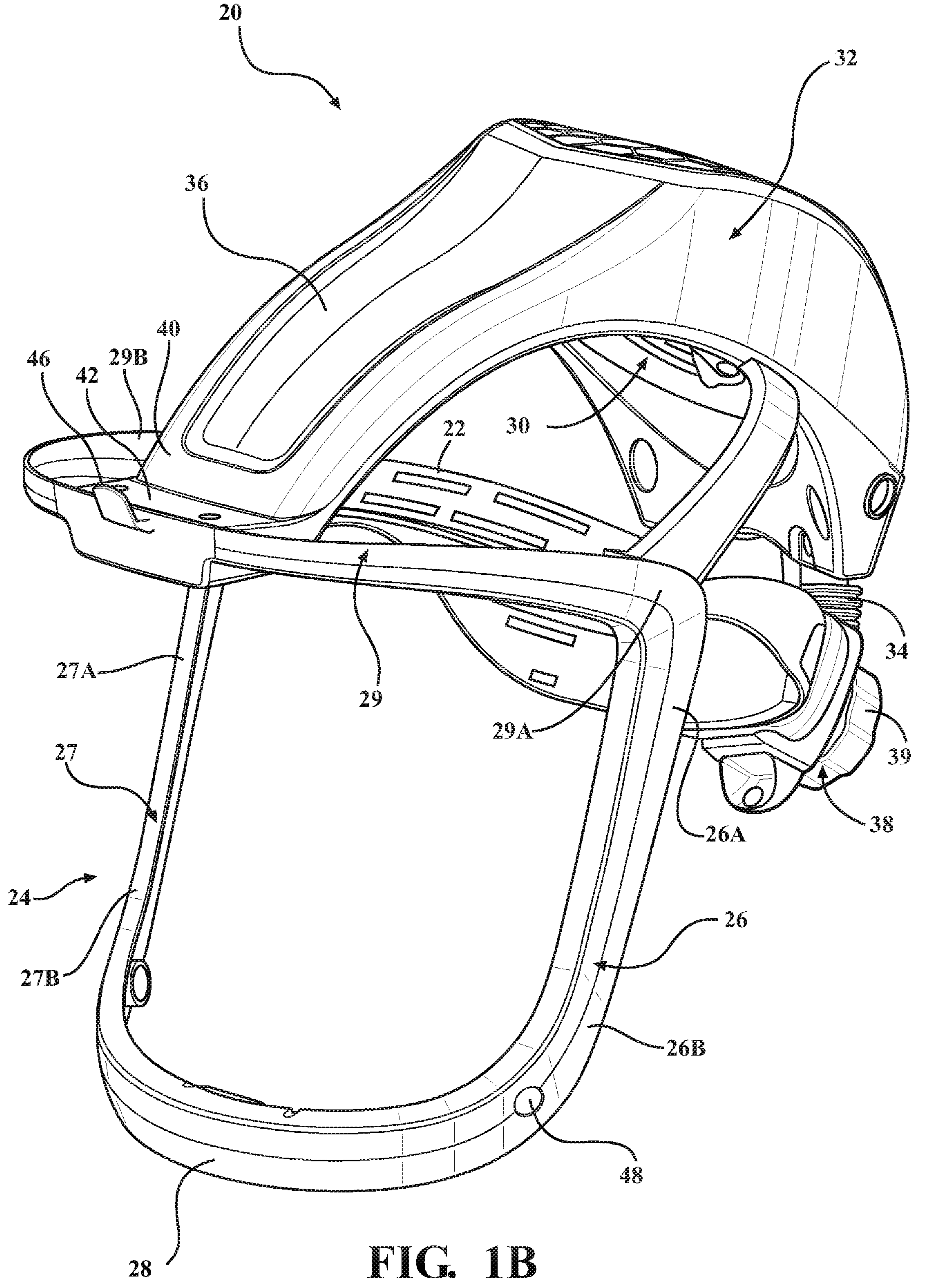
FIG. 1B is a perspective view of the first configuration of the surgical helmet assembly of the surgical apparel system of FIG. 1A.
Figure 2A:
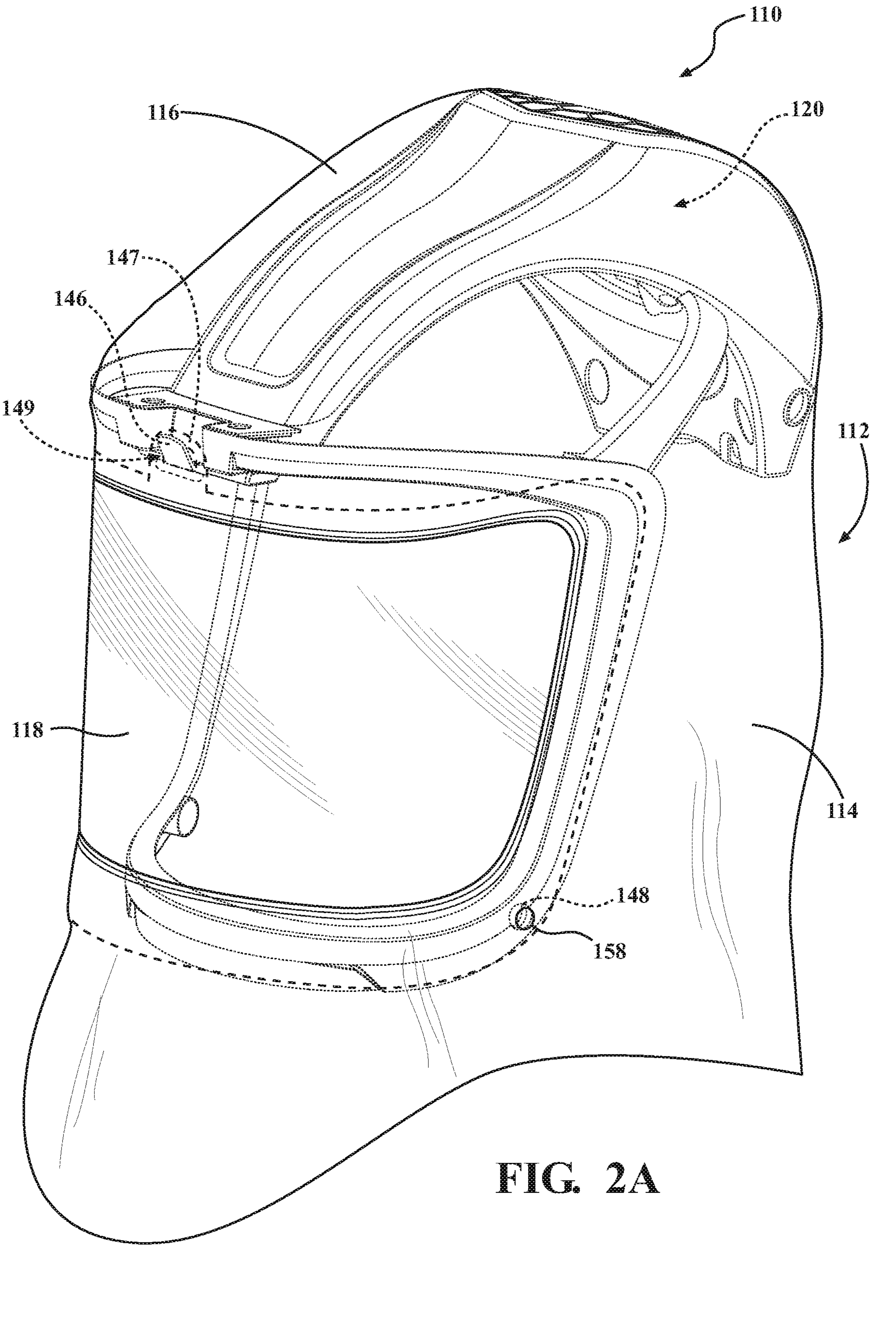
FIG. 2A is a perspective view of a surgical apparel system including a second configuration of a surgical helmet assembly and a surgical garment including a transparent shield disposed over the surgical helmet assembly, with the surgical helmet assembly shown in phantom.
Figure 2B:
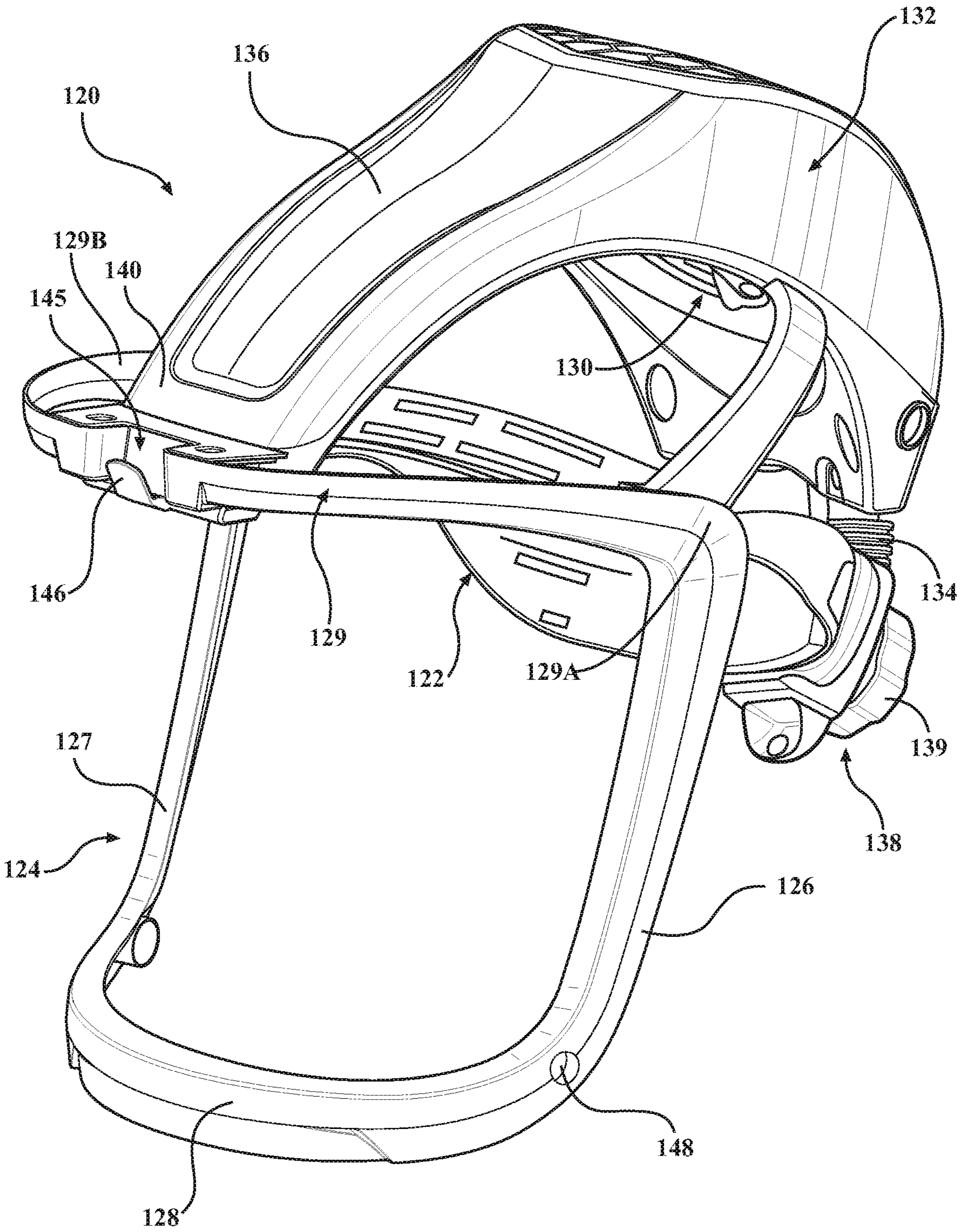
FIG. 2B is a perspective view of the second configuration of the surgical helmet assembly of the surgical apparel system of FIG. 2A.

Referring to FIG. 1B, an example configuration of the surgical helmet 20 that may be utilized as part of the surgical apparel system 10 is illustrated. The surgical helmet 20 in FIGS. 2A and 2B includes a headband 22. The headband 22 may be configured to encircle the wearer's head and support the surgical helmet 20. The headband 22 may be constructed from a generally flexible or pliable material, allowing the headband 22 to conform to the general shape of the wearer's head. The headband 22 may comprise a headband control assembly 38 configured to adjust the size/shape of the headband 22. The headband control assembly 38 may comprise a control member 39 that is manipulatable by the wearer to adjust the size of the headband 22. For example, as illustrated in FIGS. 2A and 2B, the control member 39 may comprise a rotatable knob or lever. When the wearer rotates the control member 39 in one direction, the headband control assembly 38 may be configured to reduce the size, i.e., the circumference, of the headband 22. Alternatively, when the wearer rotates the control member 39 in the opposite direction, the headband control assembly 38 may be configured to increase the size, i.e., the circumference, of the headband 22. This allows for the headband 22 of the surgical helmet 20 to be adjusted and/or customized to securely fit on a particular individual's head irrespective of the individual's head size and/or shape.

The surgical helmet 20 further includes a shell 32 that is supported by and located above the headband 22. The shell 32 may be configured in an arcuate shape to fit over the head of the individual wearing the surgical apparel system 10. Other helmet designs are contemplated. Many portions of the shell 32 may be formed to define voids, or open interior spaces. For example, the shell 32 may comprise a center void. The center void may be located toward the rear of the shell 32. There may be an intake opening or aperture in the top portion of the shell 32 to provide access to the center void. The shell 32 may also include additional voids, such as a front void proximate to the front of the shell 32 and a rear void proximate to the rear of the shell 32. The additional voids may be configured to form duct-like structures or passageways within the shell 32. The additional voids may even be interconnected to the center void.

The surgical helmet 20 may include one or more electrically-powered peripheral devices 30, including but not limited to a ventilation assembly, a light, a camera, a microphone or other communication device, a cooling device, or combinations thereof. These devices may be mounted to and/or attached at various locations and orientations relative to the surgical helmet 20. Each of the peripheral devices 30 may be configured to receive commands that affect the operating state of the corresponding peripheral device 30. For example, each of the peripheral devices 30 can receive on/off commands. Alternatively, the peripheral devices 30 may receive commands that change one or more settings of the peripheral devices 30. Such configurations allow the wearer of the surgical helmet 20 to control the operating state of the various peripheral devices 30 during the surgical procedure. In one specific example, when the peripheral device 30 is a ventilation assembly, the ventilation assembly may be configured to receive various commands to control the actuation and/or adjust the speed of the fan in the ventilation assembly. Alternatively, when the peripheral device 30 is a cooling device, the cooling device may be configured to receive commands to control the intensity of the cooling output provided by the cooling strip. When the peripheral device 30 is a microphone, the microphone may be configured to receive commands to control the volume of the audible signal produced by the microphone. When the peripheral device 30 is a light, the light may be configured to receive commands to control the direction and/or intensity of light emitted. The peripheral devices 30 may of course be configured to be responsive to other types of commands that control the operation of the peripheral devices 30.

Wearing the surgical apparel system 10, including the surgical garment 12, over a wearer's head can inevitably result in the buildup of carbon dioxide and increased temperatures within the surgical garment 12 as a result of the wearer's normal breathing. An increase in temperature underneath the surgical garment 12 can also result in the buildup of water vapor on the wearer and/or the face shield 18, resulting in the wearer's view being obstructed. In order to prevent these undesirable effects, the surgical helmet 20 of the surgical apparel system 10 may be configured for the attachment and/or inclusion of one or more peripheral devices 30 described above, such as the ventilation assembly, the cooling device, etc. Certain features of the surgical helmet 20, the peripheral devices 30, and the surgical garment 12 may be found in one or more of the following U.S. Patents, which are hereby incorporated by reference: U.S. Pat. Nos. 1,481,019; 1,622,311; 1,973,677; 7,735,156; 7,752,682; 8,234,722; 8,282,234; 8,407,818; 8,819,869; and 9,173,437.

The ventilation assembly illustrated in FIG. 1B is one example of a peripheral device 30 that may be incorporated into the surgical helmet 20 of the surgical apparel system 10. While the ventilation assembly is shown as an integral component of the surgical helmet 20, it should be appreciated that each of the other peripheral devices 30 described above may be either an integral component of the surgical helmet 20, or may be removably coupled to the surgical helmet 20. The surgical helmet 20 illustrated in FIG. 1B comprises the ventilation assembly positioned within the center void of the shell 32. The ventilation assembly may include a fan blade, impeller, propeller, fan wheel, or similar blade mechanism configured to induce air movement. The blade may be coupled to a motor configured to rotate the blade when energized by a power source. When the blade is actuated, the ventilation assembly is configured to draw air into the center void of the shell 32 through the intake opening in the top of the shell 32. The additional voids of the shell 32 may be connected to the center void and serve as ducts for dispersing the air drawn into the center void.

The exemplary ventilation assembly 30 may include a front bellows 36 or duct-like structure that extends forward from the front void in the front of the shell 32 and connects to a front nozzle 40. The front nozzle 40 may be mounted to the front of the headband 22. The ventilation assembly 30 may further include a rear bellows 34 or duct-like structure that extends from the rear void in the rear of the shell 32 to a rear nozzle (not shown in figures). The rear nozzle may be mounted to the back of the headband 22. When the ventilation assembly 30 of the surgical helmet 20 is actuated, the fan draws air in through the surgical garment 12 into the opening in the top of the shell 32 and disperses the air outward through the additional voids. For example, the ventilation assembly 30 may be configured to draw air through the filter fabric 16 of the surgical garment 12. The air is then discharged through front bellows 36 and rear bellows 34, respectively. The air that flows through the front bellows 36 is discharged through the front nozzle 40 in front of the face of the wearer. The air discharged through the front nozzle 40 may be discharged against the face shield 18 and/or on the face of the wearer. The air that flows through the rear bellows 34 is discharged through the rear nozzle. The rear nozzle is positioned so as to open below the headband 22. The air discharged from the rear nozzle can be discharged against the back of the neck of the wearer.

The front nozzle 40 of the surgical helmet 20 may include a block 42. The block 42 is the portion of the front nozzle 40 that is mounted to the headband 22 or a component of the surgical helmet 20 integral with the headband 22. In the illustrated version of the system 10, the block 42 is mounted to a strap that is part of the headband 22.

The surgical helmet 20 may include a face frame 24 that is coupled to the front nozzle 40 or block 42 of the surgical helmet 20. The face frame 24 may comprise an upper beam 29 with opposing lateral portions 29A, 29B. The upper beam 29 may be positioned to generally span across the forehead of the wearer of the surgical helmet 20. The upper beam 29 may also comprise coupling feature 146, such as a protrusion 46. The protrusion 46 may be configured to extend distally outward and upward from the upper beam 29. The protrusion 46 may be positioned proximate the center of the upper beam 29. While the exemplary configuration of the upper beam 29 illustrated in FIGS. 1A and 1B only includes a single protrusion 46, it is further contemplated that the upper beam 29 may comprise multiple protrusions 46 spaced along the length of the upper beam 29.

The face frame 24 may comprise a first post 26 and a second post 27. Each of the first post 26 and second post 27 may further comprise an upper portion 26A, 27A, and a lower portion 26B, 27B, respectively. The upper portion 26A, 27A of each of the first post 26 and second post 27 may be coupled to the opposing lateral portions 29A, 29B of the upper beam of the face frame 24 and extend in a generally downward direction from the upper beam 29. The first post 26 and second post 27 of the face frame 24 may be constructed from a generally flexible or pliable material.

A lower beam 28 may extend between the opposed lower portions 26B, 27B of the first and second posts 26, 27. The face frame 24 is formed so that the lower beam 28 is located below and slightly forward of the chin of the person wearing the surgical helmet 20. The lower beam 28 may be bowed outwardly from the opposed lower portions 26B, 27B of the posts 26, 27. The face frame 24 may extend outwardly from the front nozzle 40 and/or block 42 of the surgical helmet 20 such that the face frame 24 is positioned forward of and generally encircles the face of the wearer when the surgical helmet 20 is secured to the wearer's head.

A plurality of coupling members 48, such as magnets, hook and loop, metal rivets, snaps, or similar type fasteners, may be mounted to the face frame 24 and configured to align and/or attach to the face shield 18 of the surgical garment 12. Each coupling member 48 may be positioned on the face frame 24 proximate to the opposed free ends of the first and second posts 26A, 26B and/or adjacent opposing ends of the lower beam 28. Alternatively, the coupling members 48 of the surgical helmet 20 could be arranged or otherwise configured in any suitable way to cooperate with the complementary attachment elements 58 of the face shield 18, as described above, to releasably secure the surgical garment 12 to the surgical helmet 20. For example, the protrusion 46 extending from the front nozzle 40 may be replaced with a coupling member 48 configured to cooperate with a complementary attachment element 58 on the surgical garment 12.

As described above, in one configuration of the system 10, the face shield 18 of the surgical garment 12 may comprise an opening 49 proximate the top edge of the face shield 18. The opening 49 in the face shield 18 may be configured to receive the protrusion 46 protruding from the front nozzle 40 of the surgical helmet 20 or from another portion of the surgical helmet. The opening 49 and the protrusion 46 may be configured to releasably secure the face shield 18 and/or surgical garment 12 to the surgical helmet 20. Furthermore, the opening 49 and the protrusion 46 may serve as an alignment feature configured to align the face shield 18 with the surgical helmet 20, such that the face shield 18 will be positioned in front of the wearer's face when the system 10 is worn. While not shown in the figures, it should be understood that it has been contemplated that the face shield 18 may include additional openings 49 spaced laterally across the upper portion of the face shield 18 to provide points of attachment between the face shield 18 and surgical helmet 20, and the surgical helmet 20 may be configured to include additional protrusions 46 correspondingly arranged relative to the additional openings 49 of the face shield 18. For example, a plurality of protrusions 46 may extend from the headband 22 and/or front nozzle 40, and the face shield 18 may be configured to include complementary openings 49 laterally spaced across the upper portion of the face shield 18 that releasably engage the plurality of protrusions 46 when attaching the surgical garment 12 to the surgical helmet 20.

Furthermore, as described above, the face shield 18 and/or surgical fabric 14 may comprise a plurality of attachment elements 58 arranged about the surgical garment 12. In the example configuration of the surgical garment 12 that is illustrated in FIG. 1A, the attachment elements 58 of the surgical garment 12 may be arranged and/or positioned on the face shield 18 so that, when the protrusion 46 of the surgical helmet 20 is seated in the opening 49 of the face shield 18 and the face shield 18 is flexed around the face frame 24, each of the garment attachment elements 58 will abut and latch to a complementary magnet or other suitable coupling member 48 on the surgical helmet 20. Referring to the example configuration of the system 10 illustrated in FIG. 1A, the surgical garment 12 comprises the opening 49 proximate to the top portion of the face shield 18 and a plurality of attachment elements 58 are positioned about the periphery of the face shield 18. The attachment elements 58 may be spaced about the periphery of the face shield 18 to matingly engage complementary coupling members 48, such as magnets, on the face frame 24 of the surgical helmet 20. While the surgical garment 12 illustrated in the figures comprises the opening 49, it is also contemplated that the opening 49 is not required in certain configurations. Alternatively, the attachment elements 58 may also be configured to couple and/or align the face shield 18 with the surgical helmet 20.

In operation, once the opening 49 in the face shield 18 is seated on the protrusion 46 of the surgical helmet 20, the face shield 18 may then be flexed around the surgical helmet 20 and/or face frame 24 to matingly engage the attachment elements 58 spaced about the periphery of the face shield 18 with the complementary coupling members 48 on the face frame 24 of the surgical helmet 20. The size of the face shield 18, as well as the spacing and/or position of the attachment elements 58 on the surgical garment 12 may be changed to alter the curvature and/or shape of the face shield 18 when attached to the surgical helmet 20. For example, the attachment elements 58 on the surgical garment 12 may be spaced closer together to reduce the curvature of the face shield 18 when it is attached to the surgical helmet 20. Alternatively, the attachment elements 58 on the surgical garment 12 may be spaced farther apart to increase the curvature of the face shield 18 when it is attached to the surgical helmet 20. Furthermore, the curvature and/or arc of the face shield 18 may also be modified or adapted by the size and/or shape of the attachment element(s) 58 of the face shield 18 and/or the corresponding coupling member(s) 48 of the surgical helmet 20. The size of the protrusion 46 may be similarly adapted to manipulate the curvature or arc of the face shield 18. Altering the curvature of the face shield 18 may help to reduce glare or provide an expanded/reduced peripheral view through the face shield 18. While not illustrated in the figures, it should be understood that alternative configurations for securing the surgical garment 12 and/or face shield 18 to the surgical helmet 20 are also contemplated. For example, in one alternative configuration, the transparent face shield 18 may not include a rectangular opening 49, but instead comprise only a plurality of attachment elements 58, such as rivets or magnets, spaced about the transparent face shield 18 and/or surgical garment 12 and configured to couple to complementary magnets or similar coupling members 48 spaced about the face frame 24 of the surgical helmet 20. For example, the complementary magnets or similar coupling members 48 may be secured to the shell 32, headband 22, and/or face frame 24. The surgical garment 12 and the surgical helmet 20 of the surgical apparel system 10 described above are typically removably coupled to allow for disposal of the surgical garment 12 and reuse of the surgical helmet 20 following a procedure or exam.

Referring to FIGS. 2A and 2B, an alternative configuration of a surgical apparel system 110 is illustrated. It should be appreciated that the various configurations of the surgical apparel system 110 may include similar elements that may be identified by reference numerals that are incremented by 100. It should be understood that those elements including reference numerals which are incremented by 100 can have the same features as described above. The surgical apparel system 110 may comprise a surgical garment assembly comprising a surgical garment 112 configured for attachment to a second configuration of a surgical helmet 120. As described above, the surgical garment 112 may be configured to provide a barrier, such as a microbial barrier, between the wearer and the surrounding environment. The barrier created by the surgical garment 112 may benefit both the wearer and the patient. The barrier provided by the surgical garment 112 may substantially eliminate the likelihood that the wearer may come into contact with fluid or solid particles of matter from the patient that may be generated during the course of a surgical procedure. The barrier may substantially prevent the transfer of any foreign particles emitted by the wearer from being transferred to the patient during the surgical procedure.

The second configuration of the surgical apparel system 110 may comprise a surgical garment assembly comprising a surgical garment 112 configured for attachment to a surgical helmet 120. As described above, the surgical garment 112 may provide a barrier, such as a microbial barrier, between the wearer and the surrounding environment. The barrier created by the surgical garment 112 may benefit both the wearer and the patient. The barrier provided by the surgical garment 112 may substantially eliminate the likelihood that the wearer may come into contact with fluid or solid particles of matter from the patient that may be generated during the course of a surgical procedure. The barrier may substantially prevent the transfer of any foreign particles emitted by the wearer from being transferred to the patient during the surgical procedure.

Referring to FIG. 2A, the surgical garment 112 may include a fabric 114 configured to cover the surgical helmet 120 and at least a portion of the head of the wearer. The surgical garment 112 may be configured as a hood, toga, or other similar medical garment, similar to any of the configurations of the surgical apparel system 10 described above. The surgical garment 112 may further comprise a transparent shield 118, also referred to as a transparent face shield, and one or more attachment elements 158 positioned about the surgical garment 112. The attachment elements 158 may also be referred to as a second member or garment fastener. The attachment elements 158 may serve as an alignment element configured to removably couple the surgical garment 112 to the surgical helmet 120. Furthermore, the attachment elements 158 may be positioned proximate the outer perimeter of the transparent shield 118 such that the fabric 114 covers the attachment elements 158. This may serve to ensure the fabric 114 covers the attachment elements 158 to maintain the barrier provided by the surgical garment 112 between the wearer and the environment.

The attachment elements 158 may comprise a ferromagnetic material. In other words, the attachment element may comprise iron, nickel, cobalt, gadolinium, dysprosium, or alloys thereof, or combinations thereof. It is contemplated that the entirety of the attachment element 158 consists of the ferromagnetic material. It is also contemplated that the attachment element 158 comprises both ferromagnetic material and diamagnetic material. For example, the attachment elements 158 may comprise a diamagnetic material which has been coated with a ferromagnetic material. Alternatively, the attachment elements 158 may be formed from a ferromagnetic material as a core, and then coated with a plastic or similar non-magnetic coating configured to provide a sterile and/or wear-resistant surface. Other arrangements of the diamagnetic and magnetic material are contemplated for the attachment element 158. It should be appreciated that the surgical garment 112, and all components thereof, may be configured similarly and/or comprise the features of the surgical garment(s) 12 described above.

The surgical garment 112 may also comprise a tab 147. The tab 147 may be disposed on the wearer side or interior of the surgical garment 112. The tab 147 may comprise a pair of opposing edges and define an opening 149. As illustrated in FIG. 2A, the tab 147 may be formed as a portion of the transparent shield 118. The tab 147 may define at least a portion of the opening 149, with a portion of the opening 149 also being defined by the transparent shield 118. It is also contemplated that the opening 149 may be entirely formed or defined within the tab 147.

Alternatively, while not illustrate in the figures, it is further contemplated that the tab 147 may be formed separate from the transparent shield 118. In this configuration, the tab 147 may be coupled directly to the interior surface of the fabric 114 of the surgical garment 112. The tab 147 may be formed from a plastic similar to the transparent shield 118 and may be coupled to the surgical garment 112 by an epoxy, glue, or similar adhesive. Alternatively, the tab 147 may be formed from a fabric similar to the fabric 114 of the surgical garment 112, wherein the tab 147 may be sewn or coupled to the surgical garment 112 by an adhesive. Furthermore, the opening 149 may be entirely defined by the tab 147.

Similar to the system 10 described above, the configuration of the system 110 illustrated in FIGS. 2A and 2B may comprise one or more peripheral devices 130, such as a ventilation assembly. The ventilation assembly 130 illustrated in FIG. 2B, is one example of a peripheral device 130 that may be incorporated into the surgical helmet 120 of the surgical apparel system 110. While the ventilation assembly 130 is shown as an integral component of the surgical helmet 120, it should be appreciated that each of the other peripheral devices 130 described above may be either an integral component of the surgical helmet 120, or may be removably coupled to the surgical helmet 120. The surgical helmet 120 illustrated in FIG. 2B comprises the ventilation assembly 130 positioned within the void of the shell 132. The ventilation assembly 130 may include a fan blade, impeller, propeller, fan wheel, or similar blade mechanism configured to induce air movement. The blade may be coupled to a motor configured to rotate the blade when energized by a power source. When the blade is actuated, the ventilation assembly 130 is configured to draw air into the void of the shell 132 through the intake opening in the top of the shell 132. The additional voids of the shell 132 may be connected to the void and serve as ducts for dispersing the air drawn into the void to the wearer.

Referring to FIG. 2B, the surgical helmet 120 may comprise a face frame 124 that extends downwardly from the front portion of the surgical helmet 120. The face frame 124 may comprise an upper beam 129 with opposing lateral portions 129A, 129B. The upper beam may be positioned forward of the shell 132 of the surgical helmet 120 and configured to extend across the front of the surgical helmet 120. The upper beam 129 may further comprise an alignment channel 145 that is defined by a pair of laterally spaced-apart sidewalls and a proximal surface that is positioned proximally from the distal surface of the upper beam 129. The alignment channel 145 is configured to receive a tab 147 disposed on the interior of the surgical garment 112 to align and/or orient the surgical garment 112 relative to the surgical helmet 120. As described above, the tab 147 may be integrally formed with and configured to extend from the transparent shield 118. Alternatively, the tab 147 may be formed independent of the transparent shield 118, wherein the tab 147 is configured to be coupled to the fabric 114 on the interior of the surgical garment 112. However, other configurations are contemplated. The spaced-apart sidewalls of the alignment channel 145 should be spaced apart a distance greater than the width of the tab 147 to allow the tab 147 to be positioned between the spaced-apart side walls.

The upper beam 129 may further comprise a coupling feature 146, such as a protrusion, configured to removably engage the transparent shield 118 and/or surgical garment 112. The coupling feature 146 may comprise a protrusion, magnetic member, ferromagnetic member, hook and loop, or similar coupling mechanism configured to releasably engage the opening 149 in the tab 147 to align and/or couple the surgical garment 112 to the surgical helmet 120. For example, as illustrated in FIGS. 2A and 2B, the coupling feature 146 is realized as a protrusion 146 extending from the alignment channel 145 of the upper beam 129. Here, the upper beam 129 comprises the alignment channel 145 described above, and the coupling feature 146 may be disposed at least partially within the alignment channel 145. The coupling feature 146 may be positioned within the alignment channel 145 such that the top of the upper most surface of the coupling feature 146 is arranged or otherwise positioned below the top of the alignment channel 145 and/or the top surface of the upper beam 129. The combination of the spaced-apart sidewalls of the alignment channel 145 and the coupling feature 146 may serve to align and/or orient the transparent shield 118 and/or the surgical garment 112 relative to the surgical helmet 120. More specifically, the spaced-apart sidewalls of the alignment channel 145 may serve to guide the tab 147 such that the opening 149 in the tab 147 is directed into engagement with the coupling feature 146 as the surgical garment 112 is placed over the surgical helmet 120.

The face frame 124 may comprise a first post 126 and a second post 127. The first and second posts 126, 127 may be coupled to the upper beam 129, wherein the upper beam 129 is configured to extend across the front of the surgical helmet 120. For example, as illustrated in FIG. 2B, the first and second posts 126, 127 may be connected to opposing ends 129A, 129B of the upper beam 129. The face frame 124 may be constructed from a generally flexible or pliable material.

The face frame 124 may further comprise a lower beam 128 that may extend between the opposed free ends of the first and second posts 126, 127. The face frame 124 is formed so that the lower beam 128 is located below and slightly forward of the chin of the person wearing the surgical helmet 120. The lower beam 128 may be bowed outwardly from the free ends of the posts 126, 127. The face frame 124 may extend outwardly from the upper beam 129 such that the face frame 124 is positioned forward of and generally encircles the face of the wearer when the surgical helmet 120 is secured to the wearer's head. Collectively, the combination of the upper beam 129, the first and second posts 126, 127, and the lower beam 128 may also be referred to as a chin bar, as they generally define an opening positioned in front of the wearer's face and extend below the wearer's chin when the surgical helmet is positioned on top of the wearer's head.

A plurality of coupling members 148 may be mounted to or within the face frame 124. The coupling members 148 comprise magnetic material and are configured to align and/or attach the transparent shield 118 of the surgical garment 112 to the surgical helmet 120. Each coupling member 148 may be positioned on the face frame 124 proximate to the opposed first and second posts 126, 127 and/or adjacent opposing ends of the lower beam 128. Alternatively, the coupling members 148 of the surgical helmet 120 could be arranged or otherwise configured in any suitable way to cooperate with the complementary attachment elements 158 of the surgical garment 112 to releasably secure the surgical garment 112 to the surgical helmet 120. For example, as illustrated in FIG. 2B, the coupling member 148 may be positioned on the face frame 124 at opposing ends of the lower beam 128 proximate where each of the posts 126, 127 connects to the lower beam 128. While the exemplary configuration of the surgical helmet 120 illustrated in FIG. 2B utilizes two coupling members 148, it is contemplated that the surgical helmet 120 may be configured such that the face frame 124 comprises a single coupling member 148 or, in other configurations, three or more coupling members 148 may be spaced about the face frame 124. It is contemplated that other types of coupling members 148 may be used in place of and/or in addition to those comprising magnetic materials, such as with hook and loop fasteners, snaps, coupling members comprising ferromagnetic materials, or similar type fasteners. Other configurations are contemplated.

Referring to FIG. 2B, an exemplary configuration of a coupling member 148 positioned within the face frame 124 is illustrated. The coupling member 148 may comprise a distal surface. The face frame 124 may comprise a recess configured to receive the coupling feature 148. For example, as illustrated in FIG. 2B, the coupling member 148 may be positioned within the recess of the face frame 124, such that the distal surface of the coupling member 148 is positioned proximally to a distal surface of the face frame 124.

The coupling member 148 may comprise one of a ferromagnetic material or a magnetic material. This may include the coupling member 148 being formed of or constructed from a ferromagnetic material or a magnetic material. It is also contemplated that only a portion of the coupling member 148 comprises a ferromagnetic material or a magnetic material. For example, the coupling member 148 may be injection-molded plastic and coated with a ferromagnetic material or magnetic material. Alternatively, the coupling member 148 may be formed from a ferromagnetic material or magnetic material, and then coated with a plastic or similar coating to provide a sterile and/or wear-resistant surface. It is also contemplated that a magnet may be "over-molded" with a plastic material to define the coupling member 148. Generally, the coupling member 148 may comprise the other of the ferromagnetic material or magnetic material relative to the attachment element(s) 158 of the surgical garment 112 in order to create a magnetic attraction between the coupling member(s) 148 and the attachment element(s) 158 to couple the surgical garment 112 to the surgical helmet 120.

Similar to the transparent face shields 18, described above, the transparent shield 118 may comprise a portion of the surgical garment 112 that allows the wearer to see through the barrier provided by the surgical garment 112. The transparent shield 118 is generally a sheet-like structure and may have a thickness of approximately 1 mm or less. The transparent shield 118 may be mounted and/or attached to an opening or cut-out formed in the surgical fabric 114 of the surgical garment 112. The surgical fabric 114 may be attached around the periphery or edge of the transparent shield 118 by sewing, snaps, hook and loop, adhesive, welding, or combinations thereof. The transparent shield 118 may be constructed from a transparent material, such as a polycarbonate. One such polycarbonate is sold under the trademark LEXAN™ by Sabic. The transparent shield 118 of the surgical garment 112 may also be tinted to protect the wearer's eyes from heightened exposure to bright lights. Furthermore, the transparent shield 118 may be flexible such that the transparent shield 118 may be curved to accommodate different head sizes, as will be described below.

The transparent shield 118 may further comprise the tab 147 described above, with regard to the surgical garment 112. The tab 147 may extend from the top portion of the transparent shield 118 and may define at least a portion of the opening 149. The opening 149 may be generally rectangular-shaped. While not illustrated in the figures, it is further contemplated that the opening 149 may be configured in the shape of a circle, an oval, a square, or any similar polygonal shape. The opening 149 may also be generally centered between the opposing ends of the transparent shield 118 and serve as an alignment element configured to interact with the alignment channel 145 of the helmet 120 described above. Furthermore, the opening 149 may be positioned on the transparent shield 118 above the point of attachment for the surgical fabric 114 to the transparent shield 118, so as to ensure the surgical fabric 114 covers the opening 149 to maintain the barrier provided by the surgical garment 112 between the wearer and the environment. While not illustrated in the figures, as previously discussed, the tab 147 may be formed separate from the transparent shield 118 and coupled directly to the interior of the surgical garment 112. Aside from being formed separate from the transparent shield 118, the tab 147 may still comprise all of the same or similar features of the tab 147 that is formed as part of the transparent shield 118. The transparent shield 118 may further comprise one or more apertures 149 positioned in the bottom portion of the transparent shield 118 and be configured to couple the attachment elements 158 to the transparent shield 118.

Figure 3:
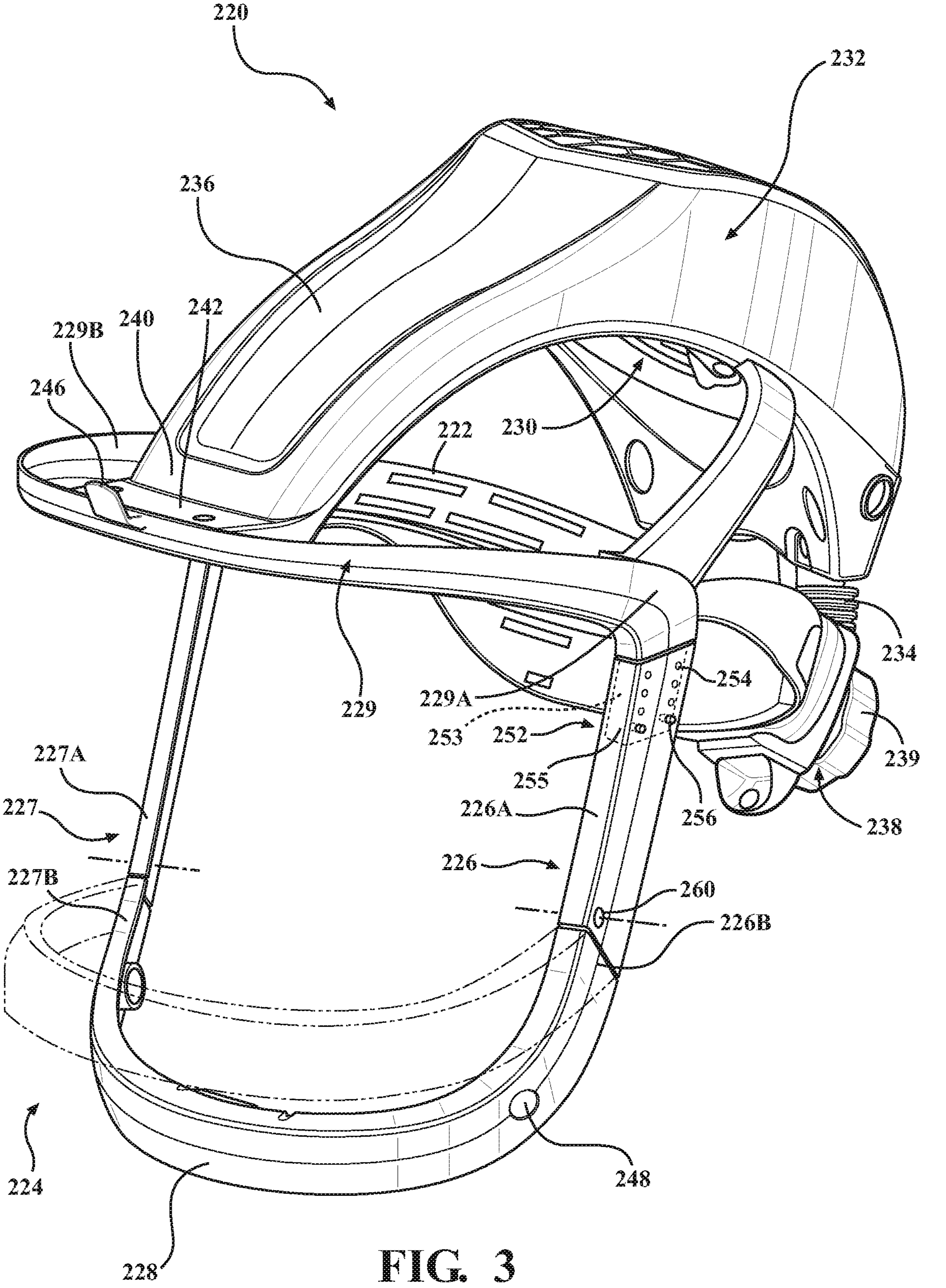
FIG. 3 is a perspective view of a third configuration of a surgical helmet assembly including a first reconfigurable face frame.

Referring to FIG. 3, a third configuration of a surgical helmet 220 is illustrated. Either of the surgical garments 12, 112 described above may be utilized with the surgical helmet 220 illustrated in FIG. 3. Furthermore, it should be appreciated that the various configurations of the surgical helmet 220 may include similar elements that may be identified by reference numerals that are incremented by 100. It should be understood that those elements including reference numerals which are incremented by 100 can have the same features as described above and/or below with regard to other configurations of the surgical helmet.

Similar to the configurations of the surgical helmet 20, 120 described above, the third configuration of the surgical helmet 220 may comprise one or more peripheral devices 230, such as a ventilation assembly. The surgical helmet 220 illustrated in FIG. 3 comprises a ventilation assembly 230 positioned within the center void of a shell 232 of the surgical helmet 220. The ventilation assembly 230 may include a fan blade, impeller, propeller, fan wheel, or similar blade mechanism configured to induce air movement. When the blade is actuated, the ventilation assembly 230 is configured to draw air into the center void of the shell 232 through the intake opening in the top of the shell 232. The ventilation assembly 230 may include a front bellows 236 that extends forward from the front void in the front of the shell 232 and connects to a front nozzle 240. The front nozzle 240 may be mounted to the front of the headband 222. The ventilation assembly 230 may further include a rear bellows 234 that extends from the rear void in the rear of the shell 232 to a rear nozzle (not shown in the figures). The rear nozzle may be mounted to the back of the headband 222. When the ventilation assembly 230 of the surgical helmet 220 is actuated, the fan draws air into the shell 232 and disperses the air outward through front bellows 236 and rear bellows 234 to the front 240 and rear nozzles, respectively.

The front nozzle 240 of the surgical helmet 220 may include a block 242. The block 242 is the portion of the front nozzle 240 that is mounted to the headband 222 or a component of the surgical helmet 220 integral with the headband 222.

The surgical helmet 220 may include a face frame 224 that is coupled to the front nozzle 240 or block 242 of the surgical helmet 220. The face frame 224 may comprise an upper beam 229 with opposing lateral portions 229A, 229B. The upper beam 229 may be positioned to generally span across the forehead of the wearer of the surgical helmet 220. The upper beam may also comprise a protrusion 246. The protrusion 246 may be configured to extend distally outward and upward from the upper beam 229. The protrusion 246 may be positioned proximate the center of the upper beam 229. While the exemplary configuration of the upper beam 229 illustrated in FIG. 3 only includes a single protrusion 246, it is further contemplated that the upper beam 229 may comprise multiple protrusions 246 spaced along the length of the upper beam 229.

The face frame 224 may comprise a first post 226 and a second post 227. Each of the first post 226 and second post 227 may further comprise an upper portion 226A, 227A, and a lower portion 226B, 227B, respectively. The upper portion 226A, 227A of each of the first post 226 and second post 227 may be coupled to the opposing lateral portions 229A, 229B of the upper beam 229 of the face frame 224 and extend in a generally downward direction from the upper beam 229. The first post 226 and second post 227 of the face frame 224 may be constructed from a generally flexible or pliable material.

A lower beam 228 may extend between the opposed lower portions 226B, 227B of the first and second posts 226, 227. The face frame 224 is formed so that the lower beam 228 is located below and slightly forward of the chin of the person wearing the surgical helmet 220. The lower beam 228 may be bowed outwardly from the opposed lower portions 226B, 227B of the posts 226, 227. The face frame 224 may extend outwardly from the front nozzle 240 and/or block 242 of the surgical helmet 220 such that the face frame 224 is positioned forward of and generally encircles the face of the wearer when the surgical helmet 220 is secured to the wearer's head.

A plurality of coupling members 248, such as magnets, hook and loop, metal rivets, snaps, or similar type fasteners, may be mounted to the face frame 224 and configured to align and/or attach one of the transparent shields 18, 118 of the surgical garments 12, 112 described above. Each coupling member 248 may be positioned on the face frame 224 proximate to the opposed free ends 226A, 226B of the posts 226, 226 and/or adjacent opposing ends of the lower beam 228. Alternatively, the coupling members 248 of the surgical helmet 220 could be arranged or otherwise configured in any suitable way to cooperate with the complementary attachment elements 58, 158 of the transparent shield 18, 118, as described above, to releasably secure the surgical garment 12, 112 to the surgical helmet 220. For example, the protrusion 246 extending from the upper beam 229 may be replaced with a coupling member 248 configured to cooperate with a complementary attachment element 58, 158 on the surgical garment 12, 112.

The face frame 224 may further comprise a sliding mechanism 252. The sliding mechanism 252 may comprise a portion of the first post 226 and second post 227. As illustrated in FIG. 3, the sliding mechanism 252 is part of the upper portions 226A, 227A of the posts 226, 227, and is positioned proximate where the posts 226, 227 are coupled to the upper beam 229. While not illustrated in FIG. 3, it is contemplated that the sliding mechanism 252 may be positioned at any point along the posts 226, 227. For example, the sliding mechanism 252 may be formed as part of the lower portions 226B, 227B of the posts 226, 227, and may be positioned proximate where the posts 226, 227 are coupled to the lower beam 228 of the face frame 224. Alternatively, the sliding mechanism 252 may be positioned at an intermediate point along the length of the first and second posts 226, 227, between the upper beam 229 and the lower beam 228 of the face frame 224. It is contemplated that the sliding mechanism 252 may be configured and/or utilized to removably couple the upper portions 226A, 227A of the posts 226, 227 to the lower portions 226B, 227B of the posts 226, 227. It is also contemplated that the sliding mechanism 252 may be configured and/or utilized to removably couple the posts 226, 227 to the upper beam 229.

The sliding mechanism 252 may comprise an inner member 253 and an outer member 255 that slidably engage one another to alter and/or manipulate the length of the first post 226 and second post 227. For example, the sliding mechanism 252 may slide between a first position, a second position, or any intermediary position between the first and second position. When the sliding mechanism 252 is in the first position, the first post 226 and second post 227 may have a first length defining a first distance between the upper beam 229 and the lower beam 228. This may also be referred to as a first configuration of the face frame 224. Alternatively, when the sliding mechanism 252 is in the second position, the first post 226 and second post 227 may have a second length defining a second distance between the upper beam 229 and the lower beam 228. This may also be referred to as a second configuration of the face frame 224. The face frame 224 may also comprise a plurality of intermediate configurations wherein the sliding mechanism 252 is positioned at a point between the first position and the second position. This allows for the length of the face frame 224 of the surgical helmet 220 to be adjusted based on the specific size and characteristics of the individual wearing the surgical helmet. For example, an individual with a small head and/or a shorter neck may desire a shorter distance between the upper beam 229 and lower beam 228 to prevent the lower beam 228 from contacting and/or becoming ensnared on the wearer's chest. Alternatively, an individual with a larger head and/or a longer neck may desire a longer distance between the upper beam 229 and lower beam 228 to maximize viewing area provided by the transparent shield 18, 118 of the surgical garment 12, 112 that is coupled to the surgical helmet 220.

The inner member 253 and the outer member 255 of the sliding mechanism 252 may also comprise complementary features such as a recess or aperture 254 and protrusion 256 to define the various lengths of the first post 226 and second post 227. For example, the outer member 255 may comprise a plurality of apertures 254 spaced along the length of the inner member 253. The inner member 253 may then comprise at least one protrusion 256 configured to matingly engage the plurality of apertures 254 as the outer member 255 is slid along the length of the inner member 253. The protrusion 256 when engaging one of the plurality of recess 254 may be configured to create a friction fit holding the inner member 253 and outer member 255 in place relative to one another until an external force is applied to move the protrusion 256 from the current recess 254 to one of the other recesses 254 of the inner member 253. While the outer member 255 is described as having a plurality of recesses 254 and the inner member 253 as having a complementary protrusion 256, it is further contemplated that the inner member 253 may comprise the protrusion 256 and the outer member 255 may comprise the complementary plurality of apertures or recesses 254 for adjusting the sliding mechanism 252. Furthermore, while a plurality of apertures or recesses 254 and complementary protrusion 256 is described and illustrated as means of adjusting the sliding mechanism 252, other configurations of the sliding mechanism 252 are contemplated. For example, the sliding mechanism 252 may be configured as a rails system with a friction fit for adjusting the length of the first and second posts 226, 227. Alternatively, the sliding mechanism 252 may comprise a mechanical lever and stops for adjusting the length of the posts 226, 227. This list of exemplary configurations of the sliding mechanism 252 is not intended to be exhaustive.

The face frame 224 may further comprise a joint 260 defining a pivot point. The joint may also be referred to as a hinge, pivot, swivel, elbow, juncture, bracket or similar fixture capable of pivoting or rotating. The joint 260 may be positioned at any point along the length of the posts 226, 227 between the upper beam 229 and the lower beam 228. The joint 260 may define the upper portions 226A, 227A, and the lower portions 226B, 227B of the posts 226, 227, wherein the upper portions 226A, 227A are located above the joint 260 (closer to the upper beam 229) and the lower portions 226B, 227B are located below the joint 260 (closer to the lower beam 228). It is contemplated that the joint 260 may be configured and/or utilized to removably couple the upper portions 226A, 227A of the posts 226, 227 to the lower portions 226B, 227B of the posts 226, 227. It is also contemplated that the joint 260 may be configured and/or utilized to removably couple the posts 226, 227 to the upper beam 229.

The joint 260 may be configured to allow the lower portions 226B, 227B of the posts 226, 227 to be rotated relative to the upper portions 226A, 227A about the pivot point. The joint 260 may serve to manipulate the lower portions 226B, 227B of the posts 226, 227 and/or the lower beam 228 relative to the upper portions 226A, 227A of the posts 226, 227 and/or the upper beam 229. For example, the joint 260 may be utilized pivot the lower beam 228 distally away from the neck and/or chest of the individual wearing the surgical helmet 220. This may serve to define a larger volume under/within the surgical garment 12, 112 to produce better air flow under and/or within the surgical garment 12, 112. This may serve to space the lower beam 228 further away from the wearer's chest and prevent the face frame 224 from becoming ensnared on the wearer's chest. Alternatively, the joint 260 may be utilized pivot the lower beam 228 proximally toward the neck and/or chest of the individual wearing the surgical helmet 220. This may serve to bring the transparent shield 18, 118 of the surgical garment 12, 112 closer the wearer's face improving the wearer's field of view and reducing glare produced on the surface of the transparent shield 18, 118.

While FIG. 3 illustrates an exemplary configuration of the surgical helmet 220 including both a sliding mechanism 252 and a joint 260, it is contemplated that alternative configurations of the surgical helmet 220 may comprise only a sliding mechanism 252 or only a joint 260.

Figure 4A:
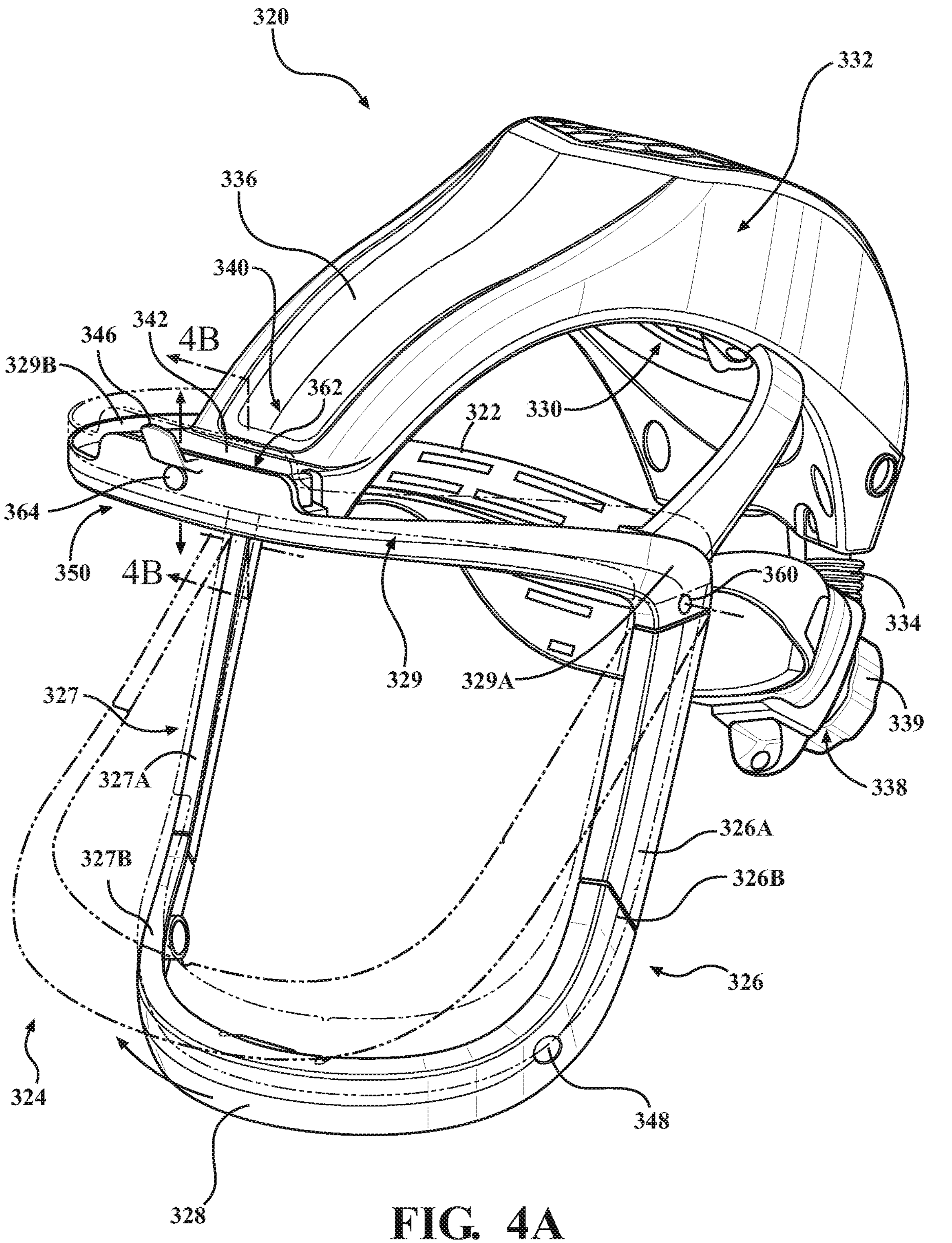
FIG. 4A is a perspective view of a fourth configuration of a surgical helmet assembly including a second reconfigurable face frame.
Figure 4B:
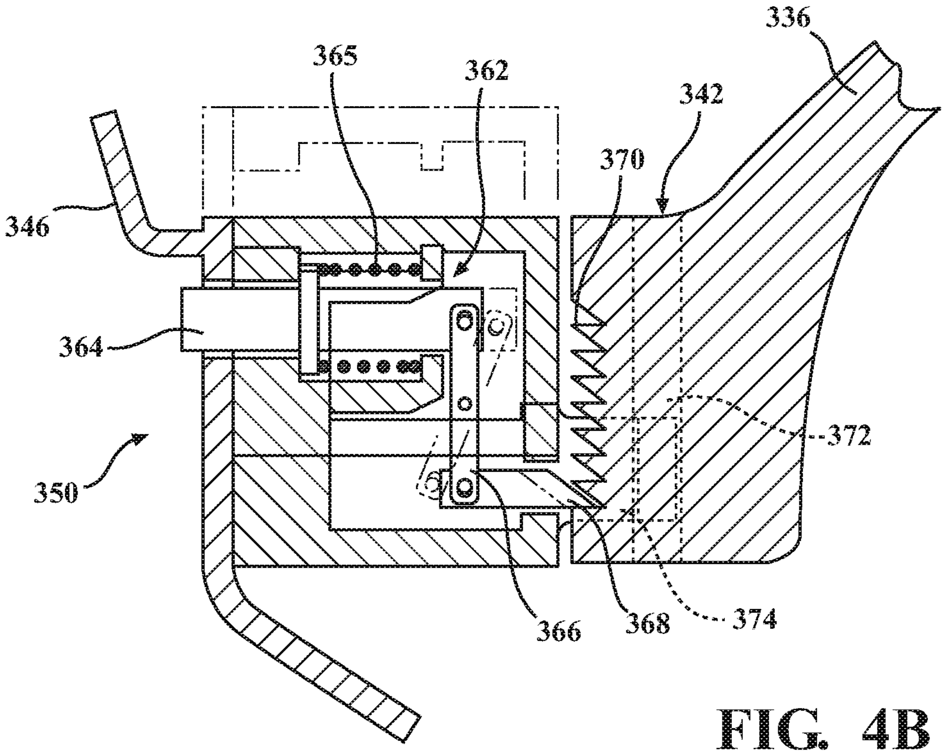
FIG. 4B is a partial sectional view of a sliding mechanism of the second reconfigurable face frame of FIG. 4A.

Referring to FIGS. 4A and 4B, a fourth configuration of a surgical helmet 320 is illustrated. Either of the surgical garments 12, 112 described above may be utilized with the surgical helmet 320 illustrated in FIG. 4A. Furthermore, it should be appreciated that the various configurations of the surgical helmet 320 may include similar elements that may be identified by reference numerals that are incremented by 100. It should be understood that those elements including reference numerals which are incremented by 100 can have the same features as described above and/or below with regard to other configurations of the surgical helmet 320.

Similar to as described above, the surgical helmet 320 may comprise a face frame 324 that is coupled to the front nozzle 340 or block 342 of the surgical helmet 320. The face frame 324 may comprise an upper beam 329 with opposing lateral portions 329A, 329B. The upper beam 329 may be positioned to generally span across the forehead of the wearer of the surgical helmet 320. The upper beam 329 may also comprise a protrusion 346. The protrusion 346 may be configured to extend distally outward and upward from the upper beam 329. The protrusion 346 may be positioned proximate the center of the upper beam 329. While the exemplary configuration of the upper beam 329 illustrated in FIG. 4A only includes a single protrusion 346, it is further contemplated that the upper beam 329 may comprise multiple protrusions 346 spaced along the length of the upper beam 329.

Referring to FIG. 4B, the face frame 324 may comprise a control housing 350 disposed within the upper beam 329. The control housing 350 may define a chamber for housing a coupling assembly 362 of the face frame 324. The coupling assembly 362 may be configured to removably couple the face frame 324 to the front nozzle 340 or block 342 of the surgical the helmet 320. The coupling assembly may comprise a control member 364 positioned on the exterior of the control housing 350 and manipulatable by the wearer of the surgical helmet assembly 320. The control member 364 may comprise a button, switch, rotatable dial or other similar control mechanism. The coupling assembly 362 may also comprise a linkage 366 coupling the control member 364 to an engaging member 368. The engaging member 368 may be configured to move between an engaged position and a disengaged position based on the position of the linkage 366 such that the engaging member 368 selectively engages a corresponding feature 370 on the front nozzle 340 or block 342 of the surgical helmet 320. For example, the engaging member 368 may comprise a wedge or tooth shape that extends from the control housing 350 toward a surface of the front nozzle 340 or block 342 of the surgical helmet 320. The surface of the front nozzle 340 or block 342 may comprise a corresponding feature 370, such as a plurality of teeth 370 configured to engage the engaging member 368.

When the engaging member 368 is in the engaged position, the engaging member 368 may engage the teeth 370 to lock the face frame 324 in place relative to the front nozzle 340 or block 342 of the surgical helmet 320. By contrast, when the control member 364 is manipulated by the wearer to move the engaging member 368 to the disengaged position, the engaging member 368 may be disengaged from the teeth 370, allowing the face frame 324 to slidably move relative to the front nozzle 340 or block 342 of the surgical helmet 320. This may include sliding the face frame 324 relative to the front nozzle 340 or block 342 to remove and/or couple the face frame 324 to the surgical helmet 320. The coupling assembly 362 may further comprise a biasing member 365 coupled to the control member 364 and/or the linkage 366 configured to maintain the engaging member 368 in the engaged position absent an external force being applied to the control member 364 to manipulate the linkage 366.

The coupling assembly 362 may also comprise a coupling arm 374 intended to slidably engage a corresponding channel 372 of the front nozzle 340 or block 342 when the face frame 324 is coupled to the front nozzle 340 or block 342 of the surgical helmet 320. The channel 372 may define the path on which the face frame 324 may be slid when the control member 364 is manipulated to disengage the engaging member 368 from the teeth 370 of the front nozzle 340 or block 342.

The face frame 324 may comprise a first post 326 and a second post 327. Each of the first post 326 and second post 327 may further comprise an upper portion 326A, 327A, and a lower portion 326B, 327B, respectively. The upper portion 326A, 327A of each of the first post 326 and second post 327 may be coupled to the opposing lateral portions 329A, 329B of the upper beam 329 of the face frame 324 and extend in a generally downward direction from the upper beam 329. The first post 326 and second post 327 of the face frame 324 may be constructed from a generally flexible or pliable material.

A lower beam 328 may extend between the opposed lower portions 326B, 327B of the posts 326, 327. The face frame 324 is formed so that the lower beam 328 is located below and slightly forward of the chin of the person wearing the surgical helmet 320. The lower beam 328 may be bowed outwardly from the opposed lower portions 326B, 327B of posts 326, 327. The face frame 324 may extend outwardly from the front nozzle 340 and/or block 342 of the surgical helmet 320 such that the face frame 324 is positioned forward of and generally encircles the face of the wearer when the surgical helmet 320 is secured to the wearer's head.

A plurality of coupling members 348, such as magnets, hook and loop, metal rivets, snaps, or similar type fasteners, may be mounted to the face frame 324 and configured to align and/or attach one of the transparent shields 18, 118 of the surgical garments 12, 112 described above. Each coupling member 348 may be positioned on the face frame 324 proximate to the opposed free ends 326B, 327B of the posts 326, 327 and/or adjacent opposing ends of the lower beam 328. Alternatively, the coupling members 348 of the surgical helmet 320 could be arranged or otherwise configured in any suitable way to cooperate with the complementary attachment elements 58, 158 of the transparent shield 18, 118, as described above, to releasably secure the surgical garment 12, 112 to the surgical helmet 320. For example, the protrusion 346 extending from the upper beam 329 may be replaced with a coupling member 348 configured to cooperate with a complementary attachment element 58, 158 on the surgical garment 12, 112.

Similar to the face frame 224 described above, the face frame 324 of FIG. 4A may comprise a joint 360. The joint 360 may be configured to allow the first and second posts 326, 327 to be rotated relative to the upper beam 329 about the pivot point. The joint 360 may also serve to manipulate the position of the lower beam 328 relative to the upper beam 329. For example, the joint 360 may be utilized pivot the lower beam 328 distally away from the neck and/or chest of the individual wearing the surgical helmet 320. This may serve to define a larger volume under/within the surgical garment 12, 112 to produce better air flow under and/or within the surgical garment 12, 112. This may serve to space the lower beam 328 further away from the wearer's chest and prevent the face frame 324 from becoming ensnared on the wearer's chest. Alternatively, the joint 360 may be utilized to pivot the lower beam 328 proximally toward the neck and/or chest of the individual wearing the surgical helmet 320. This may serve to bring the transparent shield 18, 118 of the surgical garment 12, 112 closer to the wearer's face improving the wearer's field of view and reducing glare produced on the surface of the transparent shield 18, 118.

While not illustrated in FIG. 4A, it is also contemplated that the face frame 324 may comprise a sliding mechanism similar to the sliding mechanism 252 described above.

Referring to FIGS. 5A to 5D, a fifth configuration of a surgical helmet 420 including an alignment channel 445 in an upper beam 429 of a face frame 424 is illustrated. This is similar to the surgical apparel system of FIGS. 2A and 2B described above. The surgical garment 112 described above may be utilized with the surgical helmet 420 illustrated in FIG. 5A. Furthermore, it should be appreciated that the various configurations of the surgical helmet 420 may include similar elements that may be identified by reference numerals that are incremented by 100. It should be understood that those elements including reference numerals which are incremented by 100 can have the same features as described above and/or below with regard to other configurations of the surgical helmet.

Figure 5B:
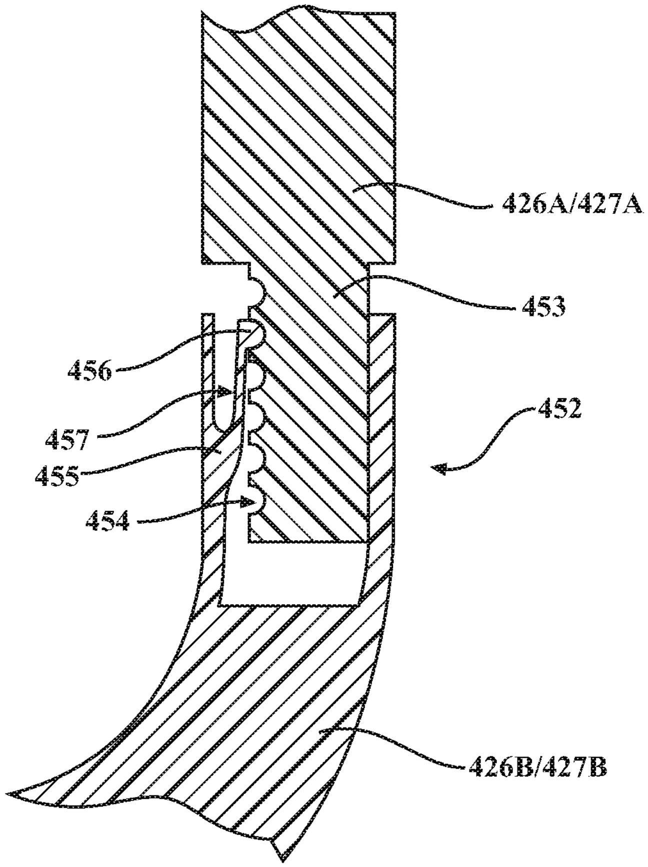
FIG. 5B is a partial sectional view of a sliding mechanism of the third reconfigurable face frame of FIG. 5A.
Figure 5A:
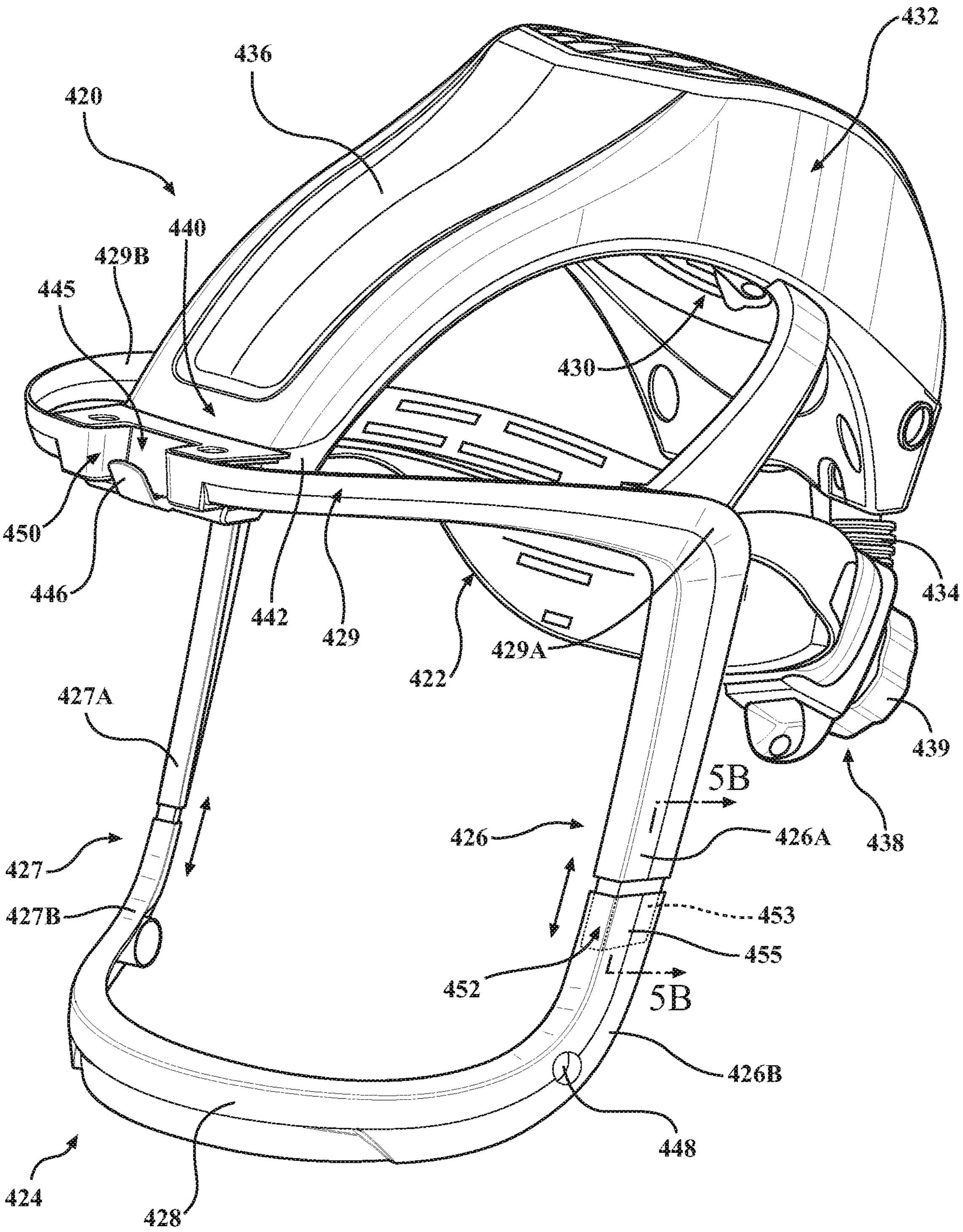
FIG. 5A is a perspective view of a fifth configuration of a surgical helmet assembly including a third reconfigurable face frame.

Referring to FIGS. 5A and 5B, the surgical helmet 420 comprises a face frame 424 similar to those described above. The face frame 424 of the surgical helmet 420 may comprise an upper beam 429 with opposing lateral portions 429A, 429B. The upper beam 429 may be positioned forward of a shell 432 and coupled to the front nozzle 440 and/or block 442 of the surgical helmet 420 and configured to extend across the front of the surgical helmet 420. The upper beam 429 may further comprise a control housing 450. The proximal portion of the control housing 450 may be configured to couple the face frame 424 to the front nozzle 440 and/or block 442 of the surgical helmet 420. The distal portion of the control housing 450 may include an alignment channel 445. The alignment channel 445 may be configured to receive a tab 147 disposed on the interior of the surgical garment 112 to align and/or orient the surgical garment 112 relative to the surgical helmet 420.

The upper beam 429 may further comprise a coupling feature 446 configured to removably engage the transparent shield 118 and/or surgical garment 112. The coupling feature 446 may comprise a protrusion, magnetic member, ferromagnetic member, hook and loop, or similar coupling mechanism configured to releasably engage the opening 149 in the tab 147 to align and/or couple the surgical garment 112 to the surgical helmet 420.

The face frame 424 may also comprise a first post 426 and a second post 427 that extend downwardly from the upper beam 429. Each of the first post 426 and second post 427 may further comprise an upper portion 426A, 427A, and a lower portion 426B, 427B, respectively. The upper portions 426A, 427A of each of the first post 426 and second post 427 may be coupled to the opposing lateral portions 429A, 429B of the upper beam 429 of the face frame 424 and extend in a generally downward direction from the upper beam 429. The first post 426 and second post 427 of the face frame 424 may be constructed from a generally flexible or pliable material. The first and second posts 426, 427 may be coupled to the upper beam 429. For example, as illustrated in FIG. 5A, the first and second posts 426, 427 may be connected to the opposing ends 429A, 429B of the upper beam 429. The face frame 424 may be constructed from a generally flexible or pliable material.

The face frame 424 may further comprise a lower beam 428 that may extend between the opposed free ends of the posts 426, 427. The face frame 424 is formed so that the lower beam 428 is generally located below and slightly forward of the chin of the person wearing the surgical helmet 420. The lower beam 428 may be bowed outwardly from the free ends of posts 426, 427. The face frame 424 may extend outwardly from the upper beam 429 such that the face frame 424 is positioned forward of and generally encircles the face of the wearer when the surgical helmet 420 is secured to the wearer's head.

A plurality of coupling members 448 may be mounted to or within the face frame 424. The coupling members 448 may comprise a magnetic material and are configured to align and/or attach the transparent shield 118 of the surgical garment 112 to the surgical helmet 420. Alternatively, the coupling members/complementary attachment elements may be hook and loop fasteners or other suitable implementation. Each coupling member 448 may be positioned on the face frame 424 proximate to the opposed posts 426, 427 and/or adjacent opposing ends of the lower beam 428. Alternatively, the coupling members 448 of the surgical helmet 420 could be arranged or otherwise configured in any suitable way to cooperate with the complementary attachment elements 158 of the surgical garment 112 to releasably secure the surgical garment 112 to the surgical helmet 420.

The face frame 424 may further comprise a sliding mechanism 452. The sliding mechanism 452 may comprise a portion of the first post 426 and second post 427. As illustrated in FIG. 5A, the sliding mechanism 452 may be positioned along the length of the posts 426, 427 and may define the upper portions 426A, 427A of the posts 426, 427, and the lower portions 426B, 427B of the posts 426, 427. Alternatively, while not illustrated in FIG. 5A, it is contemplated that the sliding mechanism 452 may be positioned proximate where the posts 426, 427 are coupled to the upper beam 429 and/or may be positioned proximate where the posts 426, 427 are coupled to the lower beam 428 of the face frame 424. It is contemplated that the sliding mechanism 452 may be configured and/or utilized to removably couple the upper portions 426A, 427A of the posts 426, 427 to the lower portions 426B, 427B of the posts 426, 427. It is also contemplated that the sliding mechanism 452 may be configured and/or utilized to removably couple the posts 426, 427 to the upper beam 429 and/or the lower beam 428.

As illustrated in FIG. 5A, the protrusion 446 and the coupling member(s) 448 may be positioned on opposing sides of the sliding mechanism 452, resulting in the distance between the protrusion 446 and the coupling member(s) 448 changing based on the position of the sliding mechanism 452. This may mean multiple transparent shield 118 and/or surgical garment 112 configurations are required to allow for coupling of the attachment members 158 of the shield 118 to the coupling member(s) 448 of the face frame 424. However, while not illustrated, it is further contemplated that both the protrusion 446 and the coupling member(s) 448 of the face frame 424 may be on the same side of the sliding mechanism 452. For example, the coupling member(s) 448 may be positioned above the sliding mechanism 452. In this configuration, the distance between the protrusion 446 and the coupling member(s) 448 would not change with the position of the sliding mechanism 452. In this configuration, a single configuration of the transparent shield 118 and/or surgical garment 112 may be coupled to the face frame 424 regardless of the position of the sliding mechanism 452.

Figure 5C:
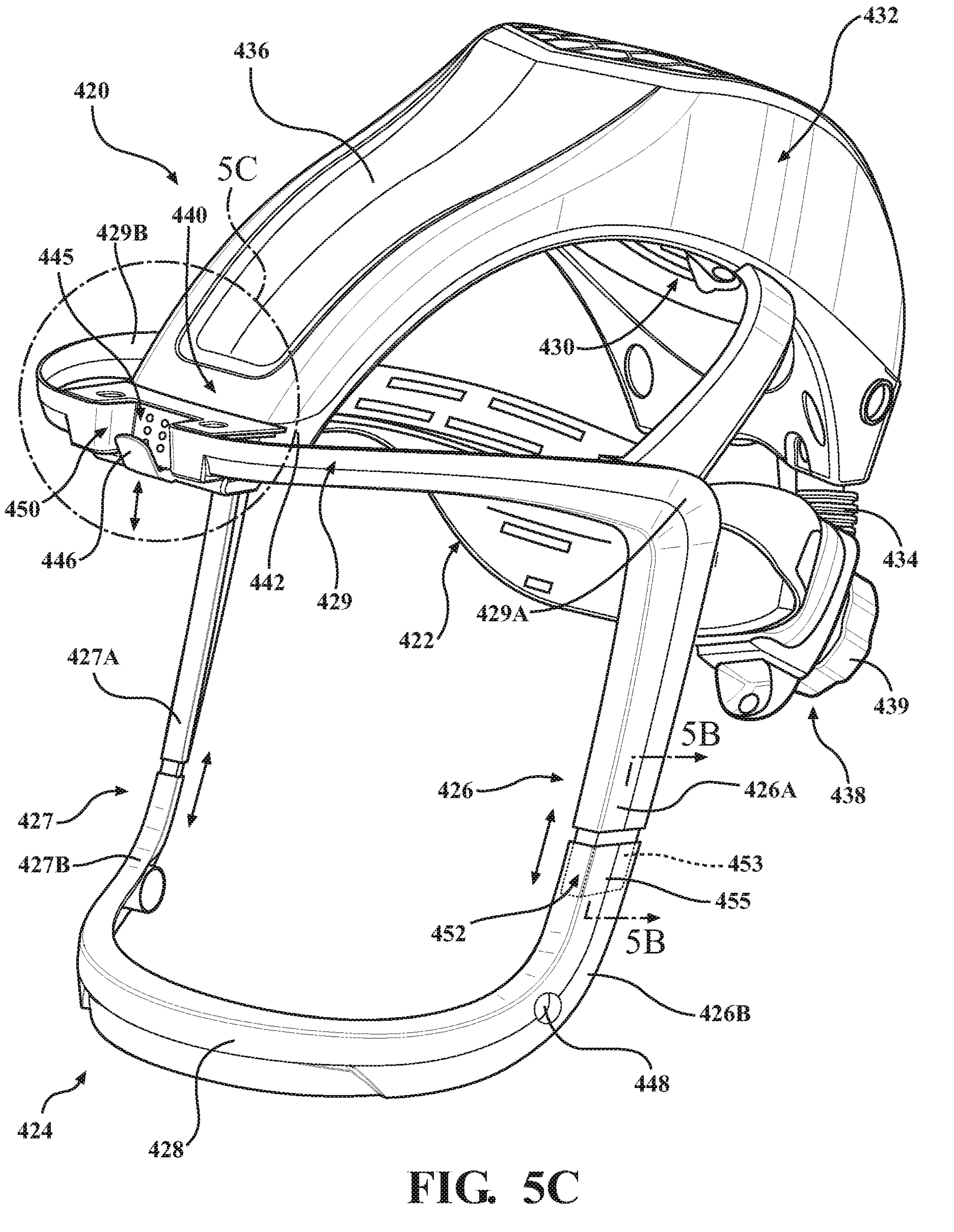
FIG. 5C is a perspective view of the third reconfigurable face frame of FIG. 5A including a repositionable coupling figure.
Figure 5D:
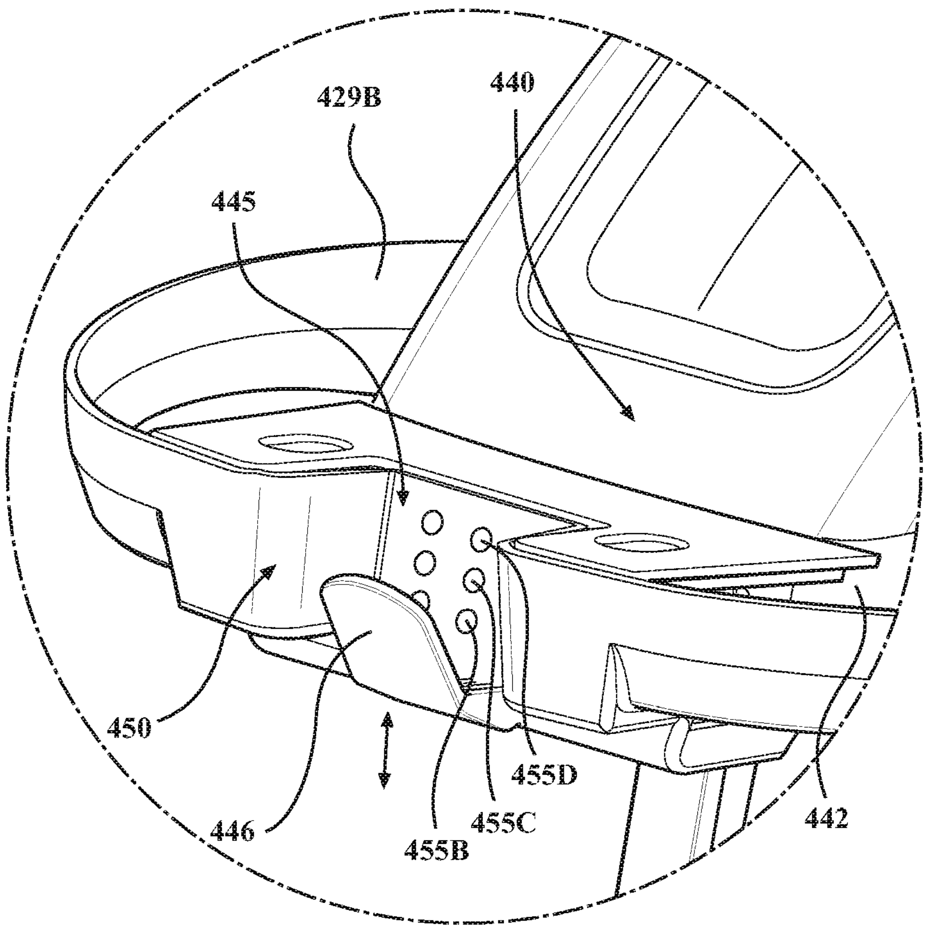
FIG. 5D is a zoomed perspective view of the repositionable coupling figure of FIG. 5C.

It is also contemplated that the face frame 424 may further comprise a repositionable coupling feature 446. Referring to FIGS. 5C and 5D, an exemplary configuration of a repositionable coupling feature 446 is illustrated. The upper beam 429 of the face frame 424 may comprise a plurality of apertures 455A, 455B, 455C, 455D or slots that are spaced vertically on the distal surface of the upper beam 429 from which the coupling feature extends. The coupling feature 446 or protrusion may comprise a corresponding post configurated to matingly engage the plurality of apertures 455A, 455B, 455C, 455D to removably attach the coupling feature 446 to the upper beam 429 of the face frame 424. For example, the coupling feature 446 may comprise a set or laterally spaced posts that engage one set of the plurality of apertures 455A, 455B, 455C, 455D at a time to removably attach the coupling feature 446 to the upper beam 429. The plurality of apertures 455A, 455B, 455C, 455D in the upper beam 429 may be vertically spaced to correspond to the various positions of the sliding mechanism 452 of the first post 426 and second post 427 to allow the vertical distance to remain constant between the coupling feature 446 of the upper beam 429 and the coupling member(s) 448 of the face frame 424 as the sliding mechanism 452 is manipulated to lengthen or shorten the first post 426 and second post 427. For example, when the sliding mechanism 452 is fully extended, the coupling feature 446 may be attached to the apertures 455A, as illustrated in FIG. 5C. Alternatively, when the sliding mechanism 452 is fully retracted, the coupling feature 446 may be attached to the apertures 455D. When the sliding mechanism 452 is positioned at an intermediary position, the coupling feature 446 may be attached to the corresponding apertures 455B, 455C to maintain a constant distance between the coupling feature 446 of the upper beam 429 and the coupling member(s) 448 of the face frame 424. This may allow for a single configuration of the transparent shield 118 and/or surgical garment 112 to be coupled to the face frame 424 irrespective of the position of the sliding mechanism 452 is in.

Referring to FIG. 5B, an exemplary configuration of the sliding mechanism 452 is illustrated. The sliding mechanism 452 may comprise an inner member 453 and an outer member 455 that slidably engage one another to alter and/or manipulate the length of the first post 426 and second post 427. For example, similar to the sliding mechanism described above, the sliding mechanism 452 may slide between a first position, a second position, or any intermediary position between the first and second positions. When the sliding mechanism 452 is in the first position, the first post 426 and second post 427 may have a first length defining a first distance between the upper beam 429 and the lower beam 428. This may also be referred to as a first configuration of the face frame 424. Alternatively, when the sliding mechanism 452 is in the second position, the first post 426 and second post 427 may have a second length defining a second distance between the upper beam 429 and the lower beam 428. This may also be referred to as a second configuration of the face frame 424. The face frame 424 may also comprise a plurality of intermediate configurations wherein the sliding mechanism 452 is positioned at a point between the first position and the second position. This allows for the length of the face frame 424 of the surgical helmet 420 to be adjusted based on the specific size and characteristics of the individual wearing the surgical helmet. For example, an individual with a small head and/or a shorter neck may desire a shorter distance between the upper beam 429 and lower beam 428 to prevent the lower beam 428 from contacting and/or becoming ensnared on the wearer's chest. Alternatively, an individual with a larger head and/or a longer neck may desire a longer distance between the upper beam 429 and lower beam 428 to maximize the viewing area provided by the transparent shield 118 of the surgical garment 112 that is coupled to the surgical helmet 420.

The inner member 453 and the outer member 455 of the sliding mechanism 452 may also comprise complementary features such as a recess 454 and protrusion 456 to define the various lengths of the first post 426 and second post 427. For example, the inner member 453 may comprise a plurality of recesses 454 spaced along the length of the inner member 453. The outer member 455 may then comprise at least one protrusion 456 configured to matingly engage the plurality of recesses 454 as the outer member 455 is slid along the length of the inner member 453. The protrusion 456 when engaging one of the plurality of recesses 454 may be configured to create a friction fit, holding inner member 453 and outer member 455 in place relative to one another until an external force is applied to move the protrusion 456 from the current recess 454 to one of the other recesses 454 of the inner member 453. The protrusion 456 may be coupled to a biasing member 457 configured to create the friction fit between the protrusion 456 and the recess 454. The biasing member 457 may bias the protrusion 456 toward the recess 454 to assist in securing the sliding mechanism 452 in place until an external force is applied to the sliding mechanism 452. While the inner member 453 is described as having a plurality of recesses 454 and the outer member 455 as having a complementary protrusion 456, it is further contemplated that the inner member 453 may comprise the protrusion 456 and the outer member 455 may comprise the complementary plurality of recesses 454 for adjusting the sliding mechanism 452. Furthermore, while a plurality of recesses 454 and complementary protrusion 456 is described and illustrated as a means of adjusting the sliding mechanism 452, other configurations of the sliding mechanism 452 are contemplated. For example, the sliding mechanism 452 may be configured as a rails system with a friction fit for adjusting the length of the posts 426, 427. Alternatively, the sliding mechanism 452 may comprise a mechanical lever and stops for adjusting the length of the first and second posts 426, 427. This list of exemplary configurations of the sliding mechanism 452 is not intended to be exhaustive.

While not illustrated in FIG. 5A, it is contemplated that the face frame 424 may comprise a joint similar to those described above in FIG. 3 and/or 4A. It is also contemplated that the surgical helmet assembly 420 of FIG. 5A may comprise a face frame including a coupling assembly similar to the coupling assembly 362 described in FIGS. 4A and 4B.

Referring to FIGS. 6A, 6B, 7A, and 7B, perspective views of various stages of coupling an exemplary configuration of a transparent shield 118, and by extension the surgical garment 112, to the face frame 424 of the surgical helmet 420 of FIG. 5A are illustrated. As described above, the transparent shield 118 includes a plurality of configurations, and each configuration may generally comprise a tab 147 defining an opening 149. While not illustrated, it is also contemplated that the transparent shield 118 may be designed without a tab, and the opening 149 may be defined in a top portion of the transparent shield 118. Exemplarily configurations of the transparent shield 118A, 118B including a tab 147 that is formed as part of the transparent shield 118A, 118B, are illustrated in FIGS. 6A, 6B, 7A, and 7B. The upper beam 429 of the surgical helmet 420 may comprise the pair of laterally spaced-apart sidewalls and the proximal surface that defines the alignment channel 445 configured to receive the tab 147 of the transparent shield 118A, 118B. The protrusion 446 may extend from the proximal surface of the alignment channel 445 such that the opening 149 of the tab 147 may be disposed over the protrusion 446. The transparent shield 118 comprises a plurality of attachment elements 158A, 158B secured to the periphery of the transparent shield 118A, 118B.

Figure 6A:
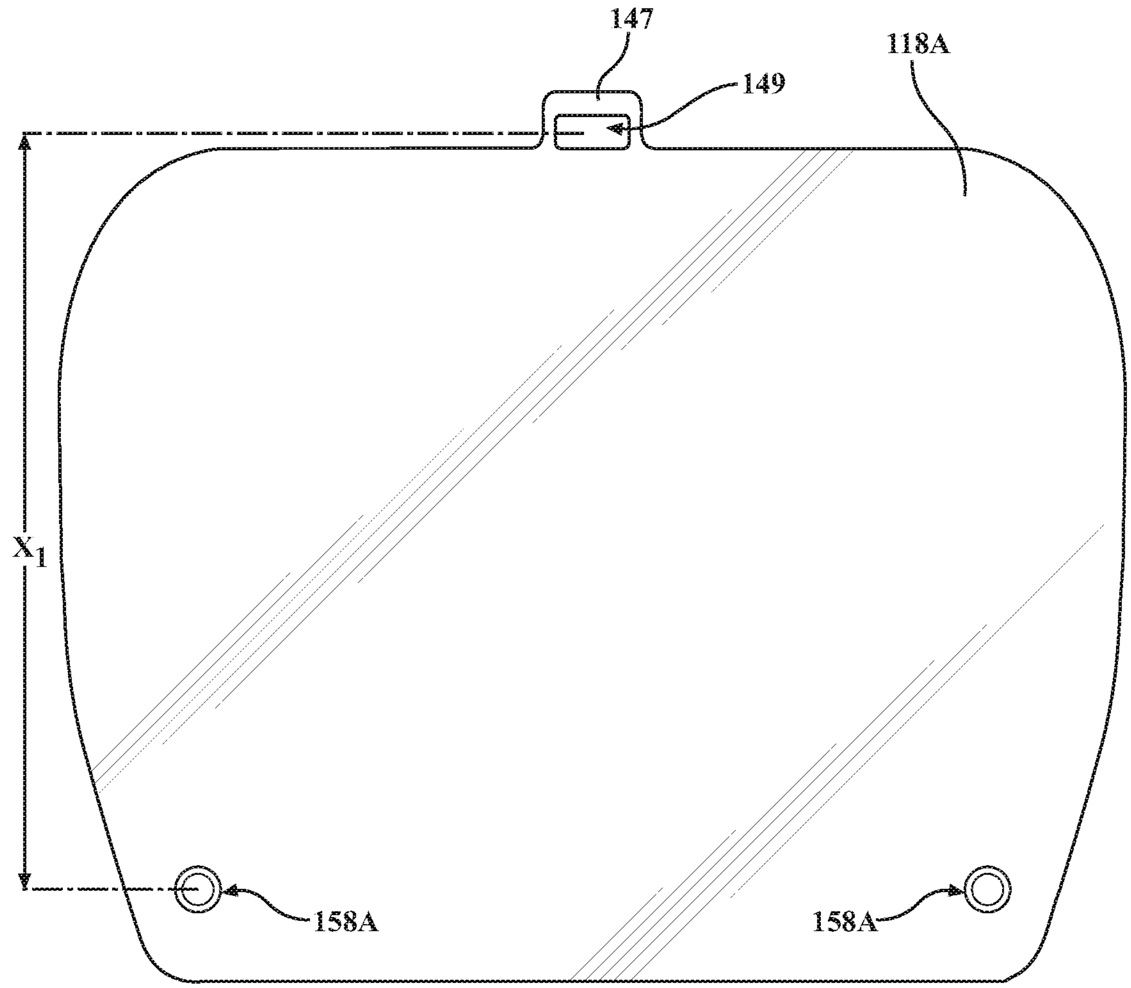
FIG. 6A is a perspective view of a first configuration of a transparent shield of a surgical garment for use with a surgical helmet assembly, the transparent shield comprising an aperture and an attachment element that define a first distance.
Figure 6B:
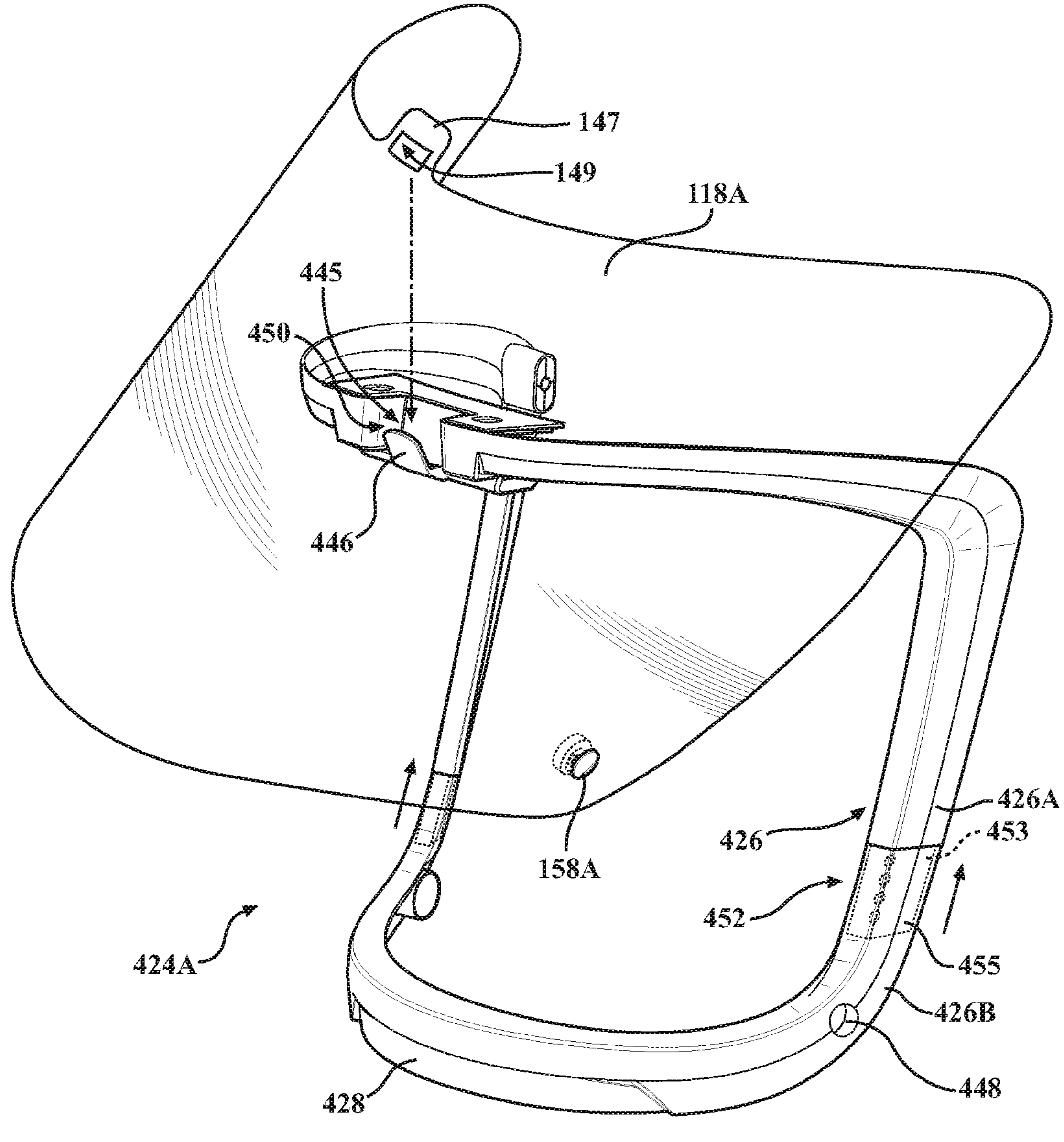
FIG. 6B is a schematic view of the transparent shield of FIG. 6A being coupled to the third reconfigurable face frame of FIG. 5A when the sliding mechanism is in a first position.
Figure 7A:
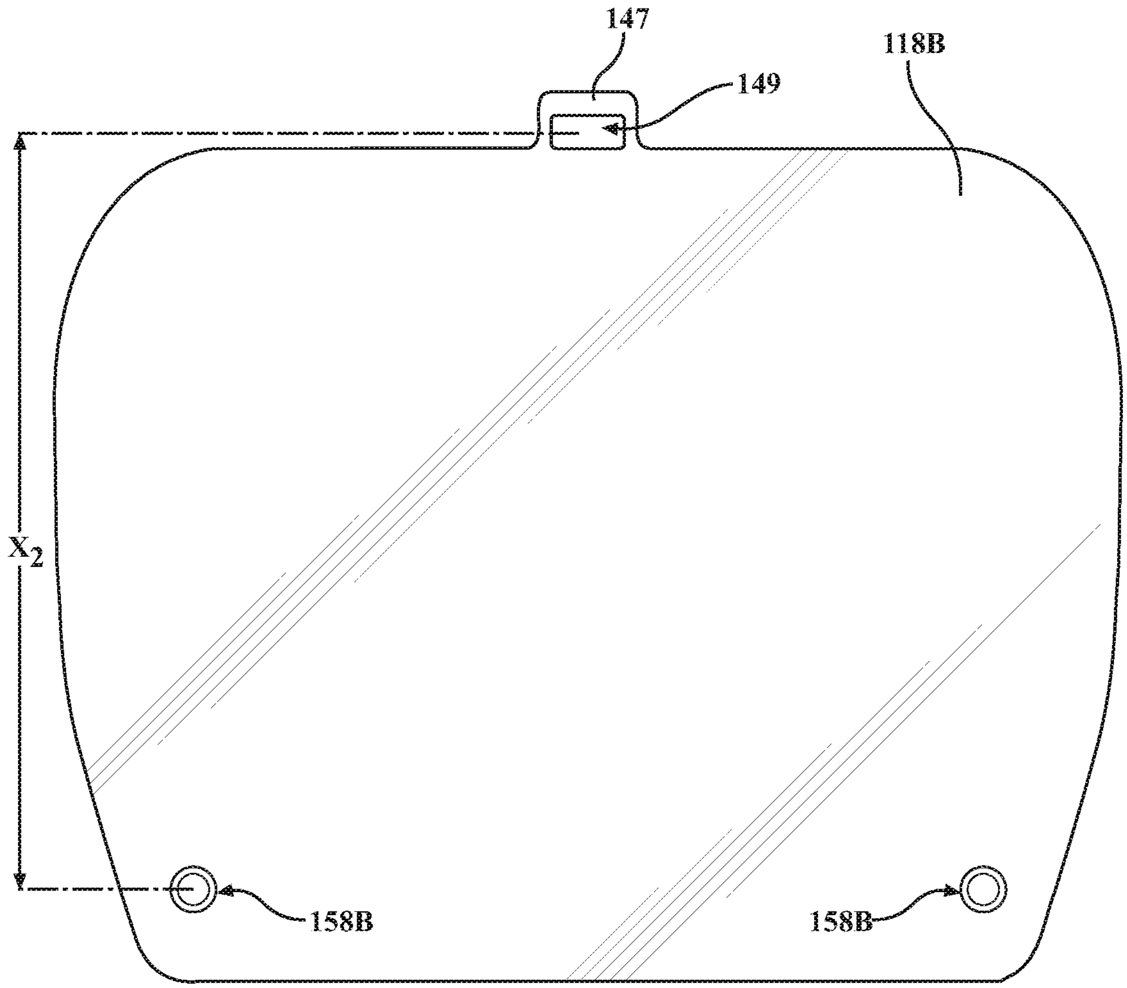
FIG. 7A is a perspective view of a second configuration of a transparent shield of a surgical garment for use with a surgical helmet assembly, the transparent shield comprising an aperture and an attachment element that define a second distance.
Figure 7B:
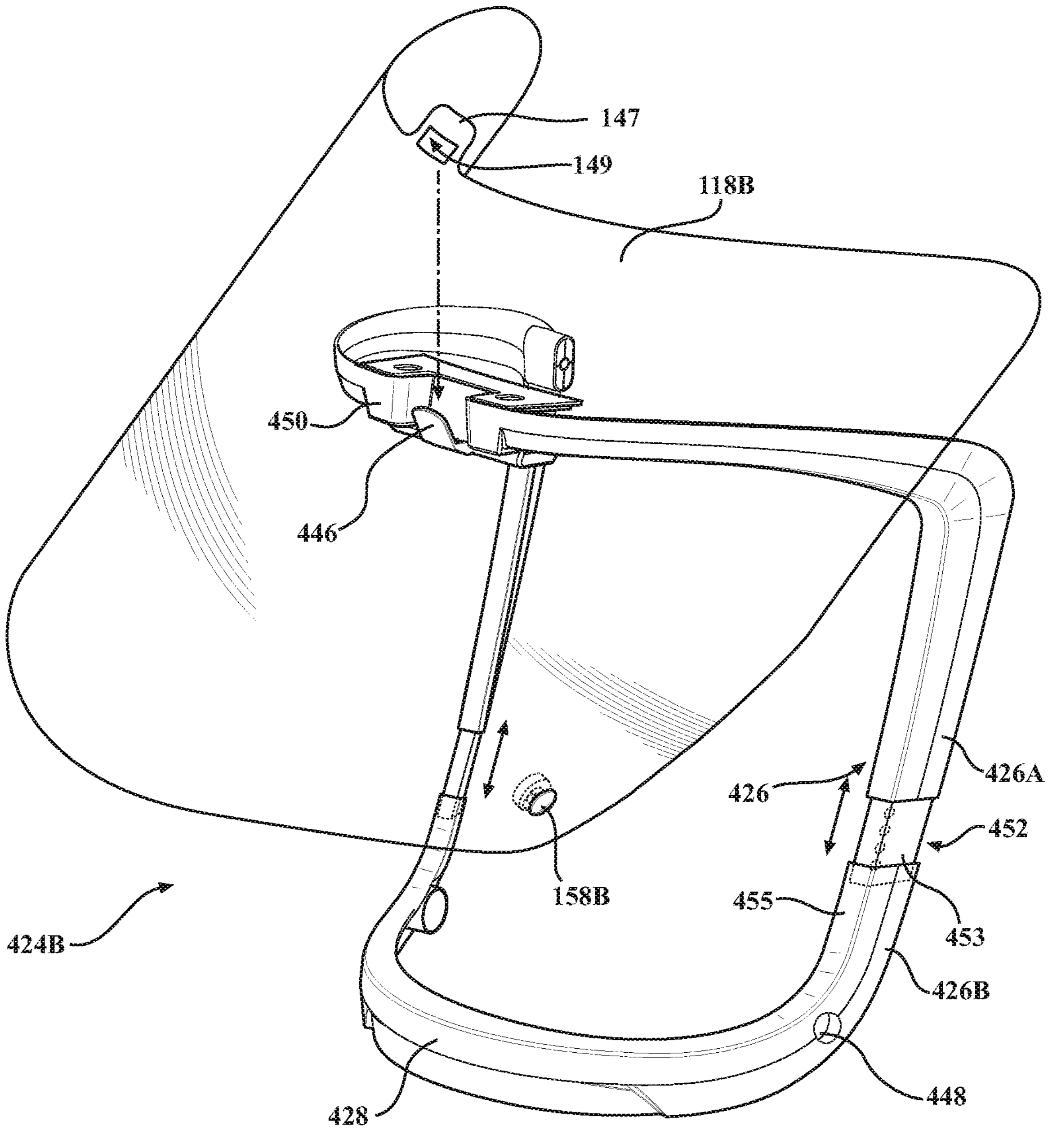
FIG. 7B is a schematic view of the transparent shield of FIG. 7A being coupled to the third reconfigurable face frame of FIG. 5A when the sliding mechanism is in an alternative position.

To couple the transparent shield 118, 118A, 118B, and by extension the surgical garment 112, to the surgical helmet 420, the transparent shield 118, 118A, 118B may be positioned with the opening 149 in the tab 147 above the alignment channel 445 and the protrusion 446 (see FIGS. 6B and 7B). The tab 147, and by extension the transparent shield 118, 118A, 118B, may then be lowered onto the surgical helmet 420 such that at least a portion of the tab 147 is positioned within the alignment channel 445 between the pair of laterally spaced-apart side walls. The tab 147 should be positioned within the alignment channel 445 such that the protrusion 446 is disposed within the opening 149 of the tab 147. The lower portion of the transparent shield 118, 118A, 118B, that includes the attachment elements 158, 158A, 158B, may then be manipulated to couple the attachment elements 158, 158A, 158B to the complementary coupling members 448 positioned on the face frame 424. For example, once the tab 147 is positioned within the alignment channel 445 and the protrusion 446 is disposed within the opening 149 of the tab 147, the transparent shield 118, 118A, 118B may be pivoted about the protrusion 446 to position the attachment elements 158, 158A, 158B adjacent to the complementary coupling members 448. This is one example of a method of coupling the surgical garment 112 to the surgical helmet 420.

As mentioned above, the coupling member 448 comprises one of a ferromagnetic material or a magnetic material and the attachment element 158, 158A, 158B comprises the other of the ferromagnetic material or magnetic material, so that the coupling member 448 and the attachment element 158, 158A, 158B may be magnetically attracted to one another. In the illustrated configurations, the coupling member 448 may comprise a magnetic material, and hence a magnetic field may emanate from or otherwise be generated by the coupling member 448. When the coupling member 448 is coupled to the attachment element 158, 158A, 158B, the magnetic field surrounding the component comprising the magnetic material will be altered when the component comprising the ferromagnetic material is placed adjacent to it.

As described above, the face frame 424 may comprise a sliding mechanism 452 for varying the length of the posts 426, 427 of the face frame 424. As the length of the posts 426, 427 are manipulated using the sliding mechanism 452, the distance between the upper beam 429 and the lower beam 428 is altered. In configurations of the face frame 424 where the protrusion 446 of the upper beam 429 and the coupling member(s) 448 of the face frame 424 are on opposing sides of the sliding mechanism 452, the distance between the protrusion 446 and the coupling member(s) 448 will also change. This may require that different transparent shield 118, 118A, 118B and/or garment 112 configurations be utilized based on the position of the sliding mechanism 452 and/or the length of the posts 426, 427. For example, as illustrated in FIG. 6A, a first configuration of the transparent shield 118A is illustrated. The distance between the opening 149 and the attachment element(s) 158A defines a first distance $X_1$ corresponding to a first configuration of the face frame 424A wherein the sliding mechanism is in a first position (fully retracted). The first distance $X_1$ between the opening 149 and the attachment element(s) 158A corresponds to the distance between the protrusion 446 and the coupling member(s) 448 when the sliding mechanism 452 is in the first position. This will allow the first configuration of the transparent shield 118A, and by extension the surgical garment 112, to be coupled to the first configuration of the face frame 424A, as illustrated in FIG. 6B.

Alternatively, as illustrated in FIG. 7A, a second configuration of the transparent shield 118B is illustrated. The distance between the opening 149 and the attachment element(s) 158B define a second distance $X_2$ corresponding to a second configuration of the face frame 424B wherein the sliding mechanism 452 is in a second position (fully extended). The second distance $X_2$ between the opening 149 and the attachment element(s) 158B corresponds to the distance between the protrusion 446 and the coupling member(s) 448 when the sliding mechanism 452 is in the second position. This will allow the second configuration of the transparent shield 118B, and by extension the surgical garment 112, to be coupled to the second configuration of the face frame 424B, as illustrated in FIG. 7B.

While not illustrated, it is further contemplated that additional configurations of the transparent shield 118 including different spacing's between the opening 149 and the attachment element(s) 158 may be required to correspond to additional positions of the sliding mechanism 452 and/or lengths of the posts 426, 427 of the face frame 424.

FIGS. 6A-7B illustrate an exemplary configuration of the face frame 424 including a sliding mechanism 452 for providing single face frame 424 capable of defining a first configuration of the face frame 424A and a second configuration of the face frame 424B, wherein the sliding mechanism 452 may be utilized to vary the distance between the protrusion 446 and the coupling member 448. Each configuration of the face frame 424A, 424B may define a distance between the protrusion 446 and the coupling member 448 that correspond to the respective distances between the opening 149 and the attachment element(s) 158 of the various configurations of the transparent shield 118A, 118B. While not illustrated in the figures, it is further contemplated that varying the configuration of the face frame may be accomplished in other ways. For example, as described above, it is contemplated that the face frame may be removably coupled to the surgical helmet. In an exemplary configuration of a surgical apparel system wherein the face frame is removably coupled to the surgical helmet, the surgical apparel system may comprise a plurality of removable face frames. Each of the plurality of face frames may define a different distance, such as a coupling distance, between the coupling feature and the coupling member of the particular face frame. The system may further comprise a plurality of transparent shields, wherein each one of the plurality of transparent shields defines a different distance between the opening and the attachment element(s) of the transparent shield corresponding to the one of the distances between the coupling feature and the coupling member of one of the plurality of face frames.

For example, an exemplary configuration of the system may comprise a surgical helmet a first face frame, a second face frame, a first surgical garment, and a second surgical garment. The first face frame may comprise a first upper beam having a first coupling feature, a first pair of posts, and a first lower beam. The first face frame may also comprise a first attachment element at least partially disposed within the first face frame, the first coupling feature and the first attachment element defining a first coupling dimension, such as a height or length. The second face frame may comprise a second upper beam having a second coupling feature, a second pair of posts, and a second lower beam. The second face frame may also comprise a second attachment element at least partially disposed within the second face frame, the second coupling feature and the second attachment element defining a second coupling dimension. The first surgical garment may comprise a first shield having a first aperture and a first coupling element, wherein the first aperture and the first coupling element define a third coupling dimension. The second surgical garment may comprise a second shield having a second aperture and a second coupling element, wherein the second aperture and the second coupling element define a fourth coupling dimension. The system may be configured such that the first coupling dimension of the first face frame corresponds to the third coupling dimension of said first surgical garment to allow the first surgical garment to couple to the first face frame. The system may further be configured such that the second coupling dimension of the second face frame corresponds to the fourth coupling dimension of the second surgical garment to allow the second surgical garment to couple to the second face frame. This allows for the system to incorporate various face frames with a single surgical helmet, wherein the face frame may be sized to best accommodate the needs of the individual wearing the surgical helmet. For example, as described above, an individual with a small head and/or a shorter neck may prefer a face frame with a smaller coupling dimension, i.e. the shorter distance between the coupling feature and the attachment element of the face frame. A smaller coupling dimension may prevent the face frame from contacting and or snaring on the chest of the individual when wearing the system. This individual may attach a face frame comprising a smaller coupling dimension to the surgical helmet and using the corresponding surgical garment and/or transparent shield. Alternatively, wherein an individual may prefer a larger coupling dimension, which may provide a larger transparent shield and greater/larger field of view, the individual may attach a face frame comprising a larger coupling dimension to the surgical helmet and use the corresponding surgical garment and/or transparent shield. It is contemplated that the system may comprise any number of face frames, each of which may vary in size, shape, and/or orientation. The system may similarly comprise any number of surgical garments, including a transparent shield, that may also vary by size, shape, and configuration to fit any or all of the various configurations of the face frame.

The system may be configured such that a face frame coupled to the surgical helmet may be swapped out or exchanged for a different configuration of the face frame at any time. For example, the first face frame may be coupled to the helmet for a first procedure to be completed by medical professional number 1. After completion of the first procedure, the first face frame may be removed from the surgical helmet, and the second face frame may be coupled to the surgical helmet for a second procedure to be completed by medical professional number 2. The first face frame and second face frame may be swapped out from the surgical helmet to accommodate differing size and/or anatomical features of medical professional number 1 compared to medical professional number 2. The face frame may also be swapped in the middle of the procedure.

It is also contemplated that the face frames may be swapped out based on type of procedure to be performed. For example, it is completed that the first face frame may correspond to a surgical garment that provides better peripheral view based on the size and/or shape of the corresponding surgical garment and transparent shield. However, it is also contemplated that the second face frame may comprise a size and/or shape to accommodate a light being coupled to the surgical helmet or face frame. For example, the second face frame may be configured to provide an attachment feature for coupling a light or other peripheral device to the second face frame. The face frames may also be swapped out and/or removed as part of the sterilization/cleaning process following execution of a medical procedure.

Figure 8:
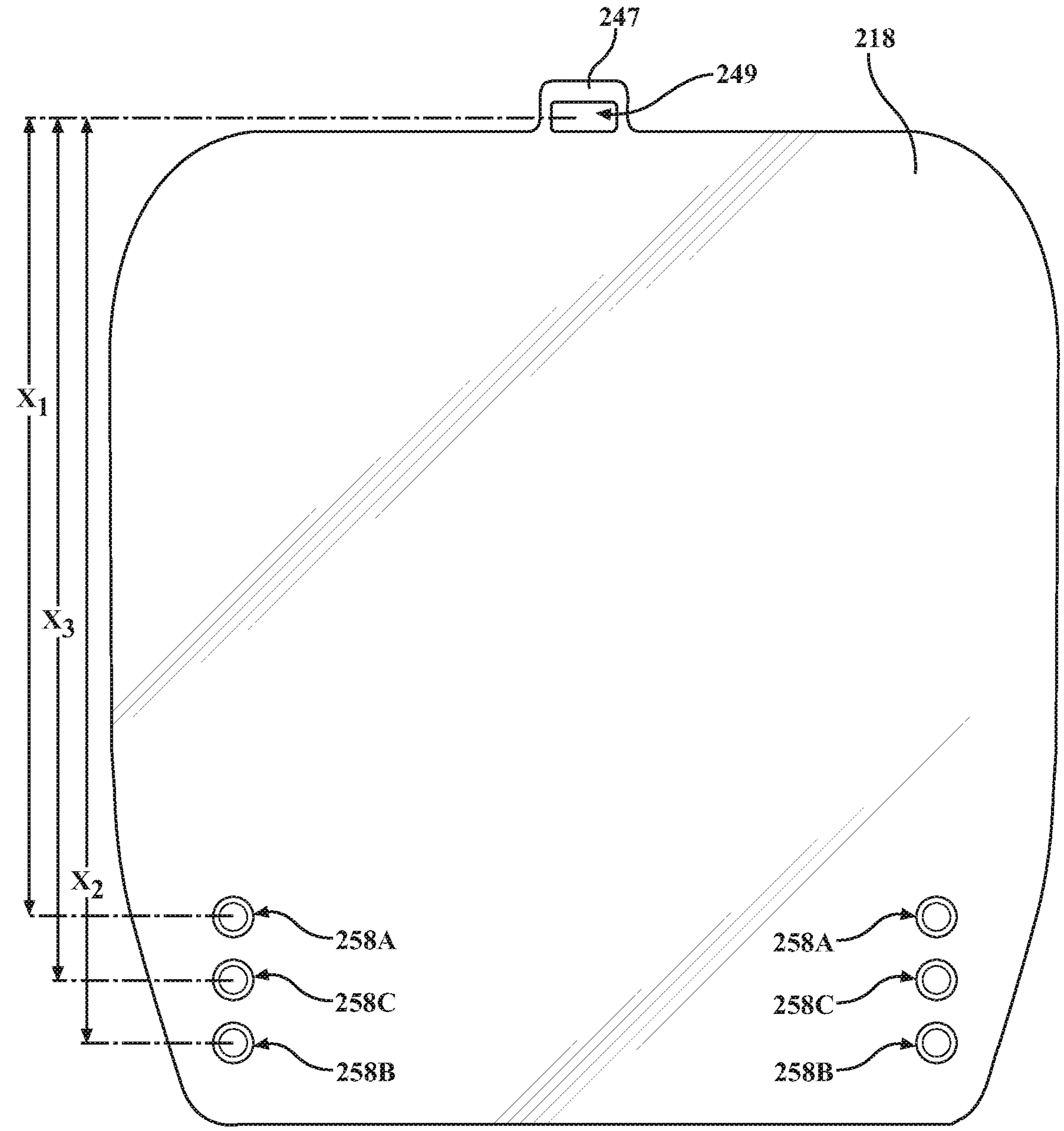
FIG. 8 is a perspective view of a third configuration of a transparent shield of a surgical garment for use with a surgical helmet assembly, the transparent face shield comprising an aperture and a plurality of attachment elements, each of the attachment elements defining a distance from the aperture that corresponds to a position of the sliding mechanism of the third reconfigurable face frame of FIG. 5A.

Referring to FIG. 8, an alternative configuration of the transparent shield 218 of a surgical garment 12 or 112 is illustrated. The transparent shield 218 may comprise an opening 249 configured to receive the protrusion 46, 146, 246, 346, 446 of one of the helmet assembly 20, 120, 220, 320, 420 described above. The transparent shield 218 may also comprise a tab 247, wherein the tab 247 at least partially defines the opening 249. The transparent shield 218 may further comprise a plurality of attachment members 258A, 258B, 258C. The attachment members 258A, 258B, 258C may be configured to define varying distances $X_1$, $X_2$, $X_3$, between the opening 249 and the respective attachment members 258A, 258B, 258C. For example, a first attachment member 258A may define a first distance $X_1$, a second attachment member 258B may define a second distance $X_2$, and a third attachment member 258C may define a third distance $X_3$. These distances may correspond to the distance between the protrusion 46, 146, 246, 346, 446 and the attachment element(s) 48, 148, 248, 348, 448 of the surgical helmet assembly 20, 120, 220, 320, 420 based on the position of the sliding mechanism 252, 452 and/or the joint 260, 360 of the face frame(s) 24, 124, 224, 324, 424 described above. This will allow a single configuration of the transparent shield 218, and by extension the surgical garment, to be coupled to a surgical helmet assembly 20, 120, 220, 320, 420 including a reconfigurable face frame 24, 124, 224, 324, 424 described above.

Alternative Features of the Surgical Helmet

Various features and configurations of a surgical helmet 20, 120 to be used as part of a surgical apparel system 10, 110 are described above. The surgical helmet 20, 120 may generally comprise a face frame 24, 124 that may extend downwardly from the front portion of the surgical helmet 20, 120 and be positioned generally in front of the wearer's face when the surgical helmet 20, 120 is worn by a medical professional. As discussed above, the face frame 124 may be reconfigurable, such that the face frame 124 may include pivotable and/or extendable portions. It is also contemplated that the face frame 124 may be removably coupled to the surgical helmet 20, 120.

Figure 9A:
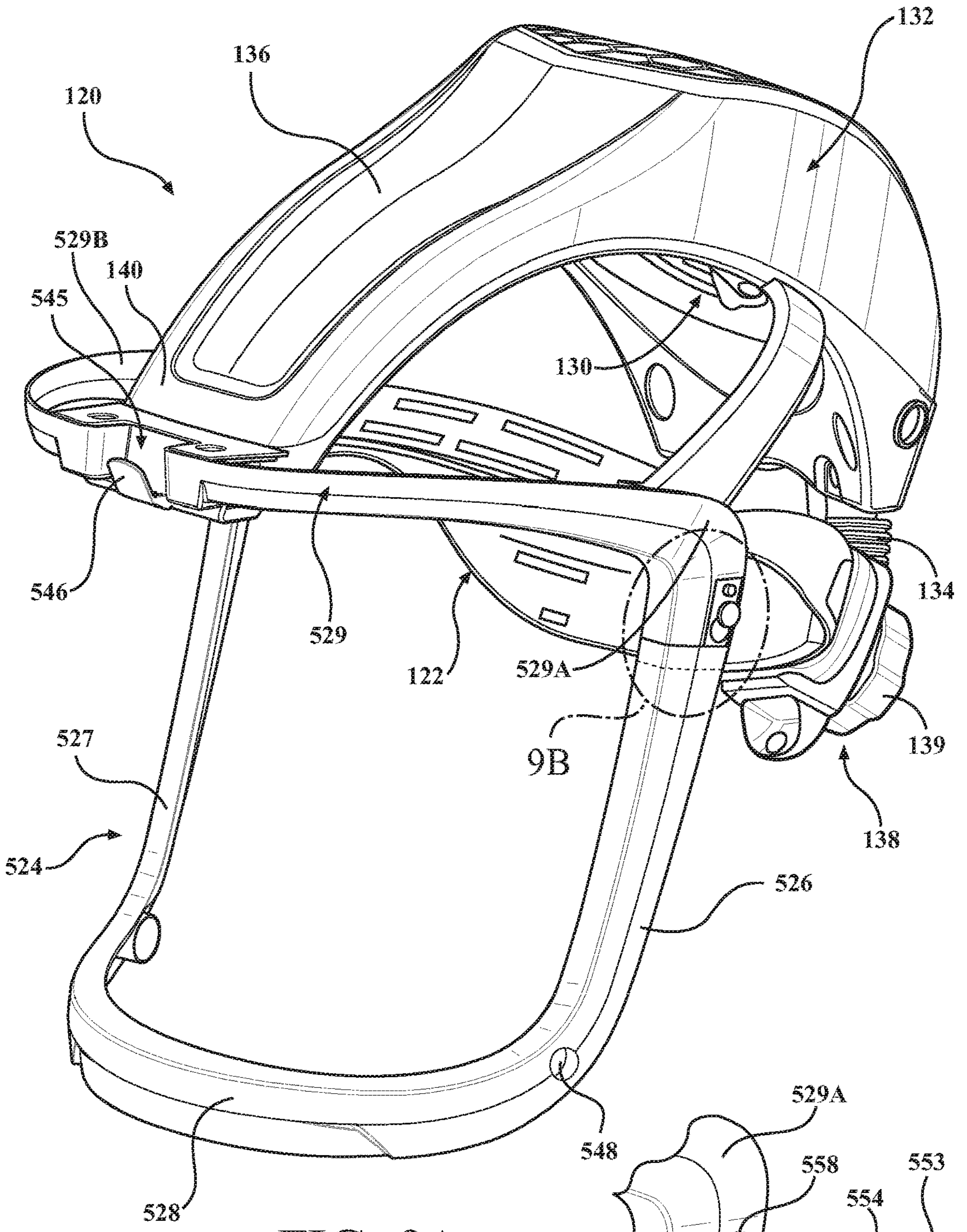
FIG. 9A is a perspective view of a sixth configuration of a surgical helmet assembly including a fourth reconfigurable face frame.
Figure 9B:
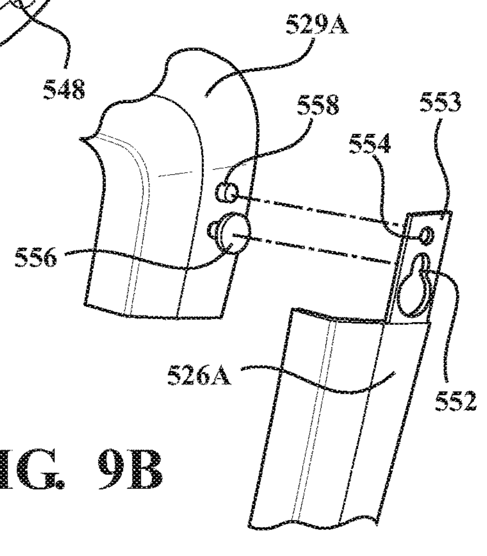
FIG. 9B is a partial exploded view of a chin bar attachment mechanism of the fourth reconfigurable face frame of FIG. 9A.

Referring to FIGS. 9A and 9B, an alternative configuration of a face frame 524 is illustrated. The face frame 524 may comprise an upper beam 529 with opposing lateral portions 529A, 529B. While described as part of the face frame 524, it is also contemplated that the upper beam 529 may be considered part of the surgical helmet 120. The upper beam may be positioned forward of the shell 132 of the surgical helmet 120 and configured to extend across the front of the surgical helmet 120. The upper beam 529 may further and optionally comprise an alignment channel 545 that is defined by a pair of laterally spaced-apart sidewalls and a proximal surface that is positioned proximally from the distal surface of the upper beam 529. The alignment channel 545 is configured to receive a tab disposed on the interior of the surgical garment to align and/or orient the surgical garment relative to the surgical helmet 120, as is described in more detail above. While the exemplary configuration of the face frame 524 illustrated in FIGS. 9A and 9B comprises an alignment channel 545, it is contemplated that the face frame 546 may be configured without an alignment channel 545, similar to the face frame 24 illustrated in FIGS. 1A and 1B.

The upper beam 529 may further comprise a coupling feature 546, such as a protrusion, configured to removably engage one of the transparent shields and/or surgical garments described above. The coupling feature 546 may comprise a protrusion, magnetic member, ferromagnetic member, hook and loop, or similar coupling mechanism configured to releasably engage the surgical garment to align and/or couple the surgical garment to the surgical helmet 120. For example, as illustrated in FIG. 9A, the coupling feature 546 is realized as a protrusion 546 extending from the alignment channel 545 of the upper beam 529. The combination of the spaced-apart sidewalls of the alignment channel 545 and the coupling feature 146 may serve to align and/or orient the transparent shield and/or the surgical garment relative to the surgical helmet 120. More specifically, the spaced-apart sidewalls of the alignment channel 545 may serve to guide the tab of the transparent shield and/or the surgical garment into engagement with the coupling feature 546 as the surgical garment is placed over the surgical helmet 120.

The upper beam 529 may comprise a mounting member 556, 558 positioned at opposing ends of the lateral portions 529A, 529B of the upper beam 529. As illustrated in FIGS. 9A and 9B, the mounting feature may comprise a first mounting feature 556 and a second mounting feature 558. For example, the first mounting feature 556 may comprise a post 556 extending from the distal surface of the upper beam 529, where the post 556 comprises a fastening feature 556A. The second mounting feature 558 may comprise a post 558 extending from the distal surface of the upper beam 529. While the mounting feature(s) 556, 558 illustrated in FIGS. 9A and 9B include a pair of posts 556, 558, it is also contemplated that the mounting feature(s) 556, 558 may be configured as a magnet, a hook, a hook and loop fastener, one or more apertures, a threaded fastener, or the like.

The face frame 524 may comprise a first post 526 and a second post 527. The first and second posts 526, 527 may be coupled to the upper beam 529 by a mounting bracket 553. The mounting bracket 553 may be formed from generally flexible material and be configured to extend from the top end of the first and second posts 526, 527. The mounting bracket 553 may comprise a face frame coupler 552, 554 corresponding to the mounting feature(s) 556, 558 of the upper beam 529 to couple the first and second posts 526, 527 to the upper beam 529. For example, as illustrated in FIGS. 9A and 9B, the mounting bracket 553 may comprise a first aperture 552 and a second aperture 554. The first aperture 552 may be configured to couple with the first mounting feature 556. For example, the first aperture 552 may define an opening in the bracket 553 that is shaped to allow the fastening feature 556A of the first mounting feature 556 to be inserted through the first aperture 552, and then the first post 556 may be seated into a smaller portion of the first aperture 552 such that the fastening feature 556A prevents the bracket 553 from sliding off of the first post 556. The second aperture 554 in the bracket 553 may correspond to the second mounting feature 558, wherein the second aperture 554 and the second mounting feature 558 are arranged and configured to secure the first aperture 552 in place relative to the first mounting feature 556.

Where the upper beam 529 is configured to extend across the front of the surgical helmet 120, the mounting feature(s) 556, 558 and the mounting bracket(s) 553 of the first and second posts 526, 527 may be configured to couple with one another to attach the first and second posts 526, 527 to the corresponding lateral portions 529A, 529B of the upper beam 529. For example, as illustrated in FIGS. 9A and 9B, the first and second posts 526, 527 may be connected to opposing ends 529A, 529B of the upper beam 529 by inserting the mounting feature(s) 556, 558 into the corresponding face frame coupler 552, 554 of the mounting bracket 553. For example, to secure the post 526, 567 to the upper beam 529, the mounting bracket 553 may be flexed to manipulate the second aperture 554 away from the second mounting feature 558 to position the first mounting feature 556 within the first aperture 552. Once the first mounting feature 556 is positioned within the first aperture 552, the bracket 553 may be allowed to return to its normal state/orientation, positioning the second mounting feature 558 within the second aperture 554. Alternatively, to remove the post 526, 527 from the upper beam 529, the mounting bracket 553 may be flexed to disengage the second aperture 554 from the second mounting feature 558, allowing the mounting bracket 553 to be manipulated to disengage the first mounting feature 556 from the first aperture 552.

The face frame 524 may further comprise a lower beam 528 that may extend between the opposed free ends of the first and second posts 526, 527. The face frame 524 is formed so that the lower beam 528 is located below and slightly forward of the chin of the person wearing the surgical helmet 120. The lower beam 528 may be bowed outwardly from the free ends of the posts 526, 527. The face frame 524 may extend outwardly from the upper beam 529 such that the face frame 524 is positioned forward of and generally encircles the face of the wearer when the surgical helmet 120 is secured to the wearer's head. Collectively, the combination of the first and second posts 526, 527 and the lower beam 528 may also be referred to as a chin bar, as they generally define an opening positioned in front of the wearer's face and extend below the wearer's chin when the surgical helmet is positioned on top of the wearer's head.

Similar to the chin bars and/or face frames described above, the face frame 524 may comprise a plurality of coupling members 548 that may be mounted to or disposed within the face frame 524. The coupling members 548 comprise magnetic material and are configured to align and/or attach one of the various transparent shields and/or the surgical garments described above to the surgical helmet 120. Each coupling member 548 may be positioned on the face frame 524 proximate to the opposed first and second posts 526, 527 and/or adjacent opposing ends of the lower beam 528. Alternatively, the coupling members 548 of the surgical helmet 120 could be arranged or otherwise configured in any suitable way to cooperate with the complementary attachment elements of the surgical garment to releasably secure the surgical garment to the face frame 524 of the surgical helmet 120. It is contemplated that other types of coupling members 548 may be used in place of and/or in addition to those comprising magnetic materials, such as with hook and loop fasteners, snaps, coupling members comprising ferromagnetic materials, or similar type fasteners. Other configurations are contemplated. Exemplary configurations of coupling members are disclosed in U.S. Pat. No. 10,420,386, which is hereby incorporated by reference in its entirety.

Referring to FIG. 9A, an exemplary configuration of a coupling member 548 positioned within the face frame 524 is illustrated. The coupling member 548 may comprise a distal surface. The face frame 524 may comprise a recess configured to receive the coupling feature 548. For example, the coupling member 548 may be positioned within the recess of the face frame 524, such that the distal surface of the coupling member 548 is positioned proximally to a distal surface of the face frame 524.

While the exemplary face frame 524 illustrated in FIGS. 9A and 9B includes many of the features illustrated in and described with respect to FIGS. 2A and 2B, it is also contemplated that the face frame 524 may be configured to include features similar to those illustrated in and described with respect to FIGS. 1A and 1B. The mounting feature(s) 556, 558 and the mounting bracket 553 are not intended to be limited to a specific configuration, but are intended be an exemplary means of removably coupling any variation or configuration of a chin bar and/or face frame to 524 to a surgical helmet 120.

Figure 10A:
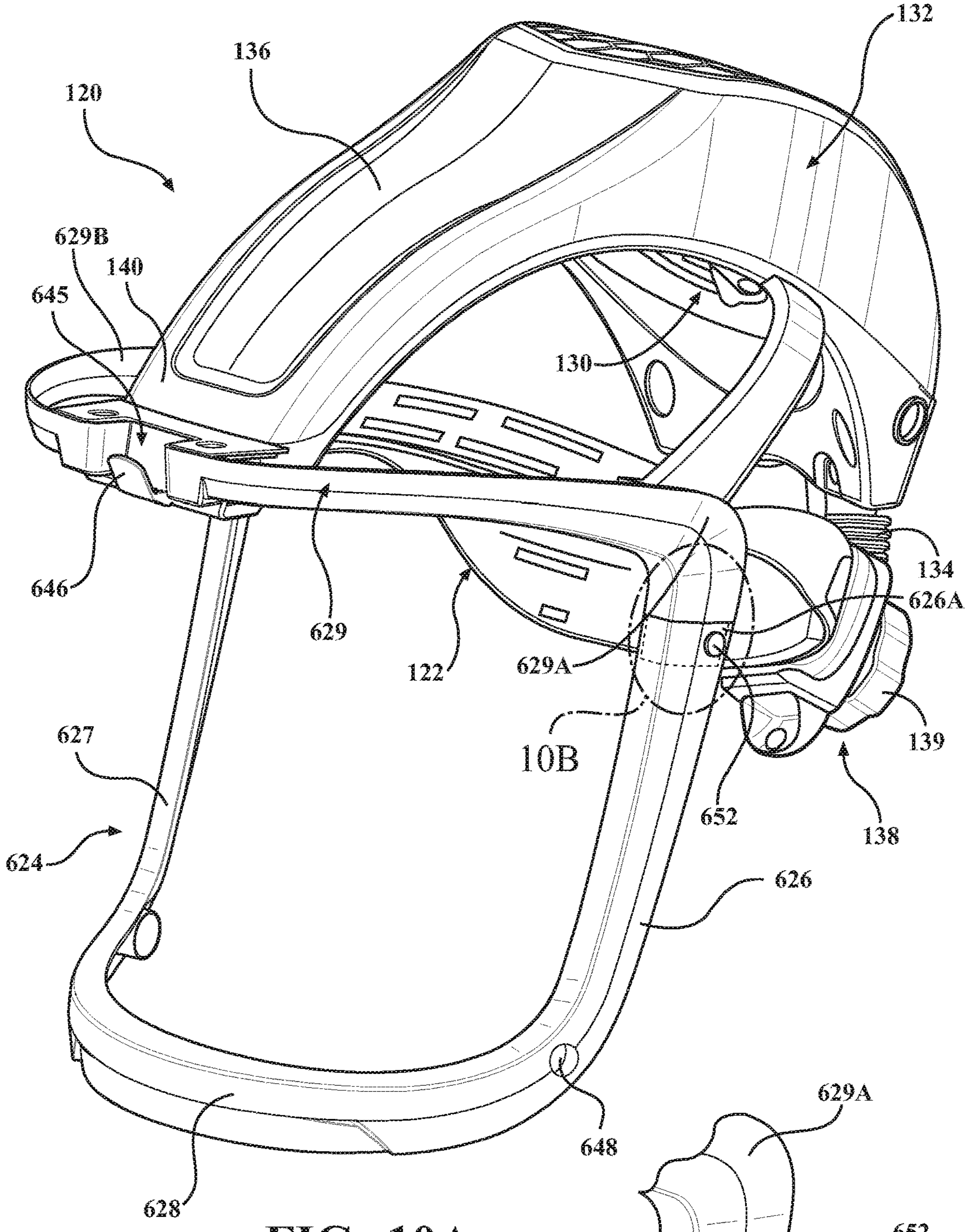
FIG. 10A is a perspective view of a seventh configuration of a surgical helmet assembly including a fifth reconfigurable face frame.
Figure 10B:
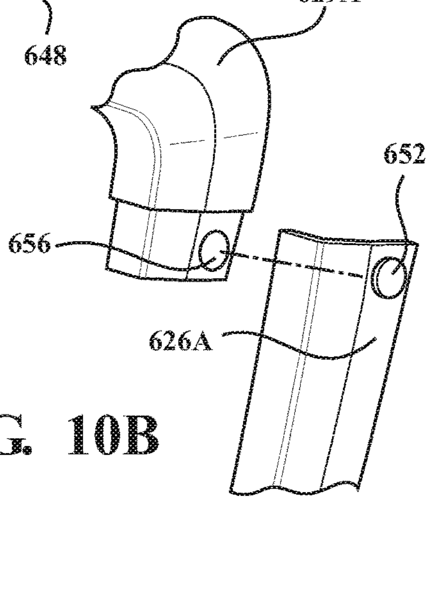
FIG. 10B is a partial exploded view of a chin bar attachment mechanism of the fifth reconfigurable face frame of FIG. 10A.

Referring to FIGS. 10A and 10B, an alternative configuration of the face frame 624 including a mounting feature 656 and mounting bracket 653 for removably coupling the face frame 624 to a surgical helmet 120 is illustrated. A number of components of the face frame 624 illustrated in FIGS. 10A and 10B comprise the same last two digits as various components described above with regard to alternative features and/or configurations of the surgical helmet, face frame, and/or surgical garment. It should be understood that the components of the face frame 624 and surgical helmet 120 illustrated in FIGS. 10A and 10B having the same last two digits as other components described above may comprise any and/or all of the same features or characteristics of the similar components described above.

FIGS. 10A and 10B illustrate an alternative means for removably coupling a face frame 624 to a surgical helmet 120. The face frame 624 may comprise an upper beam 629 with opposing lateral portions 629A, 629B. The upper beam may be positioned forward of the shell 132 of the surgical helmet 120 and configured to extend across the front of the surgical helmet 120.

The upper beam 629 may comprise a mounting feature 656 positioned at opposing ends of the lateral portions 629A, 629B of the upper beam 629. As illustrated in FIGS. 10A and 10B, the mounting feature may comprise a mounting feature 656. For example, the mounting feature 656 may comprise a magnet 656 disposed on the distal surface of the upper beam 629. While the mounting feature 656 is described as being a magnet, it is also contemplated that the mounting feature 656 may be configured as a ferromagnetic material, a hook and loop fastener, or the like.

The face frame 624 may comprise a first post 626 and a second post 627. The first and second posts 626, 627 may be coupled to the upper beam 629 by a mounting bracket 653. The mounting bracket 653 may comprise a face frame coupler 652 corresponding to the mounting feature 656 of the upper beam 629 to couple the first and second posts 626, 627 to the upper beam 629. For example, as illustrated in FIGS. 10A and 10B, the mounting bracket 653 may comprise a face frame coupler 652 comprising a ferromagnetic material. Alternatively, it is also contemplated that the face frame coupler 652 may comprise a magnet. The face frame coupler 652 may be configured to couple with the mounting feature 656 of the upper beam 629. For example, the face frame coupler 652 may be one of a ferromagnetic material or a magnet disposed on or within the bracket 653 and the mounting feature 656 may comprise the other of a ferromagnetic material or a magnet, such that a magnetic attraction may be formed between the face frame coupler 652 and the mounting feature 656, allowing for coupling of the posts 626, 627 to the upper beam 629. The posts 626, 627 may be formed of a flexible material to allow the posts 626, 627 to be manipulated to position the face frame coupler 652 adjacent the mounting feature 656 of the upper beam 629.

Figure 11A:
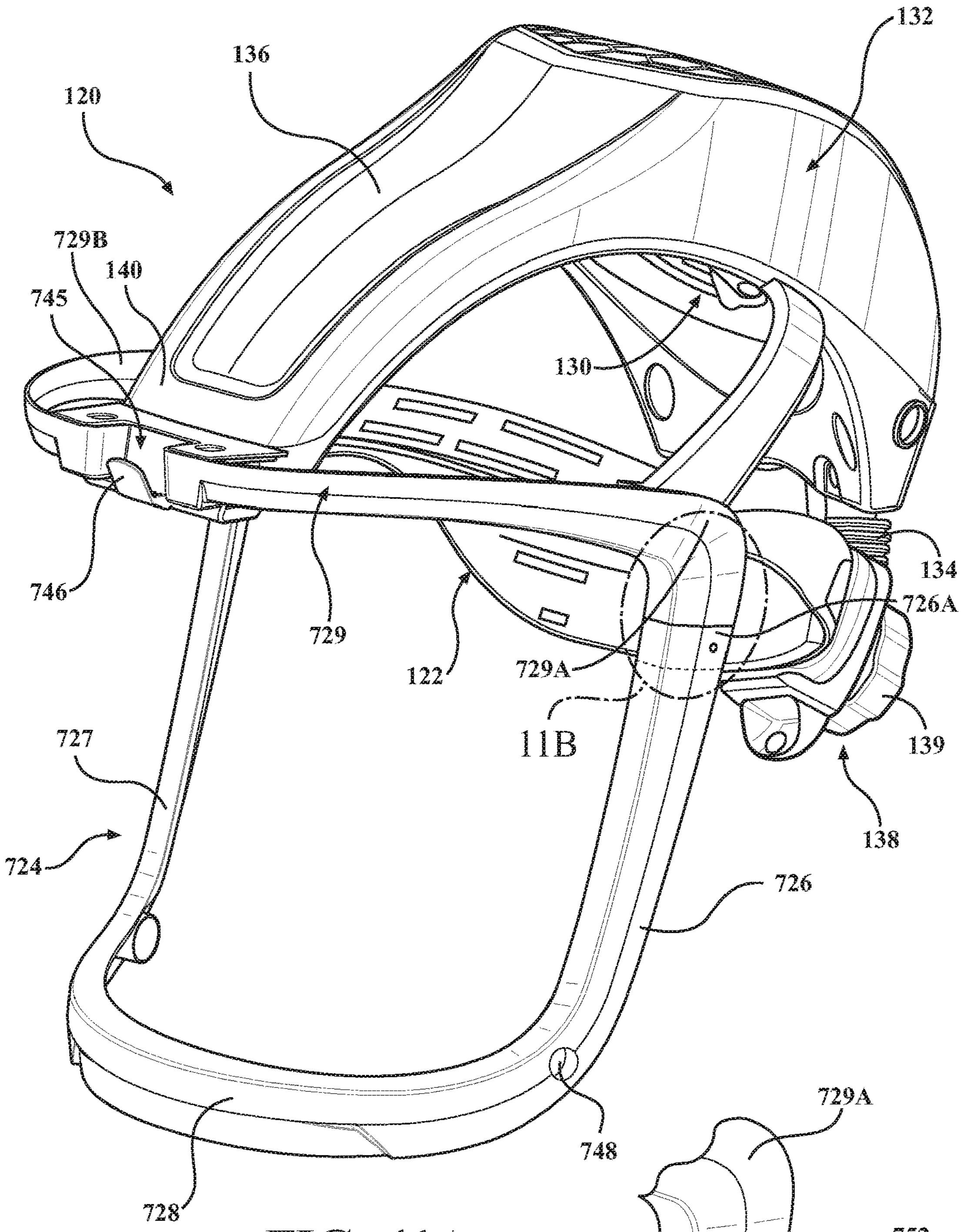
FIG. 11A is a perspective view of an eighth configuration of a surgical helmet assembly including a sixth reconfigurable face frame.
Figure 11B:
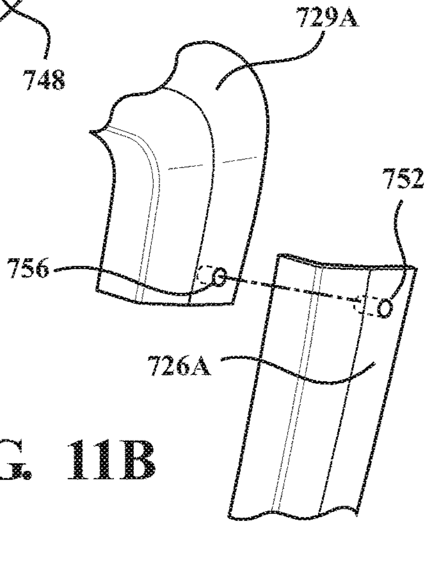
FIG. 11B is a partial exploded view of a chin bar attachment mechanism of the sixth reconfigurable face frame of FIG. 11A.

Referring to FIGS. 11A and 11B, an alternative configuration of a face frame 724 including a mounting feature 756 and mounting bracket 753 for removably coupling the face frame 724 to a surgical helmet 120 is illustrated. A number of components of the face frame 724 illustrated in FIGS. 11A and 11B comprise the same last two digits as various components described above with regard to alternative features and/or configurations of the surgical helmet, face frame, and/or surgical garment. It should be understood that the components of the face frame 724 and surgical helmet 120 illustrated in FIGS. 11A and 11B having the same last two digits as other components described above may comprise any and/or all of the same features or characteristics of the similar components described above.

FIGS. 11A and 11B illustrate an alternative means for removably coupling a face frame 724 to a surgical helmet 120. The face frame 724 may comprise an upper beam 729 with opposing lateral portions 729A, 729B. The upper beam may be positioned forward of the shell 132 of the surgical helmet 120 and configured to extend across the front of the surgical helmet 120.

The upper beam 729 may comprise a mounting feature 756 positioned at opposing ends of the lateral portions 729A, 729B of the upper beam 729. As illustrated in FIGS. 11A and 11B, the mounting feature 756 may comprise an aperture. For example, the mounting feature 756 may comprise an aperture 756 defined by the distal surface of the upper beam 729. While the mounting feature 756 is described as being an aperture, it is also contemplated that the mounting feature 756 may be configured as a loop, slot, or the like.

The face frame 724 may comprise a first post 726 and a second post 727. The first and second posts 726, 727 may be coupled to the upper beam 729 by a mounting bracket 753. The mounting bracket 753 may comprise a face frame coupler 752 corresponding to the mounting feature 756 of the upper beam 729 and configured to couple the first and second posts 726, 727 to the upper beam 729. For example, as illustrated in FIGS. 11A and 11B, the mounting bracket 753 may comprise a face frame coupler 752 comprising a post. Alternatively, it is also contemplated that the face frame coupler 752 may comprise a hook, clasp, snap, pin, or other similar fastener. The face frame coupler 752 may be configured to couple with the mounting feature 756 of the upper beam 729. For example, as illustrated in FIG. 11B, the face frame coupler 752 may be a post extending from the bracket 753, and the mounting feature 756 may comprise an aperture configured to receive the face frame coupler 752. The face frame coupler 752 and the mounting feature 756 may be sized to create a friction fit to allow for coupling of the posts 726, 727 to the upper beam 729. The posts 726, 727 may be formed of a flexible material to allow the posts 726, 727 to be manipulated to position the face frame coupler 752 within the mounting feature 756 of the upper beam 729. It is also contemplated that the face frame coupler 752 and the mounting feature 756 may comprise complementary magnetic and ferromagnetic materials to create a magnetic attraction between the face frame coupler 752 and the mounting feature 756. For example, the mounting feature 756 may comprise an aperture defined by a magnets disposed in the upper beam 729, and the face frame coupler 752 may comprise a post made of a magnetic material such that the magnetic attraction between the face frame coupler 752 and the mounting feature 756 holds the post within the aperture when the posts 726, 727 are coupled to the upper beam 729.

Referring to FIGS. 12A-12E, an alternative configuration of a face frame 824 for use with a surgical helmet is illustrated. A number of components of the face frame 824 illustrated in FIGS. 12A-12E comprise the same last two digits as various components described above with regard to alternative features and/or configurations of the surgical helmet, face frame, and/or surgical garment. It should be understood that the components of the face frame 824 and surgical helmet 120 illustrated in FIGS. 12A-12E having the same last two digits as other components described above may comprise any and/or all of the same features or characteristics of the similar components described above.

The face frame 824 may be configured to be removably coupled to the surgical helmet 120. The surgical helmet 120 may comprise one more coupling features 856, 858 disposed on and/or within the shell 132 of the surgical helmet 120. More specifically, a first coupling feature 856 may be disposed on and/or within front bellows 136 or front nozzle 140 of the shell 132 of the surgical helmet 120. The surgical helmet 120 may also comprise a second coupling feature 858 that may be disposed on the shell 132. More specifically, the second coupling feature 858 may be disposed on a support member extending from the shell 132 of the surgical helmet 120. The coupling features 856, 858 may comprise a magnet. Alternatively, the coupling features 856, 858 may comprise a tab, slot, channel, hook and loop, post, aperture, or similar fastening means.

As illustrated in FIGS. 12A-12E, the face frame 824 may comprise an upper beam 829 with opposing lateral portions 829A, 829B. The upper beam 829 may be positioned forward of the shell 132 of the surgical helmet 120 and configured to extend across the front of the surgical helmet 120. The upper beam 829 may comprise one more fastening members 852 disposed on or proximate the proximal surface of the upper beam 829. The fastening members 852 may comprise a disk, rivet, post, tab, hook and loop, or similar fastening means that may be configured to be removably coupled with the complementary coupling feature 856 of the surgical helmet 120. For example, the fastening members 852 may comprise one of a ferromagnetic rivet and a magnet, and the coupling feature 856 may comprise the other of a magnet and a ferromagnetic rivet configured to create a magnetic attraction to removably couple the face frame 824 to the surgical helmet 120. Alternatively, the coupling feature 856 of the surgical helmet 120 may comprise an aperture or slot and the fastening member 852 of the face frame 824 may comprise a complementary-sized post or tab configured to be inserted within the coupling feature to removably couple the face frame 824 to the surgical helmet 120. It is further contemplated that a combination of the exemplary coupling features 856 and exemplary fastening members 852 may be utilized. For example, the coupling feature 856 of the surgical helmet 120 may comprise a magnet disposed within a recess, and the fastening members 852 may comprise a post constructed from a ferromagnetic material configured to fit within the recess when the fastening members 852 are positioned adjacent the coupling feature 856 to removably couple the face frame 824 to the surgical helmet 120.

The face frame 824 may comprise a first post 826 and a second post 827. The first and second posts 826, 827 may extend from the upper beam 829. The face frame 824 may further comprise a lower beam 828 that may extend between the opposed free ends of the first and second posts 826, 827 opposite the upper beam 829.

The face frame 824 may further comprise a bracket 853 extending from each of the opposing lateral portions 829A, 829B of the upper beam 829. The bracket 853 may be configured to extend in a generally proximal direction from the upper beam 829 toward the rear of the surgical helmet 120.

The face frame 824 may further comprise a mass 857 coupled to the proximal portion of the bracket 853 opposite the distal portion that is coupled to the upper beam 829. The mass 857 may also be referred to as a counterweight, counterbalance, ballast, weight, or stabilizer. The mass 857 may comprise a dens material, such as brass, iron, copper, tungsten or steel. It is contemplated that the mass 857 may be permanently or removably coupled to the bracket 853. For example, the mass 857 may be permanently coupled to the bracket 853 using an epoxy or adhesive. It is also contemplated that the mass 857 may be removably coupled to the bracket 853 using a screw, bolt, nut, friction fit or another similar fastening technique or device. The mass 857 may be weighted and positioned relative to the face frame 824 to offset the weight of upper beam 829, posts 826, 827, and the lower beam 828 of the face frame 824 when the face frame 824 is coupled to the surgical helmet 120. The purpose of the mass 857 is to balance the center of gravity of the surgical helmet 120. For example, it is contemplated that the surgical helmet 120 may be designed and configured to be used by a medical professional without a face frame 824. Therefore, it is contemplated that the surgical helmet 120 may be designed and configured to position the center of gravity of the surgical helmet 120 proximate the center of the medical professional's head without the face frame 824. Typically, when coupling additional components to the surgical helmet, such as the face frame 824, the center of gravity is likely to be shifted laterally in the direction where the component is added. For example, when attaching the face frame 824 to the front of the surgical helmet 120, the center of gravity of the surgical helmet 120 would be shifted forward, moving the center of gravity away from the center of the wearer's head. The center of gravity not being positioned over the center of the wearer's head is likely to cause additional strain and/or physical exertion by the wearer to support the surgical helmet 120 with the face frame 824. However, the mass 857 coupled to the proximal end of the bracket 853 may comprise a specific weight relative to the weight of the face frame 824 and or the surgical helmet to offset the shift in the center of gravity of the surgical helmet 120 when the face frame 824 is attached. It is also contemplated that the mass 857 may be positioned at a specific distance along the bracket 853 from the upper beam 829, such that the combination of the weight and the position of the mass 857 relative to the surgical helmet 120 will balance the center of gravity of the surgical helmet 120 in the lateral directions. While the center of gravity of the surgical helmet 120 may move vertically relative to the wearer's head, the center of gravity will remain generally centered over the wearer's head. While the center of gravity of the surgical helmet 120 is generally described relative to the center of the wearer's head, it is contemplated that the preferred location for the center of gravity of the surgical helmet 120 may not be directly over the center of the wearer's head based on the preferred and most beneficial location for loading to be placed on the wearer's head, neck, and/or spine. Describing the use of a mass 857 to maintain the center of gravity over the center of the wearer's head is only for the purpose of explanation and it is contemplated that the mass 857 may be utilized to maintain the center of gravity at any preferred or optimal location over the wearer's head, neck, and or spine.

Figure 12A:
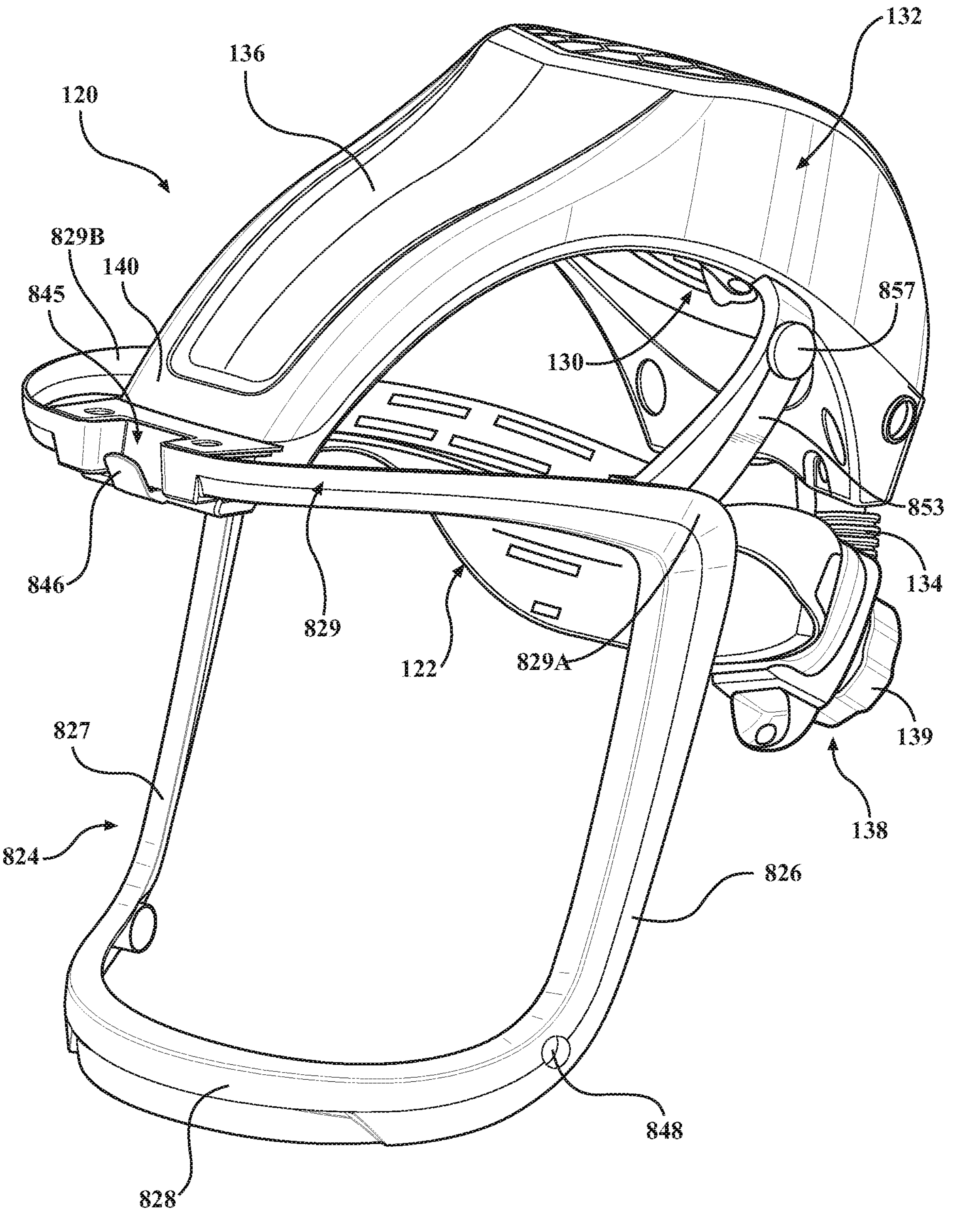
FIG. 12A is a perspective view of a ninth configuration of a surgical helmet assembly including a seventh reconfigurable face frame.
Figure 12B:
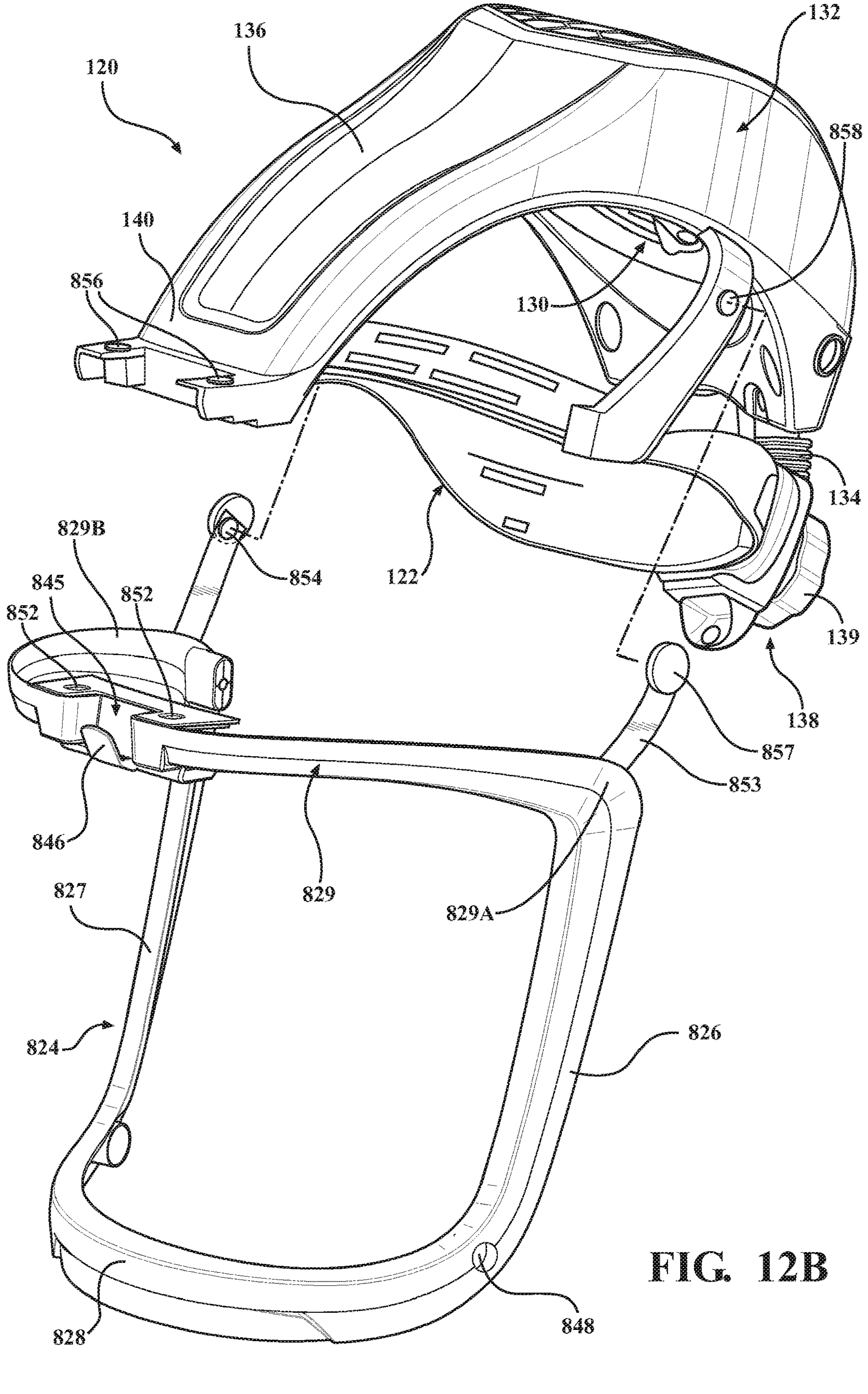
FIG. 12B is a partial exploded view of the ninth configuration of the surgical helmet assembly of FIG. 12A.
Figure 12C:
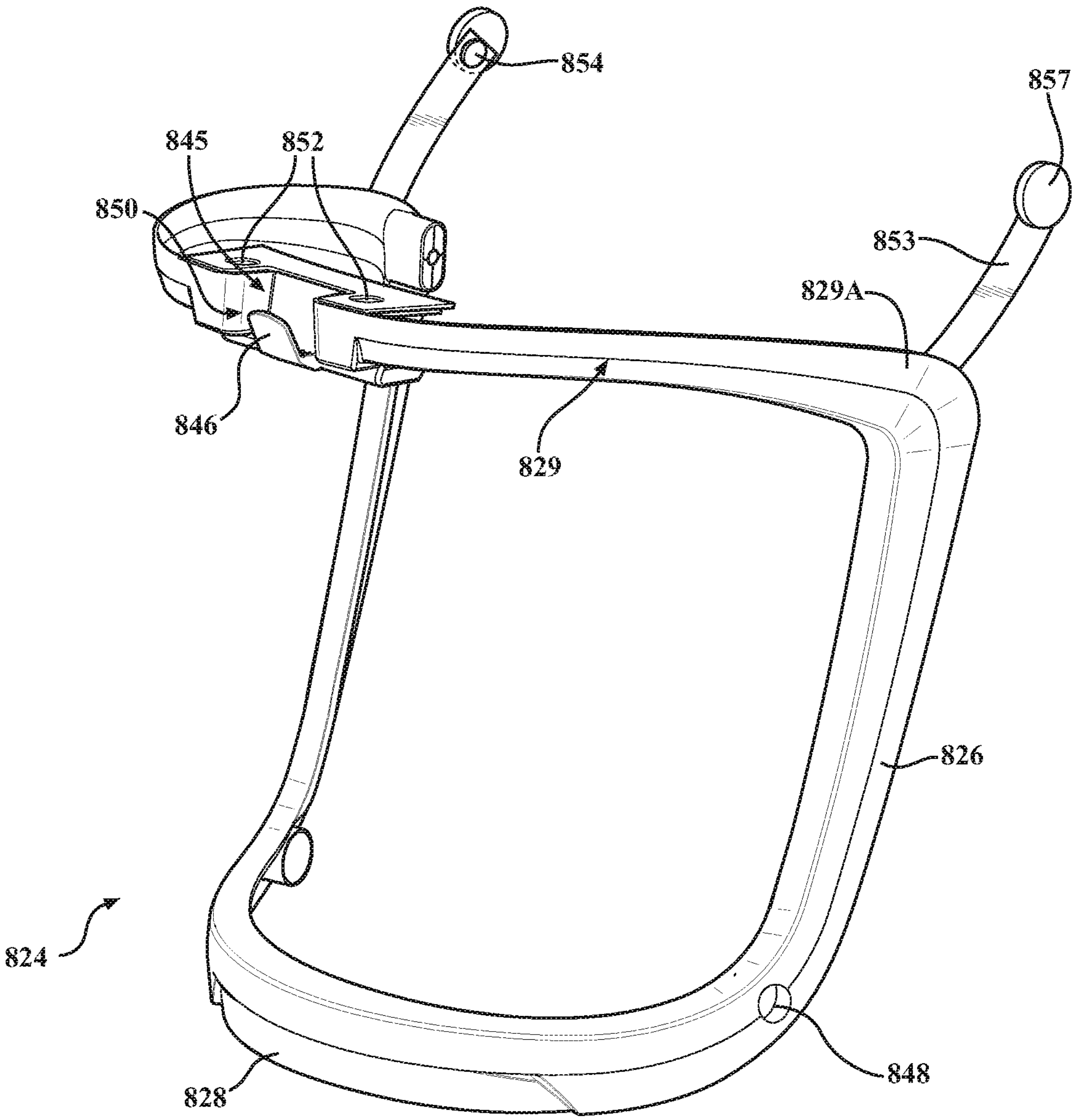
FIG. 12C is a perspective view of the seventh reconfigurable face frame of the surgical helmet assembly of FIG. 12A.

Referring to FIGS. 12B and 12C, the mass 857 may further comprise a fastening member 854. The fastening member 854 may comprise a disk, rivet, post, tab, hook and loop, or similar fastening means that may be configured to be removably coupled with a complementary second coupling feature 858 disposed on or within the shell 132 of the surgical helmet 120. For example, the fastening members 854 may comprise one of a ferromagnetic rivet and a magnet, and the second coupling feature 858 may comprise the other of a magnet and a ferromagnetic rivet configured to create a magnetic attraction to removably couple the bracket 853, the mass 857, and/or the face frame 824 to the surgical helmet 120. It is also contemplated that the second coupling feature 858 may comprise a magnet and the mass 857 may be constructed of a ferromagnetic material such that the mass 857 may couple directly to the second coupling feature 858 without need for a separate fastening member 854. Alternatively, the coupling feature 858 of the surgical helmet 120 may comprise an aperture or slot, and the fastening member 854 of the mass 857 may comprise a complementary-sized post or tab configured to be inserted within the second coupling feature 858 to removably couple the bracket 853, the mass 857, and/or the face frame 824 to the surgical helmet 120. It is further contemplated that a combination of the exemplary coupling features 858 and exemplary fastening members 854 may be utilized. For example, the second coupling feature 858 of the surgical helmet 120 may comprise a magnet disposed within a recess and the fastening members 854 may comprise a post constructed from a ferromagnetic material configured to fit within the recess when the fastening members 854 are positioned adjacent the coupling feature 858 to removably couple the bracket 853, the mass 857, and/or the face frame 824 to the surgical helmet 120.

Figure 12D:
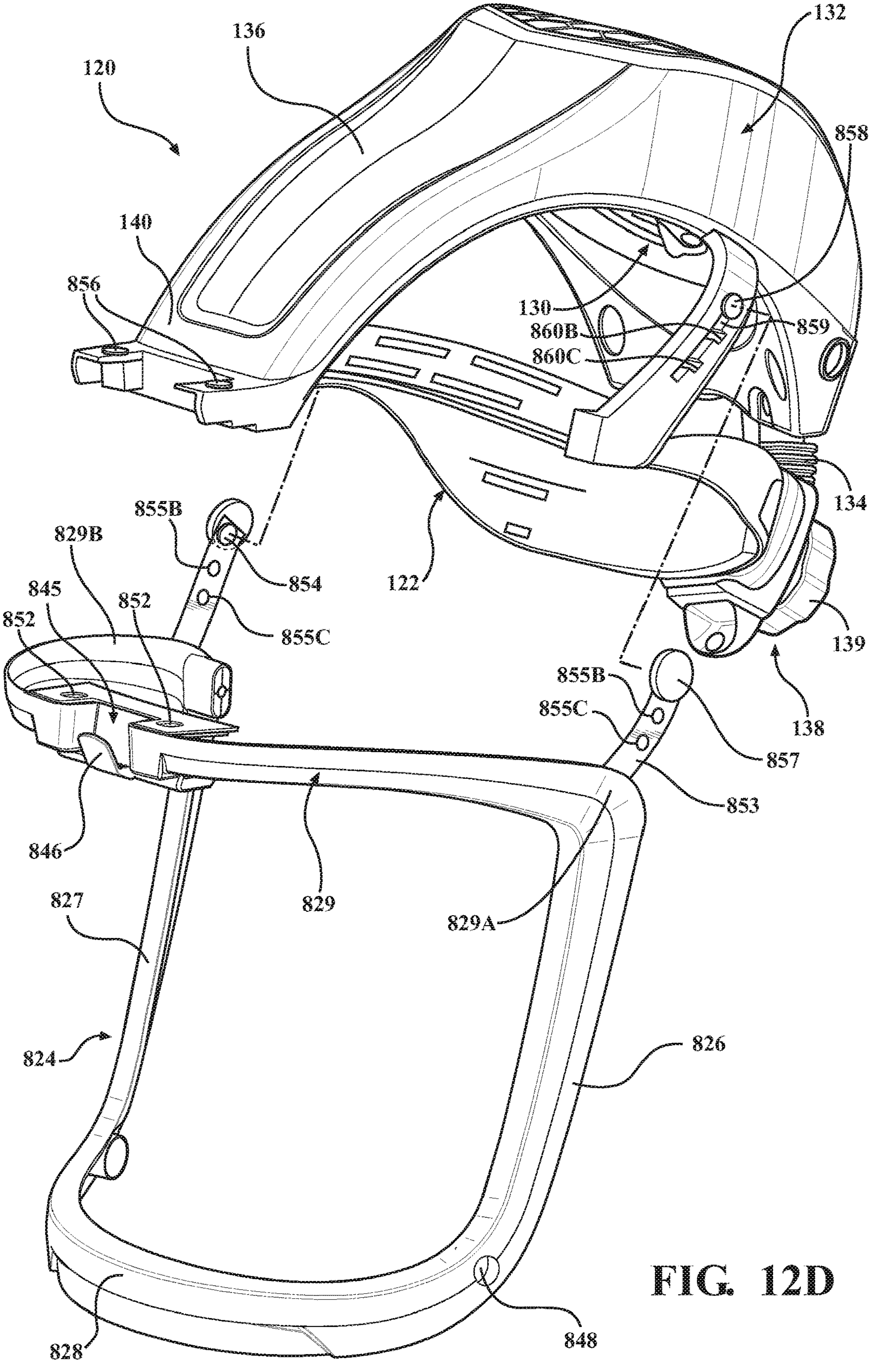
FIG. 12D is a perspective view of the seventh reconfigurable face frame of the surgical helmet assembly of FIG. 12A including a repositionable mass for use with a sliding coupling feature of the surgical helmet.
Figure 12E:
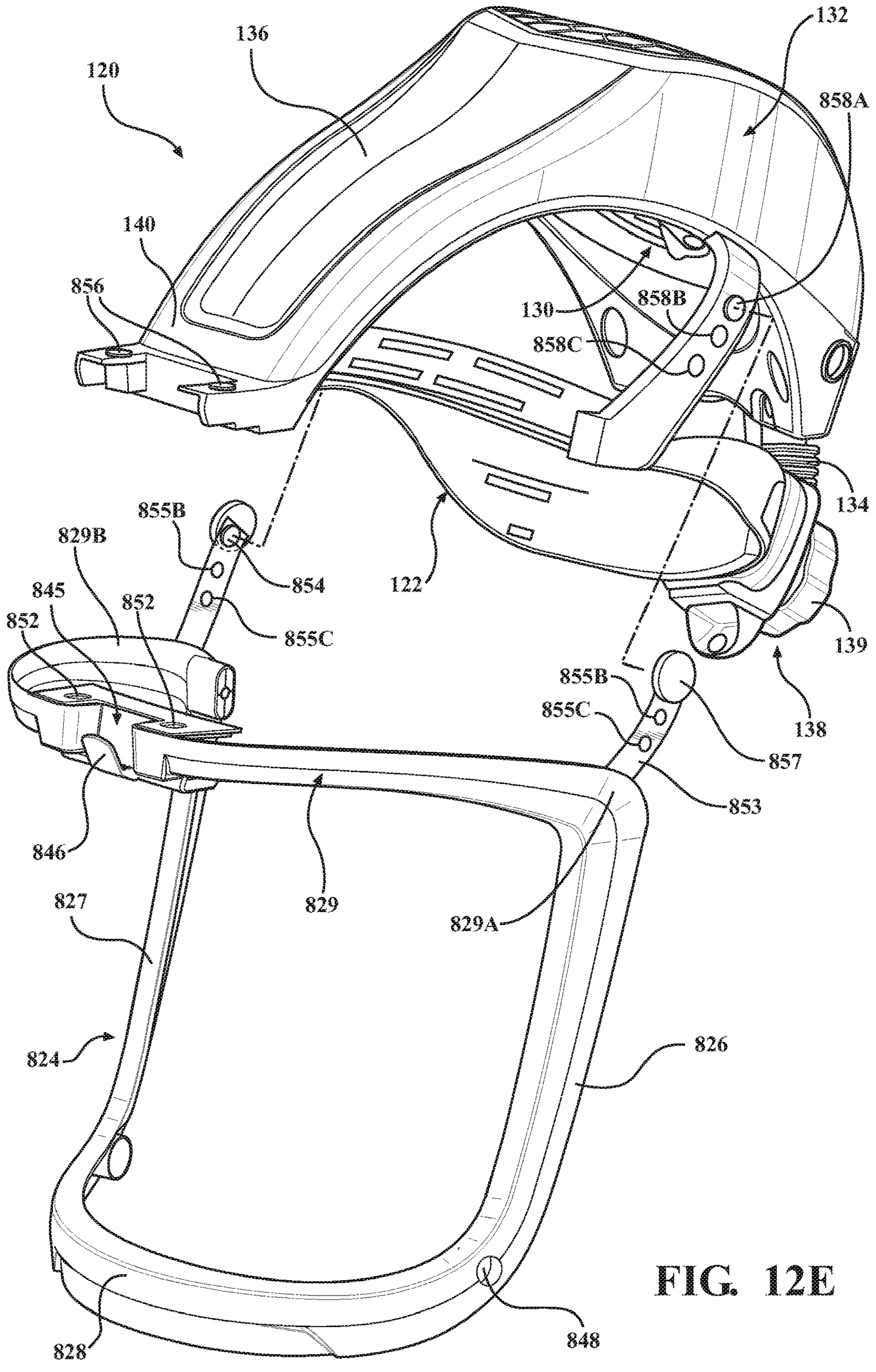
FIG. 12E is a perspective view of the seventh reconfigurable face frame of the surgical helmet assembly of FIG. 12A including a repositionable mass for use with a plurality of coupling features mounted on the surgical helmet.

It is also contemplated that the mass 857 may repositionable relative to the surgical helmet 120 to manipulate the location of the center of gravity of the surgical helmet 120 when the face frame 824 is coupled to the surgical helmet 120. Referring to FIGS. 12D and 12E, exemplary features of the face frame 824 and/or surgical helmet 120 for repositioning the mass 857 are illustrated. For example, as illustrated in FIG. 12D, the bracket 853 may comprise a plurality of apertures 855A, 855B, 855C. As described above, the mass 857 may comprise a fastening member 854. In addition to coupling the to the coupling feature 858 of the surgical helmet 120, the fastening member 854 may be configured to removably coupled the mass 857 to the bracket 853. For example, the mass may comprise a post that may be inserted through one of the plurality of apertures 855A, 855B, 855C in the bracket 853 and the fastening member 854 may comprise a corresponding opening configured to receive the post of the mass 857. Alternatively, the mass 857 and fastening member 854 may comprise corresponding snap fit, magnetic, or similar coupling features that allow the mass 857 and fastening member 854 to removably couple to the bracket 853.

To accommodate the fastening member 854 being repositionable on the bracket 853, the coupling feature 858 of the surgical helmet 120 may similarly be repositionable. For example, as illustrated in FIG. 12D, the coupling feature 858 may be slidably mounted to the surgical helmet 120. For example, the surgical helmet 120 may comprise a slot 859 that the coupling feature 858 may be slid within. The slot 859 may further comprise one or more grooves 860A, 860B, 860C or notches spaced along the slot 859. The grooves 860A, 860B, 860C may be configured to hold the coupling feature 858 at that position in the slot of a particular groove 860A, 860B, 860C until a force is applied to the coupling feature 858 to move the coupling feature 858 to a different groove 860A, 860B, 860C. For example, as illustrated in FIG. 12D, the coupling feature 858 is seated in a first groove 860A of the slot 859. The position of the grooves 860A, 860B, 860C in the slot 859 may coincide with the various apertures 855A, 855B, 855C in the bracket 853, such that when the mass 857 and fastening member 854 are positioning in the first aperture 855A, the coupling feature 858 may be seated in the first groove 860A of the slot 859 to allow the fastening member 854 to removably couple with the coupling feature 858 when attaching the face frame 824 to the surgical helmet 120. Alternatively, when the mass 857 and fastening member 854 are positioning in the third aperture 855C, the coupling feature 858 may be seated in the third groove 860C of the slot 859 to allow the fastening member 854 to removably couple with the coupling feature 858 when attaching the face frame 824 to the surgical helmet 120. While only three grooves 860A, 860B, 860C and three apertures 855A, 855B, 855C are illustrated in FIG. 12D, it is the surgical helmet 120 and/or the face frame 824 may be configured with any number of grooves 860 and corresponding apertures 855 based on the desired placement of the fastening member 854 and the coupling feature 858.

Referring to FIG. 12E, an alternative configuration for a repositionable mass 857 is illustrated. As opposed to the surgical helmet 120 including a slot or track for manipulating the position of the coupling feature 858 as illustrated in FIG. 12D, the configuration of the surgical helmet 120 in FIG. 12D includes a plurality of coupling features 858A, 858B, 858C. The coupling features 858A, 858B, 858C may be spaced about the surgical helmet 120 to define different attachment points for coupling the face frame 824.

Similar to the face frame 824 described above, the bracket 853 may comprise a plurality of apertures 855A, 855B, 855C that allow the mass 857 and/or the fastening member 854 to be repositioned along the length of the bracket 853. The plurality of apertures 855A, 855B, 855C may be spaced along the bracket 853 correspond to the position of the coupling features 858A, 858B, 858C of the surgical helmet 120, such that the plurality of apertures 855A, 855B, 855C will position the fastening member 854 at a location of the bracket 853 to allow for coupling of the fastening member with one of the coupling features 858A, 858B, 858C of the surgical helmet 120 when coupling the face frame 8245 to the surgical helmet 120.

While not illustrated in the Figures, it is also contemplated that the surgical helmet 120 and the bracket 853 may be configured with a single coupling feature 858 and corresponding fastening member 854, as is illustrated in FIGS. 12A and 12B. The bracket 853 may then comprise a plurality of coupling member, such as a magnet, ferromagnetic coupler, hook and loop fastener, or similar fastener spaced along the length of the bracket 853 at different distances and/or positions. The mass 857 may then comprise a corresponding coupling member to for removably coupling the mass 857 to the any of the plurality of coupling members on the bracket 853. This would allow the mass 857 to be repositioned along the length of the bracket 853 to manipulate the location of the center of gravity of the surgical helmet 120 when the face frame 824 is coupled to the surgical helmet 120.

Referring to FIGS. 13A-13D, an exemplary configuration of a face shield 318A of a surgical garment is illustrated. The face shield 318A may be configured to be used with any of the surgical helmets 20, 120, and/or as a component of the various surgical garments 12, 112 described above. In configurations of the surgical helmet 20, 120 including a face frame 24, 124, 324, 424, 524, 624, 724, 824, the face shield 18, 118, 218 may be at least partially coupled to the surgical helmet 20, 120 via the coupling members 48, 148, 248, 348, 448, 548, 648, 748, 848 disposed on and/or within a portion of the face frame 24, 124, 324, 424, 524, 624, 724, 824. In those configurations of the face frame 24, 124, 324, 424, 524, 624, 724, 824 where the coupling members 48, 148, 248, 348, 448, 548, 648, 748, 848 disposed on and/or within the post 26/27, 126/127, 226/227, 326/327, 426/427, 526/527, 626/627, 726/727, 826/827, the coupling members 48, 148, 248, 348, 448, 548, 648, 748, 848 also serve to form the curve of the lower portion of the face shield 18, 118, 218. However, as described above, it is also contemplated that there are configurations of the surgical helmet 20, 120 where all or a portion of the face frame 24, 124, 324, 424, 524, 624, 724, 824 may be removably coupled to the surgical helmet 20, 120. In these configurations, the coupling members 48, 148, 248, 348, 448, 548, 648, 748, 848 disposed on and/or within a portion of the face frame 24, 124, 324, 424, 524, 624, 724, 824 may not be present and/or available for coupling the face shield 18, 118, 218 to the surgical helmet 20, 120. Therefore, an alternative face shield 318A and/or surgical garment configuration may be required for use with the surgical helmet 20, 120 that does not require the face frame 24, 124, 324, 424, 524, 624, 724, 824.

Figure 13A:
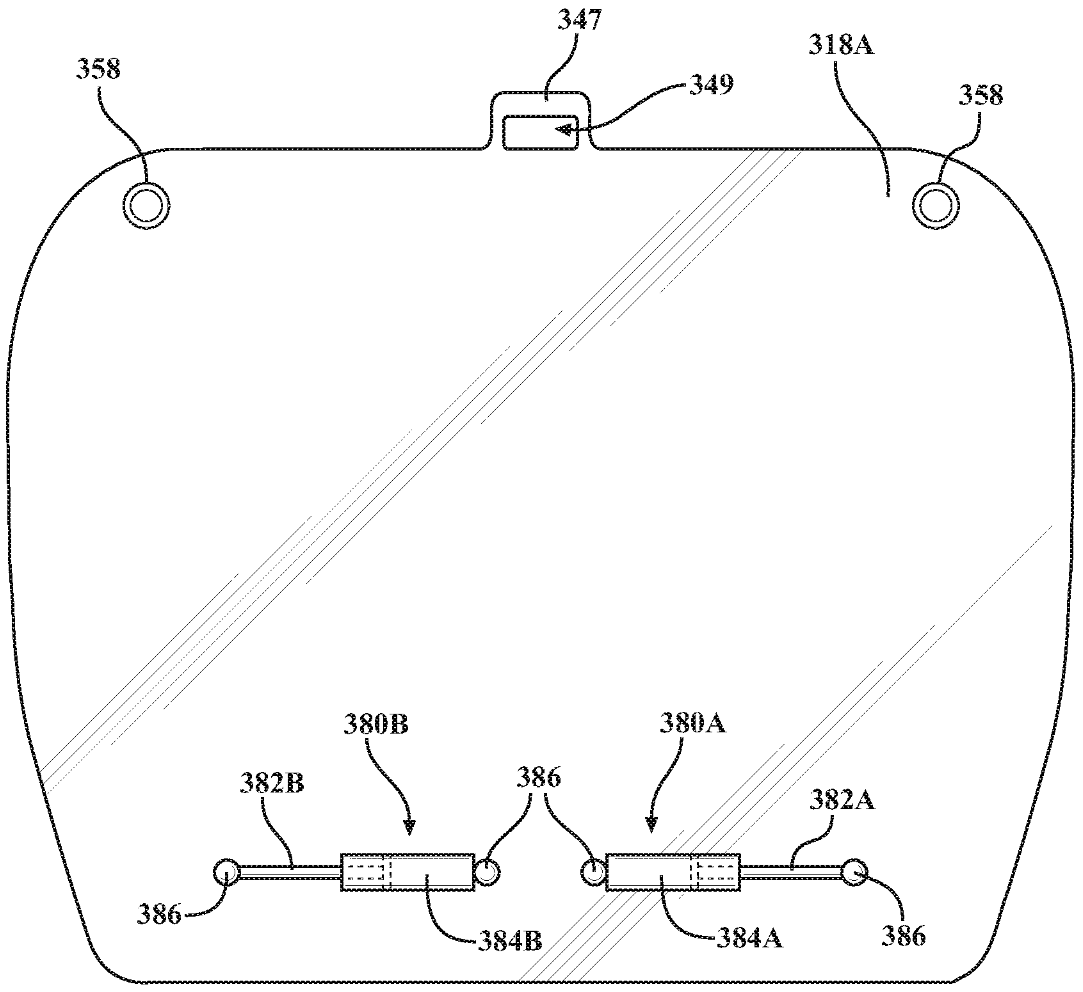
FIG. 13A is a perspective view of a fourth configuration of a transparent shield of a surgical garment for use with a surgical helmet assembly, the transparent shield comprising a curvature mechanism for manipulating the curvature of the transparent shield.

FIGS. 13A-13D illustrate an exemplary configuration of the face shield 318A of a surgical garment 12, 112 that may couple to a surgical helmet 20, 120 that does not include a face frame 24, 124, 324, 424, 524, 624, 724, 824. The face shield may also be referred to as a transparent shield 318A. The face shield 318A may comprise a shield adjustment mechanism 380A, 380B configured to manipulate the curvature of the face shield 318A. The shield adjustment mechanism 380A, 380B may be coupled to the lower portion of the face shield 318A. The shield adjustment mechanism 380A, 380B may be configured to extend and contract to manipulate the curvature of the lower portion of the face shield 318A. For example, as illustrated in FIG. 13A, the face shield 318A may comprise one or more shield adjustment mechanisms 380A, 380B positioned on the lower portion of the face shield 318A.

The shield adjustment mechanism 380A, 380B may be configured as a mechanical actuator similar to a hydraulic cylinder. The shield adjustment mechanism 380A, 380B may comprise a cylinder 384A, 384B and a piston or rod portion 382A, 382B at least partially disposed within the cylinder 384A, 384B. Opposing ends of the shield adjustment mechanism 380A, 380B may be coupled to an interior surface (the surface of the face shield 318A on the wearer side of the surgical garment 12, 112) of the face shield 318 by a hinge 386, a pivot, a joint, or similar pivoting connection. As the shield adjustment mechanism 380A, 380B expands and contracts, the curvature of the face shield 318A is adjusted.

Figure 13B:
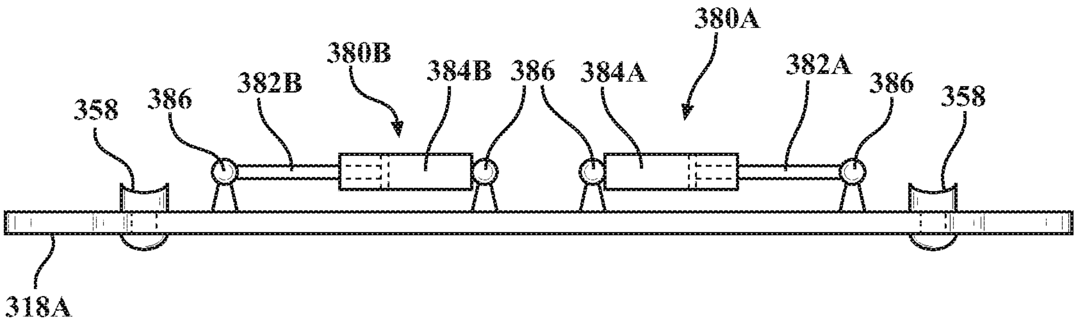
FIG. 13B is a bottom view of the fourth configuration of the transparent shield of FIG. 13A, the curvature mechanism in a first position.
Figure 13C:
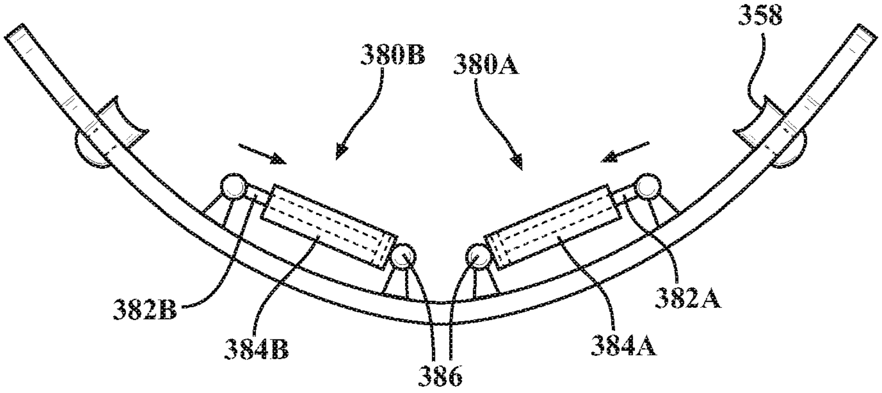
FIG. 13C is a bottom view of the fourth configuration of the transparent shield of FIG. 13A, the curvature mechanism in a second position.
Figure 13D:
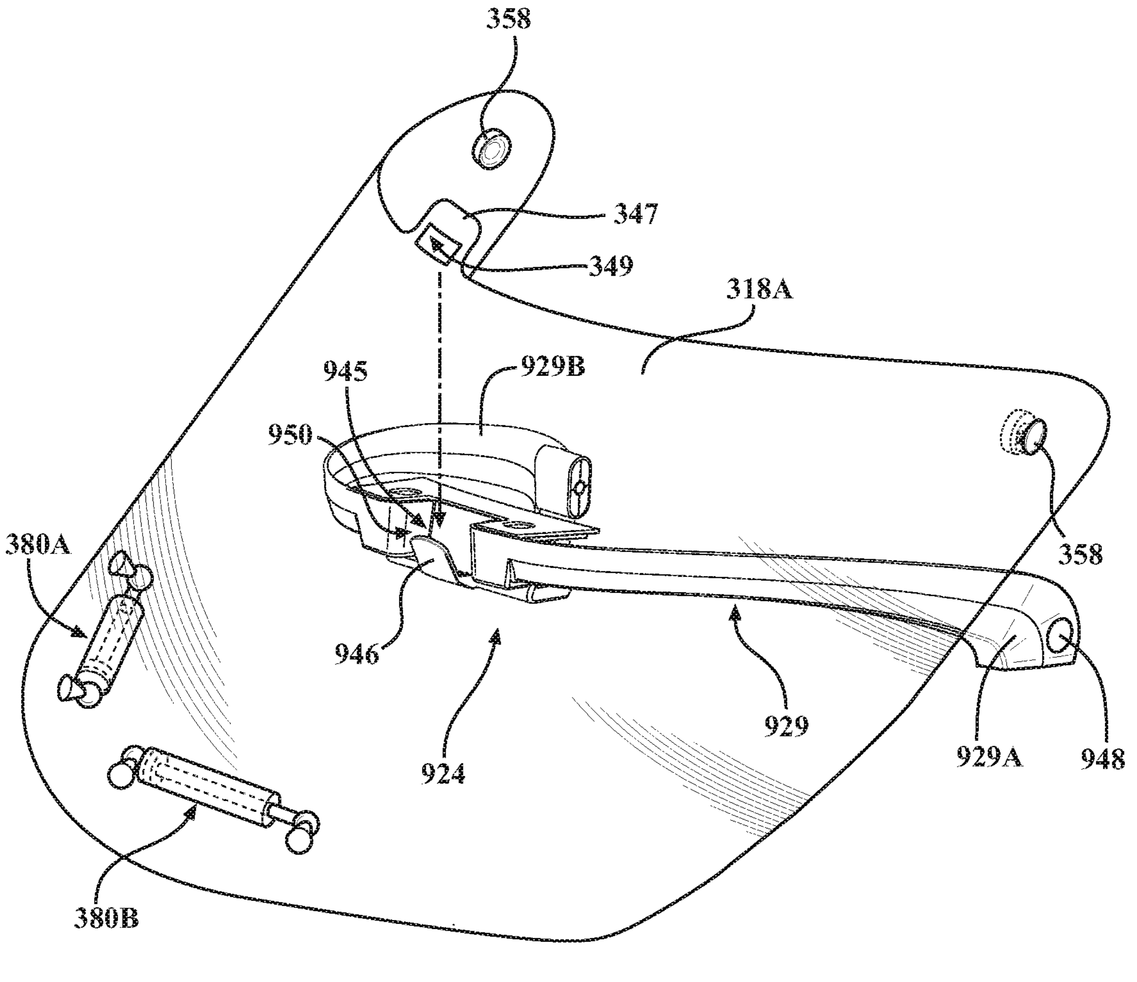
FIG. 13D is a schematic view of the transparent shield of FIG. 13A being coupled to a face frame of a surgical helmet assembly.

In operation, the wearer may manipulate the curvature of the face shield 318A by flexing the face shield 318A and/or manipulating the shield adjustment mechanism 380A, 380B. For example, the shield adjustment mechanism 380A, 380B may be configured such that the piston 382A, 382B may resist movement within the cylinder 384A, 384B absent the application of an outside force. In this scenario, with the face shield 318A starting from a first state, such as a flat state, as illustrated in FIG. 13B, the user may flex the lower portion of the face shield 318A to adjust the curvature of the face shield 318A. As the wearer flexes the face shield 318A, the piston 382A, 382B will retract within the cylinder 384A, 384B, shortening the distance between the opposing ends of the shield adjustment mechanism 380A, 380B. The shield adjustment mechanism 380A, 380B may be configured such that, once the wearer discontinues applying a force to the face shield 318A and/or the shield adjustment mechanism 380A, 380B, the cylinder 384A, 384B will hold the piston 382A, 382B in the final position unless additional force is applied to further adjust the curvature of the shield. FIG. 13C illustrates an exemplary curvature of the face shield 318A created by manipulating the face shield 318A and/or the shield adjustment mechanism 380A, 380B. FIG. 13D illustrates an exemplary configuration of a face shield 318A including a pair of shield adjustment mechanisms 380A, 380B for manipulating the curvature of the face shield 318A While the shield adjustment mechanism 380A, 380B is illustrated as a piston and cylinder, other configurations and/or actuating devices are contemplated. For example, the shield adjustment mechanism 380A, 380B may be configured as a ratchet and strap mechanism similar to a cable tie. In this exemplary configuration, the strap may comprise an integrated gear rack and the strap may be inserted within the ratchet such that the gear rack engages the lever of the ratchet. The wearer may pull the strap through the ratchet, shortening the length of the strap and defining a curvature in the face shield 318A. The ratchet and strap mechanism may be configured such that, once the strap is pulled through the ratchet, the strap cannot be released. Alternatively, the ratchet may comprise a release button or lever configured to disengage the lever of the ratchet from the gear rack of the strap. These are only but a few examples of potential configurations of the shield adjustment mechanism 380A, 380B and are not intended to be limiting.

The face shield 318A may also comprise one or more attachment elements 358. Exemplary configurations of attachment elements are disclosed in U.S. Pat. No. 10,420,386, which is hereby incorporated by reference in its entirety. As illustrated in FIGS. 13A-13D, the attachment element(s) 358 may be disposed on the upper portion of the face shield 318A in order to couple to a surgical helmet 20, 120 with or without a face frame 24, 124, 324, 424, 524, 624, 724, 824. For example, the surgical helmet 20, 120 and/or the face frame 24, 124, 324, 424, 524, 624, 724, 824 may be modified to position the corresponding coupling members 48, 148, 248, 348, 448, 548, 648, 748, 848 of the surgical helmet 20, 120 on the upper beam 29, 129, 229, 329, 429, 529, 629, 729, 829 or similar location on the surgical helmet 20, 120 so that the face shield 318A can be coupled to the surgical helmet 20, 120 with or without a face frame 24, 124, 324, 424, 524, 624, 724, 824.

The face shield 318A may also comprise a tab 347 configured to define an opening 349. While the face shield 318A illustrated in FIGS. 13A-13D includes a tab 347, it is also contemplated that the face shield 318A may be configured without a tab 349. Where the face shield 318A does not include a tab, the opening 349 may be defined in the face shield 318A, similar to the face shield 18 of the surgical garment 12 illustrated in FIG. 1A. Alternatively, it is also contemplated that the face shield 318A may be configured without an opening 349. For example, a tab separate from the face shield 318A may be disposed on the interior of the surgical garment 12, 112 and configured to couple with the surgical helmet 20, 120. Alternatively, neither the face shield 318A nor the surgical garment 12, 112 may comprise an opening, and the face shield 318A and/or surgical garment 12, 112 may be coupled to the surgical helmet exclusively by the attachment elements 58, 158, 258, 358.

Clauses to Alternative Configurations

I. A surgical helmet assembly for use with a surgical garment including a coupling element, said assembly comprising: a surgical helmet comprising: a headband for securing said surgical helmet to a wearer; a ventilation unit supported by the headband; a face frame coupled to said surgical helmet, said face frame comprising: an upper beam comprising opposing regions; a first post and a second post, each having a first end and a second end, said first end of each of said first and said second posts being coupled to said opposing regions of said upper beam; a lower beam connecting said second ends of said first and said second posts; and wherein each of said first post and said second post comprises a top member and a bottom member, said bottom member being movably coupled to said top member to provide a variable length of each of said first post and said second post to vary the distance between said upper beam and said lower beam.

II. The surgical helmet assembly of clause I, wherein said top member and said bottom member of each of said first post and said second post are connected by a sliding mechanism.

III. The surgical helmet assembly of clause II, wherein said sliding mechanism further comprises: a plurality of recesses spaced along a length of an inner member of said sliding mechanism; a detent disposed on an outer member of said sliding mechanism and configured to removably engage each of said plurality of recesses as said outer member is slid along said length of said inner member.

IV. The surgical helmet assembly of clause III, wherein said outer member of said sliding mechanism further comprises a biasing member coupled to said detent for creating a friction fit between said detent and one of said plurality of recesses of which the detent is engaging.

V. The surgical helmet assembly of clause I, further comprising a coupling member disposed on each of said opposing regions of said upper beam for coupling said first end of each of said first and said second posts to said upper beam;

VI. The surgical helmet assembly of clause V, wherein said coupling member defines a first pivot with a coupling feature of said first and said second posts that is configured to allow each of said first and said second posts to rotate relative to said upper beam.

VII. The surgical helmet assembly of clause I, wherein said top member of each of said first and second posts comprises a first joint defining a second pivot to allow said lower beam to rotate about said second pivot defined by said first joint.

VIII. The surgical helmet assembly of clause I, wherein said bottom member of each of said first and said second posts comprises a second joint defining a third pivot to allow said lower beam to rotate about said third pivot defined by said second joint.

IX. A surgical helmet assembly for use with a surgical garment including a coupling element, said assembly comprising: a surgical helmet comprising: a headband for securing said surgical helmet to a wearer; a ventilation unit supported by the headband; a face frame slidably coupled to said surgical helmet, said face frame comprising: an upper beam comprising opposing regions; a first post and a second post, each having a first end and a second end, said first end of each of said first and said second posts being coupled to said opposing regions of said upper beam; a lower beam connecting said second ends of said first and said second posts; wherein each of said first post and said second post comprises a top member and a bottom member, said bottom member being movably coupled to said top member; and wherein each of said first post and said second post are movable between a first position defining a first configuration of said face frame and a second position defining a second configuration of said face frame, each of said configurations of said face frame having a different distance between said upper beam and said lower beam.

X. The surgical helmet assembly of clause IX, further comprising: a first surgical garment comprising: a first shield having an upper portion and an opposing lower portion; a first aperture in said upper portion of said first shield; and a first coupling element disposed on said lower portion of said first shield; wherein said first aperture and said first coupling element define a first coupling dimension; a second surgical garment comprising: a second shield having an upper portion and an opposing lower portion; a second aperture in said upper portion of said second shield; and a second coupling element disposed on said lower portion of said second shield; wherein said second aperture and said second coupling element define a second coupling dimension; wherein said first coupling dimension of said first surgical garment corresponds to the first configuration of said face frame to allow said first surgical garment to couple to said face frame when said first post and said second post are in said first position; and wherein said second coupling dimension of said second surgical garment corresponds to the second configuration of said face frame to allow said second surgical garment to couple to said face frame when said first post and said second post are in said second position.

XI. A surgical helmet assembly for use with a surgical garment including a transparent shield, said assembly comprising: a surgical helmet comprising a coupling feature disposed on a distal portion of said surgical helmet, said coupling feature comprising a plurality of retention features spaced about a distal surface of said coupling feature; a face frame removably coupled to said surgical helmet, said face frame comprising: a coupling mechanism configured to operatively engage said coupling feature of said surgical helmet; and wherein said coupling mechanism and said coupling feature comprise complementary features to allow adjustment of the position of said face frame relative to said surgical helmet to position the transparent shield of the surgical garment at a preferred position in front of the wearer's face when disposed over said surgical helmet.

XII. The surgical helmet assembly of clause XI, wherein said coupling feature of said surgical helmet further comprises a channel; and wherein said coupling mechanism of said face frame comprises a coupling arm including a complementary protrusion slidably disposed within said channel of said coupling feature when said face frame is coupled to said surgical helmet.

XIII. The surgical helmet assembly of clause XI, wherein said coupling mechanism further comprises a control member configured to selectively manipulate a first member between a first state and a second state; wherein when said first member is in said first state, said coupling mechanism may move freely relative to said coupling feature of said surgical helmet; and wherein when said first member is in said second state, said coupling mechanism is locked in the desired position relative to said coupling feature of said surgical helmet.

XIV. The surgical helmet assembly of clause XI, wherein said face frame further comprises: an upper beam including opposing regions; a first post and a second post, each having a first end and a second end, said first end of each of said first and said second posts being coupled to said opposing regions of said upper beam; a lower beam connecting said second ends of said first and said second posts; and wherein each of said first post and said second post comprises a top member and a bottom member, said bottom member being movably coupled to said top member to provide a variable length of each of said first post and said second post to vary the distance between said upper beam and said lower beam.

XV. The surgical helmet assembly of clause XI, wherein said face frame further comprises: an upper beam and an opposing lower beam that define a first coupling dimension; and said surgical helmet assembly further comprises a second face frame that is removably coupled to said surgical helmet, said second face frame comprising: a second upper beam and an opposing second lower beam that define a second coupling dimension; wherein said first coupling dimension of said face frame is larger than said second coupling dimension of said second face frame such that said first face frame is configured to fit a wearer with a larger head and said second face frame is configured to fit a wearer with a smaller head.

XVI. A surgical helmet for use with a surgical garment including a coupling element, said helmet comprising: a headband; a ventilation unit supported by the headband; a face frame comprising: an upper beam comprising a first region and an opposing second region; a first post and a second post, each having a first end and an opposing second end, each of said first and said second posts coupled to said upper beam; a lower beam connecting said second ends of said first and said second posts; wherein opposing ends of said lower beam are connected to said second ends of said first and said second posts by a first joint configured to allow the lower beam to rotate relative to said first and said second posts.

XVII. The surgical helmet of clause XVI, wherein said upper beam comprises a coupling member disposed on each of said first region and said second region of said upper beam for coupling said first and said second posts to said upper beam; wherein said coupling member defines a second joint between said upper beam and said first and said second posts, said second joint configured to allow each of said first and said second posts to rotate relative to said upper beam.

XVIII. The surgical helmet of clause XVII, wherein said coupling member is configured to removably engage said first and said second posts.

XIX. The surgical helmet of clause XVI, further comprising an attachment element that is at least partially disposed within said lower beam, such that said attachment element may be repositioned relative to said upper beam when said lower beam is rotated relative to said first and said second posts.

XX. A surgical apparel system comprising: a surgical helmet comprising a mounting feature disposed on a distal portion of said surgical helmet; a surgical garment configured to be at least partially disposed over said surgical helmet, said surgical garment comprising: a fabric defining an opening; and a transparent shield disposed within said opening, said transparent shield comprising: an upper portion and a lower portion; a left portion and a right portion separated by a medial axis that bisects said transparent shield; and a left edge and opposing right edge; an attachment element coupled to said upper portion of said transparent shield and configured to removably couple with said mounting feature of the surgical helmet; and an adjustment device disposed on said lower portion of said transparent shield, said adjustment device comprising a first end and a second end; wherein said adjustment device is configured to expand and contract to vary a distance between said first end and said second end; and wherein said first end and said second end are spaced laterally across said lower portion of said transparent shield such that said expansion or contraction of said adjustment device to vary that distance between said first end and said second end will manipulate a curvature of said transparent shield to increase a user's field of view when said surgical garment is at least partially disposed over said surgical helmet.

XXI. The surgical apparel system of clause XX, wherein said adjustment device comprises a cylinder including a piston configured to move longitudinally within said cylinder manipulating the distance between said first end and said second end of the adjustment device to vary the curvature of said lower portion of said transparent shield.

XXII. The surgical apparel system of clause XX, wherein said adjustment device comprises a ratchet coupled to said transparent shield; and a strap having a first end and a second end, wherein said first end is coupled to said transparent shield at position laterally spaced from said ratchet; and wherein said ratchet and said strap are configured such that said second end of said strap is fed through said ratchet to reduce the distance between said ratchet and said first end of said strap to vary the curvature of said lower portion of said transparent shield.

XXIII The surgical apparel system of clause XX, wherein said transparent shield further comprises a tab extending from the upper portion of said transparent shield; and an opening defined by said tab, said opening configured to removably couple said surgical garment with the surgical helmet.

XXIV. The surgical apparel system of clause XXIII, wherein said surgical helmet further comprises an upper beam, said upper beam defining an alignment channel; and a protrusion coupled to said upper beam and at least partially disposed within said alignment channel; and wherein said tab is configured to be at least partially disposed within said alignment channel when said protrusion is inserted within said opening to couple said surgical garment to said surgical helmet.

XXV. A surgical helmet assembly comprising: a surgical helmet comprising: a headband; a ventilation unit supported by the headband; a first face frame configured to be removably coupled to said surgical helmet, said first face frame comprising: a first upper beam comprising opposing regions and a first coupling feature disposed between said opposing regions; a first pair of posts that each comprise a first end and a second end, said first end of each of said first pair of posts being coupled to said opposing ends of said first upper beam; a first lower beam connecting said second ends of said first pair of posts; and a first attachment element at least partially disposed within said first face frame, said first coupling feature and said first attachment element defining a first coupling dimension; a second face frame configured to be removably coupled to said surgical helmet, said second face frame comprising: a second upper beam comprising opposing regions and a second coupling feature disposed between said opposing regions; a second pair of posts that each comprise a first end and a second end, said first end of each of said second pair of posts being coupled to said opposing ends of said second upper beam; a second lower beam connecting said second ends of said second pair of posts; and a second attachment element at least partially disposed within said second face frame, said second coupling feature and said second attachment element defining a second coupling dimension; a surgical garment comprising: a shield having an upper portion and an opposing lower portion; an aperture in said upper portion of said shield; a first coupling element disposed on said lower portion of said shield; and a second coupling element disposed on said lower portion of said shield; wherein a distance between said aperture and said first coupling element define a third coupling dimension; and wherein a distance between said aperture and said second coupling element define a fourth coupling dimension; wherein said first coupling dimension of said first face frame corresponds to said third coupling dimension of said surgical garment to allow said surgical garment to couple to said first face frame; and wherein said second coupling dimension of said second face frame corresponds to said fourth coupling dimension of said surgical garment to allow said surgical garment to couple to said second face frame.

XXVI. A surgical helmet assembly comprising: a surgical helmet comprising: a headband for securing said helmet to a wearer; a ventilation unit supported by the headband; a first face frame configured to be removably coupled to said surgical helmet, said first face frame comprising: a first upper beam comprising opposing regions and a first coupling feature disposed between said opposing regions; a first pair of posts that each comprise a first end and a second end, said first end of each of said first pair of posts being coupled to said opposing ends of said first upper beam; a first lower beam connecting said second ends of said first pair of posts; and a first attachment element at least partially disposed within said first face frame, said first coupling feature and said first attachment element defining a first coupling dimension; a second face frame configured to be removably coupled to said surgical helmet, said second face frame comprising: a second upper beam comprising opposing regions and a second coupling feature disposed between said opposing regions; a second pair of posts that each comprise a first end and a second end, said first end of each of said second pair of posts being coupled to said opposing ends of said second upper beam; a second lower beam connecting said second ends of said second pair of posts; and a second attachment element at least partially disposed within said second face frame, said second coupling feature and said second attachment element defining a second coupling dimension; a first surgical garment comprising: a first shield having an upper portion and an opposing lower portion; a first aperture in said upper portion of said first shield; and a first coupling element disposed on said lower portion of said first shield; wherein said first aperture and said first coupling element define a third coupling dimension; a second surgical garment comprising: a second shield having an upper portion and an opposing lower portion; a second aperture in said upper portion of said second shield; and a second coupling element disposed on said lower portion of said second shield; wherein said second aperture and said second coupling element define a fourth coupling dimension; wherein said first coupling dimension of said first face frame corresponds to said third coupling dimension of said first surgical garment to allow said first surgical garment to couple to said first face frame; and wherein said second coupling dimension of said second face frame corresponds to said fourth coupling dimension of said second surgical garment to allow said second surgical garment to couple to said second face frame.

XXVII. A surgical apparel system comprising: a surgical helmet comprising a mounting feature disposed on a distal portion of said surgical helmet; a face frame removably coupled to said surgical helmet, said face frame comprising: a first post and a second post laterally spaced from one another, each of said first and second posts comprising a first end and a second end; a lower beam extending between the second end of each of said first and second posts; a first upper beam coupled to and extending proximally from said first end of said first post; a second upper beam coupled to and extending proximally from said first end of said second post; a face frame coupler configured to removably engage said mounting feature of said surgical helmet; and a coupling member comprising one of a ferromagnetic material or a magnetic material; a first surgical garment comprising: a fabric defining an opening; a transparent shield disposed within said opening; and an attachment member element comprising the other of the ferromagnetic material or the magnetic material, said attachment element configured to removably engage said coupling member to couple said first surgical garment to said face frame; a second surgical garment comprising: a fabric defining an opening; and a transparent shield disposed within said opening, said transparent shield comprising: an upper portion and a lower portion; an attachment element coupled to said upper portion of said transparent shield and configured to removably couple with said mounting feature of the surgical helmet; and an adjustment device disposed on said lower portion of said transparent shield configured to manipulate the a curvature of said transparent shield; wherein said system comprises a first configuration comprising said first surgical garment being at least partially disposed over said surgical helmet; and wherein said system comprises a second configuration comprising said second surgical garment being at least partially disposed over said surgical helmet.

XXVIII. A face frame for use with a surgical helmet including a mounting feature, said face frame comprising: a first post and a second post laterally spaced from one another, each of said first and second posts comprising a first end and a second end; a lower beam extending between the second end of each of said first and second posts; a first upper bracket coupled to and extending proximally from said first end of said first post; a second upper bracket coupled to and extending proximally from said first end of said second post; and a counterweight disposed on each of said first and second upper brackets positioned proximal to said first and second posts; and wherein said counterweight are positioned on each of said first and second upper brackets a distance from said first and second posts sufficient to maintain sagittal position of a center of gravity of the surgical helmet when said face frame is coupled to the surgical helmet.

XXIX. The face frame of clause XXVIII, wherein said face frame further comprises an upper beam; wherein said upper beam comprises a face frame coupler comprising one of a ferromagnetic material or a magnetic material; and wherein the mounting feature of the surgical helmet comprises the of the ferromagnetic material or the magnetic material for removably coupling said face frame to the surgical helmet.

XXX. A surgical helmet assembly for use with a surgical garment including a transparent shield, said assembly comprising: a surgical helmet comprising: a mounting feature disposed on a distal portion of said surgical helmet; a face frame removably coupled to said surgical helmet, said face frame comprising: a first post and a second post laterally spaced from one another, each of said first and second posts comprising a first end and a second end; a lower beam extending between the second end of each of said first and second posts; a first upper bracket coupled to and extending proximally from said first end of said first post; a second upper bracket coupled to and extending proximally from said first end of said second post; and a face frame coupler configured to operatively engage said mounting feature of said surgical helmet.

XXXI. The assembly of clause XXX, wherein said face frame coupler and said mounting feature comprise complementary features to allow adjustment of the position of said face frame relative to said surgical helmet to position the transparent shield of the surgical garment at a preferred position in front of a wearer's face when disposed over said surgical helmet.

XXXII. The assembly of clause XXX, further comprising a counterweight disposed on each of said first and second upper brackets proximal to said first and second posts.

XXXIII The assembly of clause XXXII, wherein said counterweight comprises a mass and is positioned on each of said first and second upper brackets a distance from said first and second posts sufficient to maintain sagittal position of the center of gravity of the surgical helmet when face frame is coupled to the surgical helmet.

XXXIV. The assembly of clause XXX, further comprising an upper beam extending between the first end of each of said first and second posts; wherein said upper beam defines an alignment channel; and wherein said upper beam further comprises a protrusion at least partially disposed in said alignment channel.

XXXV. The assembly of clause XXX, wherein said face frame coupler is positioned proximate the intersection of said first and second upper brackets with said first and second posts.

XXXVI. The assembly of clause XXX, wherein said face frame coupler comprises an aperture defined in each of said first upper bracket and said second upper bracket; and wherein said mounting feature of said surgical helmet comprises a first post and a second post, each of said first post and said second post configured to be inserted through one of said apertures in said first upper bracket and said second upper bracket.

XXXVII. The assembly of clause XXX, wherein said face frame coupler comprises one of a magnet or a ferromagnetic material first upper bracket and said second upper bracket; and wherein said mounting feature of said surgical helmet comprises the other of said magnet or said ferromagnetic material configured to magnetically couple said face frame to said helmet.

XXXVIII. The assembly of clause XXX, wherein said surgical helmet further comprises an upper beam coupled to said distal portion of said surgical helmet, said upper beam comprising opposing lateral portions; wherein said mounting feature of said surgical helmet comprises a post disposed on each of said opposing lateral portions; and wherein said face frame coupler comprises an aperture defined in each of said first upper bracket and said second upper bracket configured to removably couple with one of said posts on said opposing lateral portions to couple said face frame to said surgical helmet.

XXXIX. The assembly of clause XXX, wherein said surgical helmet further comprises an upper beam coupled to said distal portion of said surgical helmet, said upper beam comprising opposing lateral portions; wherein said mounting feature of said surgical helmet comprises one of a magnet or a ferromagnetic material disposed on and/or within each of said opposing lateral portions; and wherein said face frame coupler comprises the other of said magnet or said ferromagnetic material disposed on and/or within each of said first upper bracket and said second upper bracket configured to magnetically couple said face frame to said helmet.

XL. A surgical apparel system comprising: a surgical helmet comprising a mounting feature disposed on a distal portion of said surgical helmet; a face frame removably coupled to said surgical helmet, said face frame comprising: a first post and a second post laterally spaced from one another, each of said first and second posts comprising a first end and a second end; a lower beam extending between the second end of each of said first and second posts; a first upper beam coupled to and extending proximally from said first end of said first post; a second upper beam coupled to and extending proximally from said first end of said second post; a face frame coupler configured to removably engage said mounting feature of said surgical helmet; and a coupling member comprising one of a ferromagnetic material or a magnetic material; a first surgical garment comprising: a fabric defining an opening; a transparent shield disposed within said opening; and an attachment member element comprising the other of the ferromagnetic material or the magnetic material, said attachment element configured to removably engage said coupling member to couple said first surgical garment to said face frame; a second surgical garment comprising: a fabric defining an opening; and a transparent shield disposed within said opening, said transparent shield comprising: an upper portion and a lower portion; an attachment element coupled to said upper portion of said transparent shield and configured to removably couple with said mounting feature of the surgical helmet; and an adjustment device disposed on said lower portion of said transparent shield configured to manipulate the a curvature of said transparent shield; wherein said system comprises a first configuration comprising said first surgical garment being at least partially disposed over said surgical helmet; and wherein said system comprises a second configuration comprising said second surgical garment being at least partially disposed over said surgical helmet.

XLI. A face frame for use with a surgical helmet including a mounting feature, said face frame comprising: a first post and a second post laterally spaced from one another, each of said first and second posts comprising a first end and a second end; a lower beam extending between the second end of each of said first and second posts; a first upper bracket coupled to and extending proximally from said first end of said first post; a second upper bracket coupled to and extending proximally from said first end of said second post; and a face frame coupler positioned proximate the intersection of said first and second upper brackets with said first and second posts, said face frame coupler configured to removably engage the mounting feature of the surgical helmet to allow for removal of said face frame from the surgical helmet to reduce the a weight of the surgical helmet when said face frame is not needed.

Several configurations have been discussed in the foregoing description. However, the configurations discussed herein are not intended to be exhaustive or limit the system 10, 110 and/or the surgical helmet 20, 120, 220, 320, 420 to any particular form. The terminology which has been used is intended to be in the nature of words of description rather than of limitation. Many modifications and variations are possible in light of the above teachings and the system 10, 110 may be practiced otherwise than as specifically described. Furthermore, it should be understood that elements described in the various configurations including reference numbers in increments of 100 may comprise similar features.

What is claimed is:

1. A face frame for use with a surgical helmet including a mounting feature comprising one of a ferromagnetic material or a magnetic material, said face frame comprising:
- a first post and a second post laterally spaced from one another, each of said first and second posts comprising an upper portion and a lower portion;
- a lower beam extending between the lower portion of each of said first and second posts; and
- a face frame coupler positioned proximate a first end of each of said first and second posts, said face frame coupler comprising either of the ferromagnetic material or a magnetic material that is capable of removably engaging the mounting feature of the surgical helmet to allow for removal of said face frame from the surgical helmet to reduce a weight of the surgical helmet when said face frame is not needed;
- an upper beam extending between the upper portion of each of said first and second posts; and
- a protrusion that is removably coupled to said upper beam to allow for said protrusion to be repositioned on said upper beam based on the length of said first post and said second post.

2. The face frame of claim 1, further comprising:
- the upper beam coupled to and extending proximally from said upper portion of each of said first post and said second post; and
- wherein said face frame coupler is positioned proximate an intersection of said upper beam with said first and second posts.

3. The face frame of claim 2, further comprising the upper beam extending between the upper portion of each of said first and second posts;
- wherein said upper beam defines an alignment channel; and
- wherein said upper beam further comprises a protrusion at least partially disposed in said alignment channel.

4. The face frame of claim 2, further comprising a counterweight disposed on a bracket coupled to said upper beam proximal to said first and second posts.

5. The face frame of claim 4, wherein said counterweight comprises a mass and is positioned on the first and second lateral portions of said upper beam a distance from said first and second posts sufficient to maintain sagittal position of the center of gravity of the surgical helmet when said face frame is coupled to the surgical helmet.

6. The face frame of claim 4, wherein said counterweight and each of said first and second lateral portions of said upper beam comprise complementary fasteners, said fasteners configured to allow said counterweight may be positioned at various points spaced along a length of said first and second lateral portions of said upper beam to manipulate the position of the center of gravity of the surgical helmet when said face frame is coupled to the surgical helmet.

7. The face frame of claim 1, further comprising a coupling member disposed on at least one of said first post or said second post, said coupling member comprising one of a ferromagnetic material or a magnetic material.

8. The face frame of claim 1, wherein each of said first post and said second post further comprises a top member and a bottom member, said bottom member being movably coupled to said top member to provide a variable length of each of said first post and said second post to vary a distance between said lower beam and the surgical helmet.

9. The face frame of claim 1, wherein each of said first post and said second post further comprises a top member and a bottom member, said bottom member being movably coupled to said top member to provide a variable length of each of said first post and said second post to vary a distance between said lower beam and the surgical helmet.

* * * * *